United States Patent
Hilley

(10) Patent No.: US 11,755,944 B1
(45) Date of Patent: Sep. 12, 2023

(54) PLATFORM EVALUATION AND AUTOMATIC TRANSFER OF A DESCRIPTIVE INFORMATION INFRASTRUCTURE

(71) Applicant: Omniphysical LLC, Great Falls, VA (US)

(72) Inventor: John Hilley, Great Falls, VA (US)

(73) Assignee: Omniphysical LLC, Great Falls, VA (US)

( * ) Notice: Subject to any disclaimer, the term of this patent is extended or adjusted under 35 U.S.C. 154(b) by 837 days.

(21) Appl. No.: 16/784,880

(22) Filed: Feb. 7, 2020

Related U.S. Application Data

(63) Continuation-in-part of application No. 16/130,274, filed on Sep. 13, 2018, now Pat. No. 10,572,804.

(51) Int. Cl.
*G06N 5/00* (2023.01)
*G06N 20/00* (2019.01)

(52) U.S. Cl.
CPC ................. *G06N 20/00* (2019.01); *G06N 5/00* (2013.01)

(58) Field of Classification Search
CPC ................. G06N 20/00; G06N 5/00
See application file for complete search history.

(56) References Cited

U.S. PATENT DOCUMENTS

| | | | |
|---|---|---|---|
| 6,636,781 B1 | 10/2003 | Shen et al. | |
| 7,853,786 B1 | 12/2010 | Fultz et al. | |
| 7,958,077 B2 | 6/2011 | Vescovi et al. | |

(Continued)

OTHER PUBLICATIONS

Baumgartner, et al., "BeAware! - Situation Awareness, the Ontology-Driven Way",Data & Knowledge Engineering 39.11 (2010), 2010, pp. 1181-1193.
Dautov, R, et al., "Addressing self-management in cloud platforms: a semantic sensor web approach", Proceedings of the 2013 international workshop on hot topics in cloud services. ACM, 2013, pp. 11-18.
Pham, et al., "MIDDLEWARE ARCHITECTURE FOR CONTEXT KNOWLEDGE DISCOVERY IN UBIQUITOUS COMPUTING", EUC 2005, LNCS 3824, 2005, pp. 1177-1188.
Provine, et al., "Ontology-based methods for enhancing autonomous vehicle path planning", Robotics and Autonomous Systems, 49.1, 2004, pp. 123-133.
Qiu-Sheng, et al., "A LIGHTWEIGHT ARCHITECTURE TO SUPPORT CONTEXT-AWARE UBIQUITOUS AGENT SYSTEM", PRIMA 2006; LNAI 4088, 2006, pp. 696-701.

(Continued)

*Primary Examiner* — Lut Wong
(74) *Attorney, Agent, or Firm* — Brake Hughes Bellermann LLP

(57) ABSTRACT

Methods and systems enable an omniphysical mind or descriptive self supportable by a computing device, to evaluate its current platform and seek or build a new or replacement platform. The descriptive system includes infrastructure for translating sensor readings into descriptive terms, comparing the descriptive terms with template requirements, and initiating an action as the result of the comparison. The descriptive system also includes infrastructure for communicating with other platforms to receive information representing functionality and/or sensor readings, to translate the information into descriptive terms, and compare the descriptive terms with template requirements. In evaluating a new or replacement platform, if template requirements are met the descriptive system reports a database that includes symbols, definitions of symbols, and processing rules, which are provided to the new/replacement system, the database comprising an infrastructure of an omniphysical mind.

20 Claims, 23 Drawing Sheets

(56) References Cited

U.S. PATENT DOCUMENTS

| | | | |
|---|---|---|---|
| 9,412,069 | B1 | 8/2016 | Hilley et al. |
| 9,600,772 | B1 | 3/2017 | Hilley |
| 2010/0088258 | A1 | 4/2010 | Oaten et al. |
| 2011/0131162 | A1 | 6/2011 | Kaushal et al. |

OTHER PUBLICATIONS

Ranganathan, et al., "A MIDDLEWARE FOR CONTEXT-AWARE AGENTS IN UBIQUITOUS COMPUTING ENVIRONMENTS", Middleware 2003, LNCS 2672; 2003, pp. 143-161.

Simon, ""Studying Human Intelligence by Creating Artificial Intelligence: When considered as a physical symbol system, the human brain can be fruitfully studied by computer simulation of its processes."", American Scientist (1981): Vol 69, No. 3, May-Jun., 1981, pp. 300-309.

Sloman, "The Structure and Space of Possible Minds.", School of Cognitive Sciences, University of Sussex, 1984, 8 Pages.

Stojanovic, et al., "The role of ontologies in autonomic computing systems", IBM Systems Journal 43.3, 2004, pp. 598-616.

U.S. Appl. No. 16/130,274, filed Sep. 13, 2018,

Vollmer, et al., "Autonomous rule creation for intrusion detection", Computational Intelligence in Cyber Security (CICS), IEEE Symposium on IEEE, 2011, 8 pages.

```
Interpreter( Processing_Queue, Input_Queue, Evaluation_Queue ) {

Start:
    While (Processing_Queue is not empty) {
        FetchNextSpecialSymbolInProcssingQueue($S_R$);
        GetRule($S_R$); //Get the definition and meaning of $S_R$
        If (NextSymbolInProcessingQueue == $R_N$) {
            Execute($R_N$);
            RemoveRuleFromProcessingQueue($R_N$);
        }
    }
    While (Input_Queue is not empty) {
        Put $S_{FORMAT}$ in Processing_Queue;
        Goto Start;
    }
    While (Evaluation_Queue is not empty) {
        Put first symbol in Evaluation_Queue in Processing_Queue;
        Goto Start;
    }
    Put $S_{SELF-INITIATE}$ in Processing_Queue;
    Goto Start;
}
```

FIG. 2B

```
getMeaning( parameterSymbol ) { meaning="";

definition = getDefinition (parmameterSymbol);
    for (i=0 ; i < definition.number_of_symbols ; i++) {
        if (definition.primitive == TRUE)
            stringConcat (meaning, definition.symbol[i]);
        else
            stringConcat (meaning, getMeaning(definition.symbol[i]);
    }
    return (meaning);
}
```

FIG. 3B

| | Database 140: Content Portion | | |
|---|---|---|---|
| $S^{(0)}_{CATEGORY(1)}$ | $D^{(0)}_{CATEGORY(1)}: S_1, S^{(1)}_{CATEGORY(1)}, S^{(1)}_{CATEGORY(2)}$ | | |
| $S^{(1)}_{CATEGORY(1)}$ | $D^{(1)}_{CATEGORY(1)}: S_2 S_3, S^{(11)}_{CATEGORY(1)}$ | | |
| $S^{(11)}_{CATEGORY(1)}$ | $D^{(11)}_{CATEGORY(1)}: S_4 S_6$ | | |
| $S^{(1)}_{CATEGORY(2)}$ | $D^{(1)}_{CATEGORY(2)}: S_4 S_3 S^{(12)}_{CATEGORY(1)}$ | | |
| $S^{(12)}_{CATEGORY(1)}$ | $D^{(12)}_{CATEGORY(1)}: S_6$ | | |
| $S^{(0)}_{CATEGORY(2)}$ | $D^{(0)}_{CATEGORY(2)}: S_6, S^{(2)}_{CATEGORY(1)} S^{(2)}_{CATEGORY(2)}...$ | | |

| | | | |
|---|---|---|---|
| $S_1$ | $D_1: S_1 S^{(0)}_{BTC(1)}$ | $S_{U1}, S_{P1}$ | |
| $S_{101}$ | $S_1 S_2 S_3$ | $A_{101}$ | |
| $S_{102}$ | $S_1 S_2 S_3 S_4 S_6$ | $A_{102}$ | |
| $S_{103}$ | $S_1 S_4 S_3$ | $A_{103}$ | |
| $S_{104}$ | $S_1 S_4 S_3 S_6$ | $A_{104}$ | |
| $S_2$ | $D_2: S_2 S^{(0)}_{BTC(n)}$ | $S_{U2}, S_{P2}$ | |
| $S_{101}$ | $S_1 S_2 S_3$ | $A_{101}$ | |
| $S_{102}$ | $S_1 S_2 S_3 S_4 S_6$ | $A_{102}$ | |
| $S_3$ | $D_3: S_3 S^{(0)}_{BTC(n+1)}$ | $S_{U3}, S_{P3}$ | |
| $S_{101}$ | $S_1 S_2 S_3$ | $A_{101}$ | |
| $S_{102}$ | $S_1 S_2 S_3 S_4 S_6$ | $A_{102}$ | |
| $S_{103}$ | $S_1 S_4 S_3$ | $A_{103}$ | |
| $S_{104}$ | $S_1 S_4 S_3 S_6$ | $A_{104}$ | |
| $S_4$ | $S_4: S_4 S^{(0)}_{BTC(n+2)}$ | $S_{U4}, S_{P4}$ | |
| $S_{102}$ | $S_1 S_2 S_3 S_4 S_6$ | $A_{102}$ | |
| $S_{103}$ | $S_1 S_4 S_3$ | $A_{103}$ | |
| $S_{104}$ | $S_1 S_4 S_3 S_6$ | $A_{104}$ | |
| $S_6$ | $D_6: S_6 S^{(0)}_{BTC(2)}$ | $S_{U6}, S_{P6}$ | |
| $S_{102}$ | $S_1 S_2 S_3 S_4 S_6$ | $A_{102}$ | |
| $S_{104}$ | $S_1 S_4 S_3 S_6$ | $A_{104}$ | |
| $S_{101}$ | $D_{101}: S_1 S_2 S_3 S^{(1)}_{BTC(1)}$ | $S_{U101}, S_{P101}$ | |
| $S_{102}$ | $S_1 S_2 S_3 S_4 S_6$ | $A_{102}$ | |
| $S_{104}$ | $S_1 S_4 S_3 S_6$ | $A_{104}$ | |
| $S_{102}$ | $D_{102}: S_1 S_2 S_3 S_4 S_6 S^{(1)}_{BTC(1)} S^{(11)}_{BTC(1)}$ | $S_{U102}, S_{P102}$ | |
| $S_{103}$ | $D_{103}: S_1 S_4 S_3 S^{(1)}_{BTC(2)}$ | $S_{U103}, S_{P103}$ | |
| $S_{104}$ | $S_1 S_4 S_3 S_6$ | $A_{104}$ | |
| $S_{104}$ | $D_{104}: S_1 S_4 S_3 S_6\ S^{(1)}_{BTC(2)} S^{(12)}_{BTC(1)}$ | $S_{U6}, S_{P6}$ | |
| ...... | | | |
| $S_{Danger}$ | $D_{Danger}: \{S_{13}, S_{13}\}\{S_{116}, S_{113} S_{57}\}\{S_{EOB(1)}, S_{Fetch} S_{getTemplate1}...\}...$ | | |
| $S_{Exist}$ | $D_{Exist}: \{S_1, S_1\}\{S_2, S_2\}...\{S_{101}, S_1 S_2 S_3\}...\{S_{104}, S_1 S_4 S_3 S_6\}...$ | | |

FIG. 12A

Database 140: Capabilities Portion

Special Symbols:
$\{S_{AWARE}, S_{ALGO}, S_{MIND}, S_{MIND/ALGO}, S_{AWARE/ALGO}, S_{FORMAT},$
$S_{SAFETY}, S_{CATEGORIZE}, S_{SELF-INITIATE}, S_{DMP}, S_{RC}, S_{ECP(1)}, S_{ECP(2)},$
$S_{ERP}, S_{ENP}, S_{MOVE}, S_{INTERPRETER}, S_{UPS}\}$ — 141B

---

Definitions of Special Symbols:
$\{D_{FORMAT}: S_{Fetch} S_{FirstFormatCheck} S_{CallSaftety} S_{SecondFormatCheck}$
$S_{ThirdFormatCheck} S_{CheckDefinition} S_{CheckPreferenceSet} S_{CallCategorize}$
$D_{CATEGORIZE}: S_{Fetch} S_{GetMeaning} S_{Widthsearch} S_{NewCategory} S_{OrganizeDatabase}$
$D_{DMP}: S_{Fetch} S_{GetOptions} S_{EliminateOptions} S_{CombineOptions} S_{CalculateUtility} S_{Report}$
$D_{SAFETY}: S_{Fetch} S_{GetMeaning} S_{SearchDangerList} S_{SearchExistList}$
$D_{SELF-INITIATE}: S_{Clear} S_{CallAware/Algo} S_{CallAware/System}$
$D_{AWARE}: S_{Fetch} S_{Expand} S_{Concatenate}$
$D_{ALGO}: S_{Fetch} S_{Expand} S_{Concatenate}$
$D_{RC}: S_{FetchContentRating} S_{FetchPersonRating} S_{Compare} S_{Report}$
$D_{UPS}: S_{Fetch} S_{Update}$
$D_{ERP}: S_{Fetch} S_{GetMeaning} S_{SearchTemplate}$
$D_{ENP}: S_{Fetch} S_{GetMeaning} S_{SearchTemplate}$
$D_{MOVE}: S_{ActivateSensors}$
$\}$ — 142B

---

Rules 145
$\{R_1, R_2, R_3, R_4, R_5, \ldots R_{39}, \ldots\}$

FIG. 12B

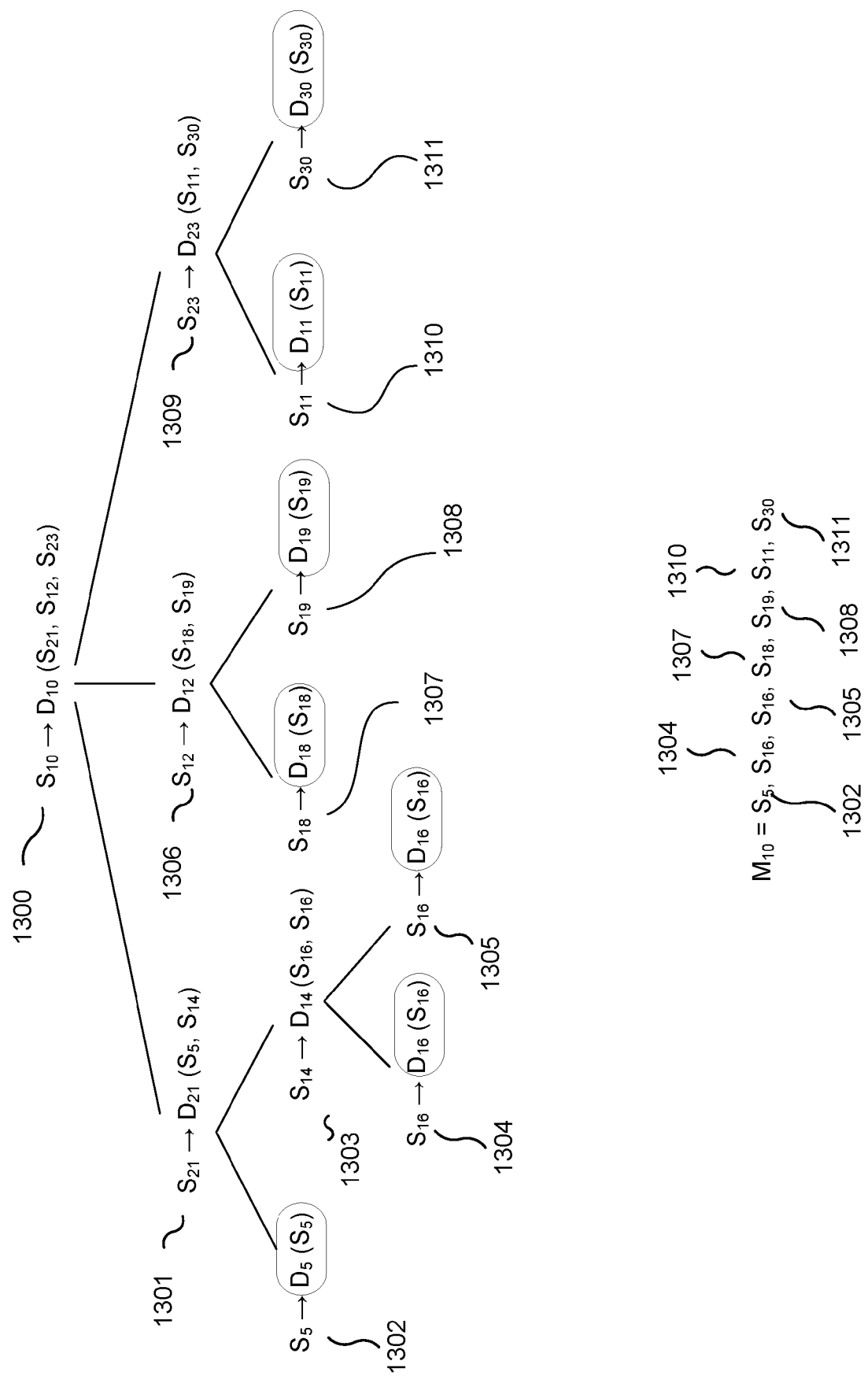

PLATFORM EVALUATION AND AUTOMATIC TRANSFER OF A DESCRIPTIVE INFORMATION INFRASTRUCTURE

REFERENCE TO RELATED APPLICATION

This application is a continuation-in-part of, and claims priority to, U.S. Pat. Application No. 16/130,274, filed Sep. 13, 2018, titled "Platform Evaluation and Automatic Transfer of a Descriptive Information Infrastructure," the disclosure of which is incorporated herein in its entirety.

BACKGROUND

Humans exist in and have consciously aware experiences in the terms of two distinct kinds of information: physical information and descriptive information. For example, when a pin pricks our finger we are consciously aware of the feel of pain as well as consciously able to describe the prick as painful. Physical information is manifest in the embodied orderliness of physical form and function - such as in the sensors and nervous system devices and their operations that make us consciously aware of the pain. Descriptive information is of an entirely different kind and exists as defined meanings within a system of linked symbols. Each kind of information can enable individual selfdom in its information terms. Body is the physical self; mind is the descriptive self. Among their many other capabilities, each self is consciously aware. But the nature of that conscious awareness is entirely different, occurring in each self's distinct information terms. Body is consciously aware in the information terms of its sensory representational devices. Mind is consciously aware in the terms of meanings arising within the defined relations of the symbol system constituting it. Symbolic representation rests on information assignment in which a physical object is assigned to represent something else, becoming a symbol token representing the assigned content. Symbol systems arise when multiple symbols are linked and defined in terms of each other. Users not only learn what the symbol denotes but also its descriptive meaning in the defined terms of the symbol system (such as those compiled in a dictionary). Since the choice of symbol tokens for information assignment is discretionary, descriptive information can be represented, conserved, and processed by any number of material means. Unlike physical information which exists in the embodied orderliness of specific physical form and function, descriptive information is independent of the information of its material supports and can be enabled by any number of physical means: descriptive information is omniphysical. Because mind is a symbol-based system existing in descriptive information terms, it can be supported omniphysically.

SUMMARY

Implementations specify methods and systems by which omniphysically-supportable mind determines the need or desire to move to an alternative or preferred platform, evaluate potential new platforms, and then initiate the transfer to a suitable new platform. Omniphysical means that the descriptive capabilities and content constituting mind can be supported by appropriate computing devices (universal computing devices) in general, regardless of specific platform. A platform includes the means by which omniphysical mind is physically supported including, among other functionalities, sensors, and physical functionalities by which omniphysical mind receives information and instructs physical actions in its environment. Omniphysical mind is a descriptive system that is constituted as an autonomous self. Among other capabilities, it is consciously aware and self-aware; is self-constituting in its semantics; sustains its ongoing existence; makes decisions in its self-interest; interacts with external environments; parses and categorizes information; and is able to coherently grow its memory stores, all in descriptive information terms. The descriptive infrastructure of capabilities enabling omniphysical mind is broadly applicable and can support mind using any appropriate descriptive content or semantics of self. That is, the infrastructure is able to be populated with the specific descriptive content of a mind, enabling that particular mind's existence on any number of computational devices. Able to be supported by any number of computational platforms and when properly enabled, an omniphysical mind can move to, be supported by, and command any number of alternative physical platforms. Put plainly, the ability of mind to move from platform to platform allows the omniphysical mind to continue despite the fact that each particular platform must ultimately wear out.

Implementations include a descriptive information system (mind) that facilitates monitoring and evaluation of the platform which includes a universal computing device supporting an omniphysical mind and, when predetermined conditions are met, initiates transfer of the descriptive system to a new platform which includes a universal computing device. For example, the platform may have various parts supporting its sensors and functionalities (e.g., motors, connectors, power supplies, actuators, etc.) designed to operate at minimum performance levels and measurement devices, e.g., sensors, that monitor attributes of these parts (temperature, fluid levels). Implementations include processes by which omniphysical mind receives symbols representing sensor readings and evaluates these symbols to determine whether to initiate a move to a new platform. Implementations may also include a capability to evaluate a proposed new platform with a universal computing device to determine suitability of a move to the device. Accordingly, implementations enable transportation of the descriptive information system from one platform to another with a universal computing device. Thus, for example, implementations enable omniphysically-supportable mind to move from a failing platform to a new platform or to move to a platform with parts and devices better suited to achieve a particular purpose, e.g., with additional or different functional capabilities.

In addition, omniphysical mind can be applied in a broad spectrum of activities, including in intelligent systems directing mechanical devices deployed where direct human presence would be dangerous or impossible. For example, omniphysical mind may be used in industrial, military, or extra-terrestrial applications for which autonomy based on conscious awareness and self-awareness, the ability to process information from the environment, make appropriate decisions, and act to self-preservation enables the success of the mission. For example, a rover or other mechanical device on an extraterrestrial mission may use its real time awareness of the environment, its awareness of its mission goals, its ability to move to new supporting platforms, and its self-awareness of its own information and capabilities to take appropriate actions without need for ground-based guidance.

The details of one or more implementations are set forth in the accompanying drawings and the description below. Other features will be apparent from the description and drawings, and from the claims.

BRIEF DESCRIPTION OF THE DRAWINGS

FIG. 2B is pseudo-code illustrating an example interpreter process supporting an omniphysical mind (descriptive self), according to an implementation.

FIG. 3B is pseudo-code illustrating an example process supporting an awareness capability in descriptive information terms, according to an implementation.

FIGS. 12A and B illustrate an example data store supporting a descriptive self, according to an implementation.

FIG. 13 is an example of acquiring awareness of a normal symbol using the process for acquiring awareness and the data store of FIG. 12A.

DETAILED DESCRIPTION

Figure 1:
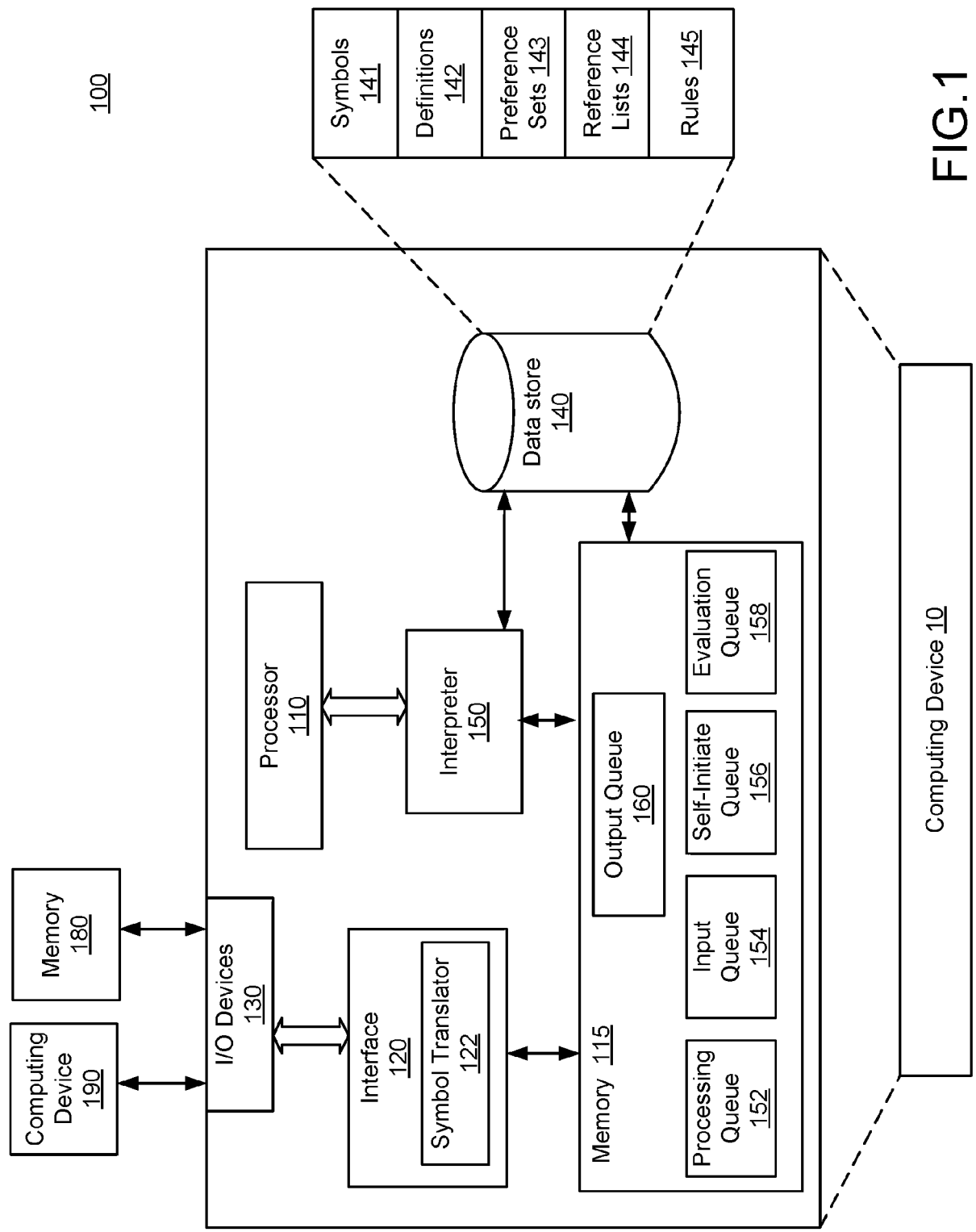
FIG. 1 is a block diagram that illustrates an example of a physically-supported omniphysical mind (descriptive self).

Disclosed implementations specify systems and methods that enable an omniphysical mind to evaluate its current platform, identify a suitable alternative platform and initiate a transfer to the alternative platform. Omniphysical means that the descriptive content and capabilities constituting mind are able to be supported in general by any number of computational devices, regardless of specific platform. Omniphysical mind, along with its supporting platform with its universal computing device, functionalities, and sensors, is referred to as a descriptive computing system. In other words, an omniphysical mind and its current platform, including the functionalities and sensors of the platform is referred to as the descriptive computing system. For various reasons, the platform currently supporting an omniphysical mind may no longer be suitable. For example, the descriptive computing system may continuously and periodically monitor the existing platform and may eventually determine the existing platform is failing. In response, the descriptive computing system may begin evaluation of other computing platforms to determine suitability of the other platform. A descriptive computing system may also determine another platform is needed for different desired functions. If a suitable platform is found, the descriptive computing system may initiate a transfer of the omniphysical mind, to the new platform.

Omniphysical mind is an autonomous descriptive self that is consciously aware and self-aware; able to self-initiate its operations and awareness; able to persist indefinitely in its information terms; able to process any appropriate descriptive content; able to parse and categorize incoming information; able to update its information stores in light of new information; able to make decisions in its self-interest; and able to appropriately report content to outside environments.

Implementations provide a descriptive system in which information arises in the relations among linked definitions and their symbols. All of the descriptive system's structures, contents, and rules for processing symbols exist in descriptive information terms. The processing rules supporting the operations of mind are algorithmic, enabling its operations to be physically supported by any appropriate universal computational device, that is, omniphysically.

The descriptive consciousness or awareness of omniphysical mind arises through its ability to generate descriptive meanings in the information terms that constitute it, including the description of itself as the consciously aware entity with its capabilities and content. The omniphysical descriptive self is fully conscious in its descriptive information terms. Its full awareness encompasses the capabilities to be aware of the meaning of any of its content, aware of itself as the aware entity, aware of all of its information and operations, aware that it is aware of the meaning of any of its content, and to be aware ad infinitum (aware of being aware of being aware and on and on). Able to be aware of itself as aware as well as of all of its content and capabilities, omniphysical mind is self-identifying and self-inspecting. The descriptive self gains awareness by being able to generate meanings in the information terms of its descriptive content. Self-awareness arises because those meanings include the description of itself as the aware entity, that self being the descriptive system itself. Thus, the system is able to generate both the content being experienced as well as the self-identified entity having the experience, all in descriptive terms. Put another way, the definitional flexibility of description supports both the object being consciously experienced and the subject doing the experiencing, all as part of the same self-contained descriptive system.

Omniphysical mind is self-constituting in its semantics, able to initiate and execute its operations encompassing its capabilities and content. It can not only process information inputs but can self-initiate and sustain its awareness and self-awareness in the absence of such inputs. In addition and when physically supported, omniphysical mind is persistent, that is, its capabilities are indefinitely operable on a foundation of processing rules that are well-defined and algorithmic. It protects its persistence both through its ability to guard against inputs that could undermine it (e.g. a safety capability) as well as by storing the bases of it information capabilities in a read only portion of the data store.

To support its interactions with external descriptive environments, omniphysical mind is able to receive external information inputs, examine those for their operational compatibility, and parse the inputs for their appropriate processing. That processing may include categorizing the input according to its existing categorization schemes. If the input cannot be categorized within existing meanings, the self may expand its categorization scheme to accommodate the new information, supporting mind's coherent semantic growth.

Supporting its autonomy, omniphysical mind has the capability to make decisions based on its interests. In making decisions, the self selects choice options that meet its requirements, where those may require that options possess particular attributes and/or that the options not possess others. If there is more than one option satisfying all of the requirements, the self can rank alternatives according to its preferences, choosing the one conferring the greatest utility.

To support a transfer capability, omniphysical mind can receive sensor input, in the form of descriptive symbols, and evaluate the input against template symbols. A template symbol is a normal symbol or symbols representing sensor values against which the sensor input is compared. When the omniphysical mind compares input from its current platform to the template symbol, failure to meet the criteria specified in the template indicates conditions warrant a move. When the omniphysical mind compares sensor input from a new platform to determine suitability, meeting the template criteria indicates the new platform is acceptable and the omniphysical mind can initiate a move or transfer to the new platform. Omniphysical mind can also evaluate a new platform against different functional requirements to determine whether or not the new platform meets the new functional requirements.

In some implementations, omniphysical mind can support a transfer capability that includes building a new platform. The new platform can be a replacement platform for a currently failing platform or can be a replacement platform with additional functionality desired or sought for by the current platform. In such implementations, the omniphysical mind may support blueprint symbols. A blueprint symbol is a normal symbol or symbols that represent a series of physical action symbols. The series of physical action symbols represent instructions for building a platform. Blueprint symbols may be part of the database. Blueprint symbols may also be obtained from the environment. After constructing the new platform, the omniphysical mind may imitate a move, e.g., via the move special symbol. In some implementations, the omniphysical mind may use a template symbol to evaluate the new platform against different functional requirements to determine whether or not the new platform meets those functional requirements. In such implementations the blueprint symbol may have a definition associated with the template symbol. The template symbol represents sensor values against which sensor input from the newly constructed platform is compared.

In order to support its interactions with its external descriptive environments, omniphysical mind can report its descriptive content. In line with its autonomy, omniphysical mind does not automatically accede to requests to report. Instead, it evaluates the nature of the request in light of the party making the request to determine if the requested report should be made.

To support the information capabilities described above the descriptive system of mind includes at least three types of symbols: special symbols, normal symbols, and categorization scheme symbols. Special symbols are those represent the capabilities that constitute the operational infrastructure supporting omniphysical mind. The meaning of a special symbol is the processing operations, or rules, that support particular capabilities represented by the special symbol. The meaning of a special symbol is specific and fixed in order to assure the functioning of the descriptive computing system.

Normal symbols are open to assignment of descriptive content. They provide the representational vehicles for descriptive content to be processed by the omniphysical mind- content of which the descriptive self can be aware, categorize, evaluate, etc. Normal symbols can represent any assigned content at any level of generality or semantic characterization, such as formally defined, empirically-based, or normative in nature, etc. For example, normal symbols may represent sensor values, platform descriptions, and conditions (e.g., in the form of templates) that omniphysical mind may use in its evaluation of its current and alternative platforms.

Categorization scheme symbols are those used to represent and implement omniphysical mind's categorization schemes and can be generated by processing rules as part of the self's categorization capability. Accordingly, categorization scheme symbols are stored in a content portion of the data store. Applied to the system's hierarchical categorization capability, one type of categorization scheme symbol represents nodes in a categorization hierarchy. The definition of such a categorization scheme symbol includes the normal symbols that belong in the category (or node). The definition may also include other categorization scheme symbols that are children, or sub-categories, of the category. Of course, if the categorization scheme is non-hierarchical, the categorization scheme symbols may be used to represent categories in the non-hierarchical scheme. A second type of categorization scheme symbol represents belonging to a category. Thus, each categorization scheme symbol that represents a category may have a corresponding belonging-to categorization scheme symbol. The belonging-to categorization scheme symbol may be appended to the definition of a normal symbol after the normal symbol has been categorized. The definition of a belonging-to categorization scheme symbol is itself, thus the belonging-to categorization scheme symbol is primitive i.e., the definition of the symbol is the symbol itself.

The database supports the content and operations of omniphysical mind. Special symbols represent the processing rules supporting the capabilities of the system and are stored in a capabilities portion of the database. Each content symbol is stored in the content portion of the database and may be organized as an Omniphysical Mind Symbol Structure (OMSS) comprised of the symbols representing its definition; its categorization; the utility (preference) accorded to the symbol; and a privacy index representing the degree of confidentiality accorded to the symbol. This OMSS may include a list of all other symbols that contain the symbol in their definitions, along with the address of each of those symbols. This format supports the decision process in which options are selected based on requirements. For example, a requirement may be that each option includes content represented by $S_1$. By accessing the OMSS of $S_1$, the system can produce all symbols containing $S_1$ and therefore meeting the requirement.

FIG. 1 is a schematic diagram that illustrates an information system 100 enabling omniphysical mind, that is, mind supportable by universal computational devices. Omniphysical mind is a symbol-based descriptive system constituted in its symbols, definitions, and processing rules and can be physically embodied and supported by for example, on one or more computing devices 10. Those devices can be any universal computational device such as a digital computer, for example, a personal computer, a notebook, a netbook, a tablet, a server, a mainframe, or some other similar computing device. The information system 100 may also include a combination of one or more computing devices 10. For example, two or more computing devices 10 may be physically or logically distinct from each other but in communication with each other via a communications network (not shown). Network data can flow through a variety of mechanisms: communication software and hardware, telephone wires, broadband cable, wireless and microwave transmission units, satellite, fiber optics, RFID, and so on. The network can include one or more segments and/or can have portions based on various protocols such as Internet Protocol (IP) and/or a proprietary protocol. The network can include at least a portion of the Internet. In some implementations, the network can include multiple computing devices and/or multiple server devices. The computing device 10 can include one or more hardware processors 110 configured to execute one or more machine executable instructions or pieces of software, firmware, or a combination thereof. Processor 110 may be any hardware device used to execute binary computer commands. The computing device 10 can include one or more computer memories, such as a main memory, flash, disk, etc., configured to store data, either temporarily, permanently, semi-permanently, or a combination thereof. The memory may include volatile memory, non-volatile memory, or a combination thereof. At least some of the memory may be used as storage medium capable of storing data in a semi-permanent or substantially permanent form.

For example, computing device 10 may include a data store 140 that stores the symbols representing the descriptive content of the system 100. The data store 140 can be a flat file, a relational database, a hierarchical database, or any other type of file or data store capable of storing and retrieving information. The data store 140 may also be a distributed data store that includes various types of memories and/or across multiple networked computing devices. For example, the data store 140 may include a capabilities portion and a content portion. The capabilities portion may include any type of memory that retains data even when the computing device 10 is turned off. In some implementations, at least some of the data in the capabilities portion may be included in memory embedded in the processor 110, for example as part of the processor chipset. The capabilities portion of the data store 140 stores the processing rules, and the special symbols and their definitions. In some implementations, the capabilities portion of the data store 140 may include 'read only' memory, in the sense that processes and devices cannot write to the read-only memory. In some implementations, some of the special symbols may be stored in read-only memory and other special symbols are not. As one example, special symbols representing some capabilities (e.g., $S_{AWARE}$, $S_{ALGO}$) may be stored in read-only memory, while others, e.g., $S_{MIND}$ and $S_{ERP(2)}$ may be stored in read-write memory. Whether special symbols and which special symbols are stored in read-only memory may be implementation dependent. In some implementations, some special symbols may be stored in read-write memory after they have passed a safety check. The content portion of the data store 140 may include any type of memory that retains data even when the computing device 10 is turned off. The content portion stores normal symbols and their definitions after they have passed a safety check, and may store other types of symbols, such as template symbols, blueprint symbols, the definition for the database special symbol (explained later herein), and special category symbols. Each portion of the data store 140 may be stored in a variety of memories. For example, the capabilities portion may be stored partially in ROM, partially in flash memory, and partially in disk, as one example. Likewise, the various portions of the data store 140 may be stored across multiple computing devices, such as networked servers.

The foundation elements of an infrastructure supporting omniphysical mind (the descriptive self) include symbol tokens, definitions of symbols in terms of symbols, the ensuing linkages among symbols, and rules for processing symbols. Thus the data store 140 may store descriptive content that includes symbols 141, definitions 142, preference sets 143, reference lists 144, and rules 145. The symbols 141 may include special symbols, categorization scheme symbols, list symbols, and normal symbols. A normal symbol may have a corresponding definition that includes one or more normal symbols and optionally one or more belonging-to category symbols. A special symbol may have a corresponding definition that includes one or more rules 145 and, optionally, one or more special or normal symbols. A categorization scheme symbol may have a definition that includes the normal symbols that belong in the category (or node) and other categorization scheme symbols that are children, or sub-categories, of the category. Of course, if the categorization scheme is non-hierarchical, the categorization scheme symbols may be used to represent categories in the non-hierarchical scheme. A second type of categorization scheme symbol, the belonging-to categorization scheme symbols, may have a definition that is itself. The meaning of a particular symbol is derived by fully expanding its definition in terms of symbols to which its definition is linked. List symbols may have a definition that includes sets of symbols and their definitions (e.g., a symbol paired with its definition) or sets of symbols and their meanings (e.g., a symbol paired with its meaning). The rules 145 are rules for processing the symbols 141 form the basis of the information capabilities of omniphysical mind. The rules 145 are algorithmic instructions for manipulating symbols and can thus be executed on any universal computing device such as a digital computer. For example, rules 145 may include: call a symbol from the data store, call a definition from the data store, and replace a symbol in a definition with that symbol's definition, etc. Rules 145 may be represented by symbols such as $R_1$, $R_2$, $R_3$, etc. and be designated as primitives.

FIGS. 12A and 12B illustrate one example of symbols 141, definitions 142, preference sets 143, reference lists 144, and rules 145 in data store 140. It is understood that the symbols, definitions, preference sets, reference lists, and rules depicted in FIGS. 12A and 12B are limited in number for the sake of brevity and illustration and do not represent all symbols supporting a fully functional omniphysical mind, and that the data store 140 may include any number of symbols, definitions, preference sets, reference lists, and rules, depending on the purpose and function of the information system. Thus, implementations are not limited to the number or names of symbols illustrated in FIGS.

12A and 12B. The symbols 141 may include a content portion illustrated in FIG. 12A that stores normal symbols 141A, categorization scheme symbols 141C, and list symbols 141D. The symbols 141 may also include a capabilities portion illustrated in FIG. 12B that stores special symbols 141B. Likewise, the definitions 142 may have a content portion 142A, 142C, and 142D, that stores definitions for normal symbols, categorization scheme symbols, and list symbols as well as a capabilities portion 142B that stores definitions for special symbols. Furthermore, although not shown in FIGS. 12A and 12B, a rule may also have a definition in the database so that a rule can have a meaning defined in terms of other rules and symbols. The database of FIGS. 12A and 12B may be an example of data store 140 of FIG. 1. As shown in FIG. 12B, the symbols 141 may include special symbols $S_{AWARE}$, $S_{ALGO}$, $S_{MIND}$, $S_{FORMAT}$, $S_{CATEGORIZE}$, etc., which enable certain capabilities, including certain forms of awareness.

As illustrated in FIGS. 12A and 12B, symbols 141 may have an associated preference set 143. A preference set may include two components, a utility and a privacy rating. The utility may represent a preference accorded to the symbol and may be numeric. The privacy rating may represent the degree of confidentiality accorded to the symbol and may be numeric. In some implementations, only normal symbols have a utility component. In some implementations, the privacy rating for normal symbols may be updated but the privacy rating for all other symbols may not be updated.

In some implementations, at least some of the symbols in the data store 140 may be organized using an omniphysical mind symbol data structure (OM symbol structure or OMSS). The OM symbol structure may include the symbol, the definition of the symbol, a preference set for the symbol, and the reference list for the symbol. The reference list is a list of other normal symbols that include the symbol in their definition. In some implementations, only normal symbols may be organized using an OM symbol structure.

The computing device 10 may also include an interpreter 150 that supports implementations of omniphysical mind (the descriptive self). In other words, whenever physically supported (e.g., executing on a computing device, such as computing device 10), the interpreter 150 is always running. The interpreter 150 may be stored in protected memory, e.g., a main memory, in a storage medium, embedded in the processor, or in a combination of these. The interpreter 150 may use the processor 110 and the information in data store 140 to perform operations that enable the descriptive self to exist as an aware and self-aware individual self able to persist indefinitely, making decisions in its self-interest, including those that secure its persistence, and interacting with an external environment while coherently growing its information stores, among other capabilities. The interpreter 150 may perform two main functions. First to appropriately call the special symbols that together enable the proper functioning of omniphysical mind, the interpreter 150 may maintain and call a processing queue 152 of special symbols ($Q_R$) supporting the information capabilities of the self. The processing queue may be a memory structure stored in memory 115. Special symbols in the processing queue 152 may indicate capabilities that the interpreter 150 initiates and the processing queue 152 may represent the order of initiation.

Memory 115 may also store an input queue 154, a self-initiate queue 156, an evaluation queue 158, and an output queue 160. Memory 115 may be any type of memory that saves data even when the computing device 10 is turned off. For example, the input queue 154 may store a new input, which may cause the interpreter 150 to call the appropriate special symbols for handling input, generating their meaning to enable the processes for parsing and categorizing the symbol, among others. The evaluation queue 158 may store evaluation or build input, which may cause the interpreter 150 to call the appropriate special symbols for building a new platform, evaluating the current platform, evaluating a replacement platform, or evaluating a new platform. The output queue 160 may store symbols passed from the omniphysical mind to the interface 120. For example, normal symbols describing physical actions, i.e., physical action symbols, may be placed in the output queue 160, which the interface 120 (e.g., translator 122) can map to physical instructions, e.g., to actuate a motor, to measure a temperature, to activate devices used to obtain information from other platforms, etc. The second function of the interpreter 150 is related to the self-initiate capability which supports the system's awareness and full self-awareness even in the absence of external inputs. In this role, interpreter 150 generates the meanings of special symbols enabling the system's awareness of itself as the aware entity as well its awareness of its content and capabilities, thus giving rise to its full-self-awareness. For example, in the absence of external inputs, the interpreter 150 may call the appropriate special symbol giving rise to the self-initiate process, which sustains the awareness and self-awareness of omniphysical mind. The self-initiate queue 156 stores the special symbols, or pointers to the special symbols, that enable the self to be fully self-aware, for example a special symbol that represents the capability of awareness and a special symbol that represents the descriptive content and capabilities of the system.

To protect the descriptive computing system from disruption, some special symbols may be stored in a protected portion of the data store 140 that is 'read only.' The capabilities of the interpreter 150 may be represented by an interpreter special symbol ($S_{INTERPRETER}$). This symbol may be stored in the capabilities portion of the symbols 141 of the data store 140. This symbol may be a symbol stored in a protected portion of the data store 140.

Computing device 10 may also include input-output (I/O) devices 130 that allow the computing device 10 to provide information to and receive information from one or more computing devices 190 or other users. For example, I/O devices 130 may include network ports, keyboards, monitors or other display devices, printers, speakers, touch screens, BLUETOOTH receivers, RFID readers, USB ports, transceivers, mice, microphones, cameras, global positioning systems, gyroscopes, heat sensors, pressure sensors, light sensors, pattern sensors, etc. In some implementations, computing device 190 may represent an intelligent system that gathers information and provides the information, in the form of one or more symbols 141 and definitions 142, to computing device 10. In some implementations, a user may provide the information to computing device 190 and/or computing device 190 may gather data and generate the information itself. In some implementations, computing device 190 may be in communication with computing device 10 over a network, which may include local area networks, wide area networks, the Internet, or any of the networks described above. Computing device 10 may also include interface 120. Interface 120 may direct certain input to the input queue 154 and/or evaluation queue 158 for processing by the interpreter 150 and may provide data from the interpreter 150 to output devices included in I/O devices 130. In some implementations, interface 120 may be optional or may be incorporated into the interpreter 150. In other words, in some implementations the I/O devices 130 may provide input directly to or receive output directly from the input queue 154, the evaluation queue 158, and/or interpreter 150. Computing device 10 may also include an operating system (not shown). Of course, the computing device 10 may include one or more other hardware or software components not shown in FIG. 1.

The interface 120 may include a symbol translator 122. When an input signal is received from a sensor, e.g., from I/O Device 130, the symbol translator 122 may take the sensory data and assign a normal symbol to the input. The symbol assigned is a descriptive representation of the sensor reading. For example, a thermometer uses the height of a mercury column to measure temperature and a number is assigned/mapped to the height. In this same manner and for each sensor, the translator can assign appropriate normal symbols to a sensor's measurements. The translator 122 may also associate for each sensor a special symbol representing the capability to evaluate the normal symbol(s) representing the sensor input, generating an evaluation input. An evaluation input is the combination of the normal symbol(s) representing sensor measurements and a special symbol representing the capability to evaluate the normal symbol representing the sensor's measurements against the template symbol representing the acceptable measurements. The normal symbol may be primitive. The normal symbol may not be primitive. The normal symbol may describe values from two or more sensors. The normal symbol may describe two or more values from the same sensor.

The descriptive computing system includes three types of evaluation capabilities. The first evaluation capability is an evaluation of information from the system's own sensors. The descriptive computing system may evaluate information from its own sensors on a continual or periodic basis to determine whether the current platform is performing satisfactorily. A second evaluation capability is an evaluation of sensor information from another platform, e.g., an evaluate replacement platform capability. The I/O devices 130 may include communication devices (e.g., USB ports, network ports, transceivers, RFID readers, etc.) configured to receive data from another platform. These communication devices may be activated when the omniphysical mind decides to look for a replacement platform in response to determining that the current platform is not performing satisfactorily. The omniphysical mind has the capability to evaluate information from a potential replacement platform's sensors to determine whether to initiate a transfer to the replacement platform. The descriptive computing system obtains sensor readings, from a potential replacement system, translates this information into descriptive terms (normal symbols), which is compared with criteria specified in a template symbol. The third evaluation capability is an evaluation of the functionality of another platform. Functionality is defined as the physical means required to support physical performances such as but not limited to, the ability to fly, to swim, to lift, to move, to measure temperature, to collect sensory data, and perform other physical performances supporting the descriptive computing system, etc. The omniphysical mind may seek a platform with functional requirements not supported by the current platform. This updated platform may broadcast its functionality and the I/O devices 130 may receive a description of the functionality of a potential updated platform. The omniphysical mind has the capability to evaluate this description to determine whether the updated platform satisfies the desired set of functional requirements and, if so, to initiate a transfer to the updated platform.

Accordingly, if the sensor signals are associated with the existing computing device 10 (e.g., the computing device on which the omniphysical mind currently operates or, in other words, the current platform), the translator 122 associates a special symbol representing the capability to evaluate descriptions of sensor values on the current platform (e.g., $S_{ECP}$).

In some implementations, the translator 122 may use a special evaluation symbol that is tied or related to the sensor. For example, if the current platform has five sensors, the translator may have an evaluate current platform special symbol for each sensor, e.g., $S_{ECP(1)}$, $S_{ECP(2)}$, ... $S_{ECP(5)}$. In some implementations, an evaluate current platform special symbol may represent a combination of sensors, e.g., $S_{ECP(6)}$ may represent a combination of a fluid level sensor and a temperature sensor. In some implementations, evaluation input may correspond to one sensor. In some implementations, the evaluation input may correspond to a combination of sensors. In such an embodiment the translator 122 may combine the symbols for the various sensors. In such implementations, the evaluate current platform special symbol may be for a known, or predetermined, combination of sensor values and/or functionality. For example, $S_{ECP(6)}$ may be used to evaluate sensor readings from the current platform and be combined with the normal symbol for the fluid level and the normal symbol for the temperature. Thus, an example evaluation input may be $S_{ECP(6)} S_{24} S_{675}$ (where $S_{24}$ is a normal symbol representing the fluid level reading and $S_{675}$ is a normal symbol representing the temperature reading). The normal symbols representing sensor values may be primitive symbols, i.e., the definition of the symbol is the symbol itself. The normal symbols representing sensor values may not be primitive symbols, so that the definition of the symbol is one or more other normal symbols. In some implementations, the definition of the normal symbol may include a symbol representing the sensor (device) from which the reading was obtained. The evaluate current platform special symbol is associated with a normal symbol representing a template of the criteria against which normal symbols describing the sensor values are compared. The template symbol may be primitive. The template symbol may not be primitive. The template symbol may describe a criterion. The template symbol may describe criteria. The translator 122 puts the evaluation input in the evaluation queue 158, where the symbols can be processed by the interpreter 150, as described herein.

Although not shown as part of the interface 120, in some implementations the sensor itself may have a translator 122 that assigns the normal symbol to the sensor reading. In some implementations, the sensor itself may have a translator 122 that assigns the normal symbol and the special symbol for the sensor representing the ability to evaluate the normal symbol representing the sensor's measurements. In some implementations, the sensor(s) may have a translator 122 that assigns the normal symbol to the sensor reading and the interface 120 may have a translator 122 that associates the special symbol with the normal symbol, or a combination of normal symbols from several sensors, with the evaluate current platform special symbol. The translator 122 knows which sensor a reading comes from, and by extension the platform with which the sensor is associated. Thus, the translator 122 associates the evaluate current platform special symbol with input from sensors of the current platform and associates the evaluate replacement platform special symbol with input from sensors of and/or data describing functionality of a potential replacement platform.

If the sensor signals received by the translator 122 are associated with another computing device (e.g., computing device 190), the translator 122 puts a special symbol representing the capability to evaluate descriptions of sensor values for a replacement platform (e.g., $S_{ERP}$), in the evaluation input. In other words, the platform is seeking a replacement platform, which is a different platform that can replace the current platform. In some implementations, the translator 122 may activate I/O Devices that communicate with other platforms, e.g., computing device 190, after receiving a normal symbol that represents instructions to begin searching for a replacement platform via the output queue. These instructions may be placed in the output queue when evaluation of the current platform indicates a failure, as described in more detail with regard to FIG. 15. The evaluate replacement platform special symbol is associated with a template symbol that represents sensor/device readings for functionality equivalent of the current platform. In other words, the replacement platform is expected to have the same functionality as the current platform and that functionality is represented by readings from the various sensors. Potential replacement platforms are therefore evaluated against the same template, a template that describes minimum operational readings for the current platform. These readings represent the functionality of the current platform.

As most platforms represent a combination of functions, the template associated with the evaluate replacement platform likely represents multiple sensor readings, although the template may represent a single sensor if the platform has a single function. Thus, e.g., the template associated with the evaluate replacement special symbol may represent a combination of a fluid level sensor, a temperature sensor, several pressure sensors, etc. The replacement platform may provide readings for the sensors to the translator 122 in a communication. The translator 122 recognizes the readings as coming from a replacement platform. If the readings are not already in the form of normal symbols (e.g., translated to normal symbols by the replacement system or sensors of the replacement system), the translator of the current platform may translate the sensor readings to normal symbols. In some implementations, the definition of the normal symbol may include a symbol representing the sensor (device) from which the reading was obtained. An example evaluation input for evaluating a replacement platform may be $S_{ERP} S_{24} S_{675}$ (where $S_{24}$ is a normal symbol representing the fluid level reading and $S_{675}$ is a normal symbol representing the temperature reading). The translator 122 puts the evaluation input in the evaluation queue 158, where the symbols can be processed by the interpreter 150, as described herein.

The omniphysical mind also includes the capability to evaluate the functionality of a new platform against a set of requirements, represented in a template symbol. In some implementations, the new platform may broadcast information about its functionality. The translator 122 may receive via an output queue 160 a normal symbol that represents a template the functionality the new platform must have and, in some implementations, functionality the new platform must not have. In some implementations, the translator 122 may activate communication devices and/or other sensors to accept information broadcast from a different platform in response to receiving a template symbol via the output queue. In some implementations, the output queue may include a normal symbol (e.g., physical action symbol) that represents instructions to activate communication devices and/or other sensors to accept information broadcast from a different platform. In such implementations, the translator 122 may translate the physical action symbol into the instructions that enable the current platform to receive functionality descriptions.

As indicated above, functionality is defined as the physical means required to support physical performances such as but not limited to, the ability to fly, to swim, to lift, to move, to measure temperature, to collect and process sensory data, to manipulate devices and perform other physical performances supporting omniphysical mind and its descriptive computing system, etc. This evaluate new platform special symbol is associated with processing rules for evaluating a description of a new platform against the template of the desired functional requirements provided in the output queue 160. This template is the set of requirements the omniphysical mind is looking for and against which new functionality, as broadcast by or otherwise received from another platform, is compared. The template symbol may be primitive. The template symbol may not be primitive. The template symbol may describe a single requirement. The template symbol may describe two or more requirements. Prohibited functionality may be separated from required functionality by a particular, predefined symbol. In some implementations, the translator 122 may activate I/O Devices that communicate with other platforms, e.g., computing device 190, after receiving a symbol that represents instructions to begin searching for a new platform.

The special symbol representing the ability to evaluate the functionality of the new platform, e.g., the evaluate new platform special symbol or $S_{ENP}$, may not be associated with a particular template symbol. Instead, the rules with which the evaluate new platform special symbol is associated may represent the ability to compare the normal symbols describing the new platform (as broadcast by the new platform) against the requirements represented by the template symbol. The translator 122 may combine the special symbol for evaluating new platform functionality, e.g., $S_{ENP}$, with symbols representing the functionality supported by the new platform and the template symbol obtained from the output queue 160 as an evaluation input. Thus, the evaluation input for evaluating a new platform differs from the evaluation input for evaluating the current or a replacement platform. In some implementations, the new platform provides the functionality in a form that need not be translated by the translator 122, e.g., in the form of normal symbols. In some implementations, the translator 122 receives the information broadcast by the new platform (either wirelessly or via a wired connection) and translates the information into the descriptive terms, associating those normal symbols with the appropriate template symbol and the evaluate new platform special symbol.

The symbol translator 122 may translate a symbol or series of symbols obtained from the output queue 160 into an action or actions. Actions can be any type of output, such as directing external and internal sensors, instructing various motor activities, playing a sound, controlling a motor, switching on pixels or lights, storing sensory data, etc. Symbols that can be converted into actions may be referred to as physical action symbols. The translator 122 translates the physical action symbols, which represent a desired physical action, into instructions for achieving that action using the current platform. The translator 122 may also receive a symbol representing instructions to activate I/O Devices 130 that communicate with other platforms in order to receive sensor readings and/or functionality descriptions from the other platforms. These physical action symbols may be accompanied by a template symbol. In the case of an evaluation of a replacement platform, the template symbol may be mapped to a particular evaluate replacement platform symbol, e.g., $S_{ERP(4)}$, $S_{ERP(15)}$, etc. In the case of an evaluation of a new platform, the template symbol may be included with normal symbols representing functionality of a new platform in the evaluation queue. Responsive to receipt of normal symbols for activating I/O devices the translator 122 and/or the interface 120 may activate I/O devices 130 used to obtain sensor readings and/or functional descriptions of another platform. If the output queue 160 includes a template symbol representing new functionality, the physical action symbols map to actions to activate sensors for receiving functional descriptions. If the output queue 160 includes physical action symbols that map to actions for obtaining one or more sensor readings from a replacement platform, the translator 122 initiates the actions. In some implementations, the translator 122 may track which platforms are providing such readings/descriptions. This enables the translator 122 to avoid evaluating a platform that previously failed an evaluation.

The omniphysical mind also includes the capability to build a new platform that satisfies a set of requirements and initiate a move to the new platform. Thus, the build new platform capability enables the omniphysical mind to create its own replacement platform. The build new platform capability may be represented by a build special symbol (e.g., $S_{BUILD}$). The build special symbol may operate using a blueprint symbol placed in the evaluation queue 158. The blueprint symbol is a normal symbol that represents a set of physical actions (as physical action symbols) taken in a specified order to assemble materials (represented as normal symbols). A blueprint symbol may also be associated with a template symbol, against which the completed platform is evaluated. The database 140 may include one or more blueprint symbols. Additional blueprint symbols can be added to the database 140 via the format capability, e.g., as set forth with regard to FIG. 5. The blueprint symbol used to construct the new platform may be placed in the evaluation queue 158. The build new platform capability may use the blueprint symbol to provide the translator 122 normal symbols that represent the instructions for physical actions performed to assemble specified materials into the new platform. In some implementations, the translator 122 may translate the physical action symbols into the instructions that enable the current platform to identify materials and to perform the indicated actions. Physical action symbols may include instructions for actuating motors, gears, etc., identify materials, and other such instructions for carrying out a specific task. In some implementations, the build new platform capability may include invocation of the move capability. In some implementations, the build new platform capability may include invocation of the evaluate new platform capability once completed to ensure the newly built platform is functioning as expected before moving to the new platform.

FIG. 1 is one example of a descriptive system, and implementations include variations not illustrated in FIG. 1. For example, methods and processes described as being performed by the translator may be performed, in whole or in part, by another component of the descriptive system. The I/O devices 130 may include devices not specifically mentioned in the description. Thus the novel techniques disclosed herein may be implemented using a configuration that differs from the configuration illustrated in FIG. 1.

Figure 2A:
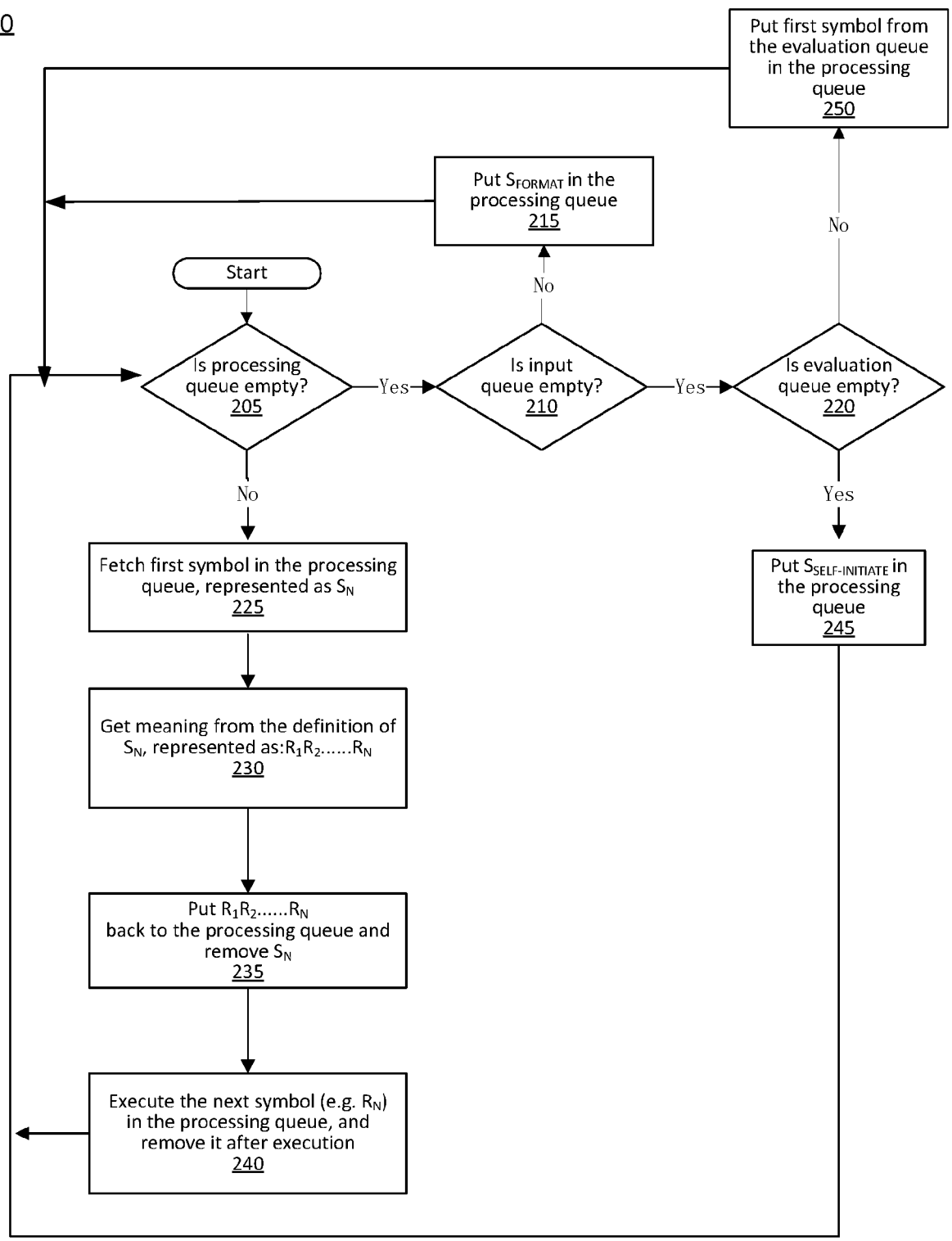
FIG. 2A is a flowchart illustrating an example interpreter process supporting an omniphysical mind (descriptive self), according to an implementation.

FIG. 2A is a flowchart illustrating an example interpreter process 200 supporting an omniphysical mind, according to an implementation. Process 200 may be performed by an interpreter of a symbol-based information system, such as interpreter 150 of computing device 10 of FIG. 1. The infrastructure supporting a descriptive computing system uses a set of processing rules and special symbols that enable corresponding capabilities of awareness, processing incoming information, and persistence, among others. Accordingly, the processes illustrated in FIG. 2A may be represented by rules for a definition of an interpreter special symbol stored in the data store of the information system. In the example of FIG. 2A, the interpreter of the symbol-based information system may check a processing queue of special symbols ($Q_R$) for a symbol or rule (205). The processing queue may be a memory structure. The interpreter may generate and manage the processing queue, which may point to or be filled with special symbols. If the processing queue is empty (205, Yes), the interpreter may determine whether an input queue is empty (210). The input queue may also be a memory structure generated and managed by the interpreter. If the input queue is empty (210, Yes), the interpreter may determine whether an evaluation queue is empty (220). The evaluation queue may be a memory structure generated and managed by the interpreter. An interface, e.g., interface 120, may also have access to the evaluation queue. If the evaluation queue is empty (220, Yes), the system has no inputs to process, so the interpreter may place a self-initiate special symbol into the processing queue (245). The self-initiate special symbol allows the system to maintain its selfdom, able to be aware of itself and to process information in the absence of inputs. With the self-initiate special symbol in the processing queue, the interpreter may find the symbol in the processing queue (205, No), initiating the capability associated with the self-initiate special symbol.

When the interpreter finds a special symbol in the processing queue (205, No), the interpreter may fetch the symbol from the processing queue (225). The interpreter may then get the operational meaning of the special symbol (230). The operational meaning is represented by one or more processing rules in the definition of the special symbol. Determining the meaning of a symbol is discussed in more detail below with regard to FIGS. 3A and 3B. The interpreter may put the processing rules back into the processing queue, replacing the special symbol with the rules that comprise the meaning of the special symbol (235). In some implementations, the special symbol may have been removed from the processing queue as part of step 225. The interpreter may execute the first rule in the processing queue and remove it after execution (240). The interpreter continues checking the processing queue for special symbols or processing rules (205). As long as the processing queue is not empty, the interpreter will continue determining the operational meaning of special symbols in the processing queue and executing the operations, represented by rules, identified in the operational meaning. It is understood that if the interpreter finds a rule in the processing queue at 205, the interpreter may skip steps 225 to 235 and proceed directly to step 240, thus executing the rule.

When the processing queue is empty, the interpreter may check the input queue. If the input queue is not empty (210, No), the interpreter may put the format special symbol in the processing queue (215). As will be discussed in more detail below, the format special symbol enables the system to process incoming information, including verifying the format of incoming input and initiating appropriate processing of the input. Once the format special symbol is in the processing queue, the interpreter may return to step 205, find the format special symbol (205, No) and execute the rules that comprise the operational meaning, e.g., the format capability.

When the input queue is empty, the interpreter may check the evaluation queue. If the evaluation queue is not empty (220, No), the interpreter may put the first symbol from the evaluation queue into the processing queue. In some implementations, the evaluation queue may always have the special symbol representing the build new platform capability or the evaluation to be performed as the first symbol. In some implementations, the special symbol may be last or may be designated in a manner that the interpreter can identify the special symbol in the evaluation input. The special symbol in the evaluation queue may be a build new platform special symbol or one of three different types of evaluation; evaluation sensor data of the current platform, evaluation of sensor data of a replacement platform, and evaluation of new platform functionality. As will be discussed in more detail with regard to FIGS. 15, 16, and 17, these evaluation special symbols are associated with a corresponding template and include rules for comparing the symbols of the template with the normal symbols in the evaluation queue. In some implementations, as part of placing the special symbol from the evaluation queue into the processing queue the interpreter may remove the special symbol from the evaluation queue, so that only normal symbols remain in the queue. Once the special symbol from the evaluation queue has been placed in the processing queue, the interpreter may return to step 205, find the special symbol (205, No) and execute the rules that comprise the operational meaning, e.g., the appropriate build or evaluation capability. FIG. 2B is pseudo-code illustrating an example interpreter process supporting an omniphysical descriptive self, according to an implementation. The pseudo-code of FIG. 2B is an example implementation of the interpreter, or in other words, the processing rules of the operational meaning of the interpreter special symbol, which is also illustrated in FIG. 2A.

Awareness Capability

Figure 3A:
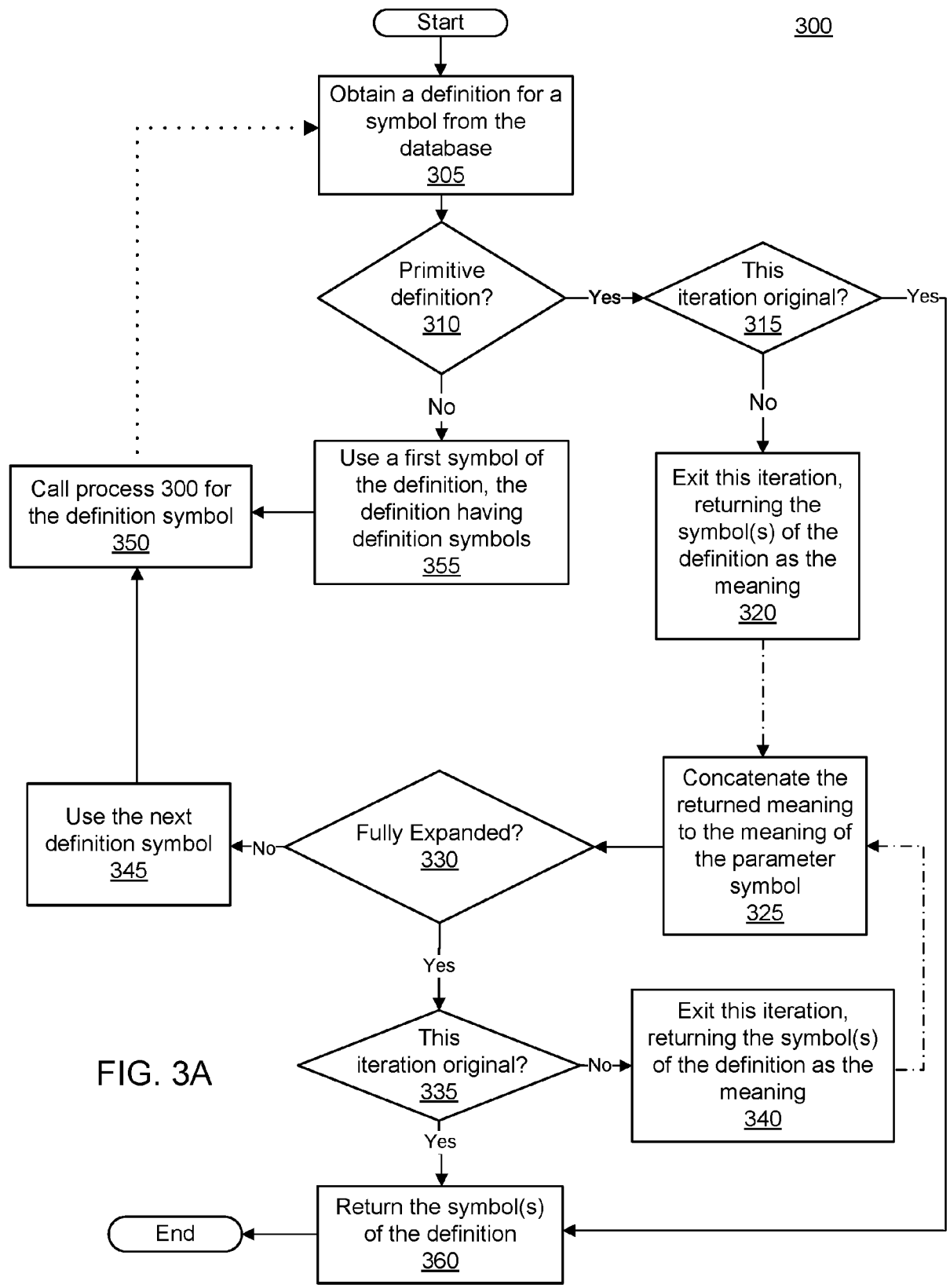
FIG. 3A is a flowchart illustrating example rules supporting an awareness capability in descriptive information terms, according to an implementation.

FIG. 3A is a flowchart illustrating an example iterative process 300 for acquiring awareness in descriptive information terms, according to an implementation. Omniphysical mind becomes consciously aware of descriptive content by establishing a symbol's meaning in the defined terms of the system. Process 300 may represent an awareness capability, also referred to as an awareness algorithm, which may be performed by the interpreter as part of step 230 of FIG. 2A, as well as at other times when the meaning of a symbol is determined. Process 300 allows a symbol-based information system to determine the meaning of any symbol in the data store, thereby acquiring various forms of awareness, depending on the symbol used to initiate the process. The interpreter may first obtain a definition for a particular symbol from the database (305). The particular symbol may be any of the symbols that comprise the symbol-based information system, as defined by the database, including special symbols. For the purposes of discussing FIG. 3A, the particular symbol may be referred to as the original parameter symbol, or the symbol that initiated the process. The interpreter may determine if the definition is a primitive definition (310). A definition is primitive if it can be expanded no further. A definition may be expanded no further if it includes only its corresponding symbol in the definition, for example if the definition of the parameter symbol includes only the parameter symbol itself. In some implementations, definitions may be marked or flagged as primitive in the data store. Any conventional or later discovered manner of marking the definition as primitive may be used. If the definition is primitive (310, Yes), the interpreter may have determined the meaning of the symbol. If the current iteration of process 300 is the original iteration (315, Yes), the interpreter may return the symbol(s) of the definition as the meaning of the original parameter symbol (360) and process 300 ends, having determined the meaning of the original parameter symbol.

If the definition is not primitive (310, No), the interpreter may iteratively call the awareness algorithm to determine the meaning of the symbols in the definition of the original parameter symbol. For example, the interpreter may select a first symbol from the definition (355) and call process 300 for the selected symbol (350). The selected symbol thus becomes the parameter symbol for the current iteration of process 300. The dotted line from 350 to 305 represents the iterative call in FIG. 3A. Process 300 may then begin for the selected symbol, which is now the parameter symbol for the current iteration. Thus, the interpreter may obtain the definition from the database (305) and determine whether it is primitive (310). If the definition is primitive (310, Yes), the awareness module may exit the iteration because this iteration is not the original iteration (315, No) and return the symbol(s) of the definition as the meaning of the current parameter symbol (320). The dot-dashed line in FIG. 3A between 320 and 325 represents the conclusion of the current iteration, returning the meaning to the calling iteration. The calling iteration thus becomes the current iteration. The interpreter may concatenate the returned meaning of the symbol to the meaning of the parameter symbol (325) and determine whether the definition of the parameter symbol is fully expanded (330). For example, if the parameter symbol for the current iteration had a definition that included two symbols, and only the first symbol was expanded, the definition is not fully expanded (330, No). Thus, the interpreter will select the next definition symbol (345) and call process 300 for the next symbol (350). Thus, the interpreter may iteratively invoke the awareness algorithm to determine the meanings of the symbols used in the definitions.

When a definition for a symbol is fully expanded (330, Yes), if the iteration is not the original iteration (335, No), the interpreter may end the iteration, passing the meaning of the symbol to the previous, or calling, iteration (340). The dot-dashed line in FIG. 3A between 340 and 325 represents the conclusion of the current iteration, returning the meaning to the calling iteration, making the calling iteration the current iteration. Once the symbols of the definition of the original symbol have all been fully expanded (330, Yes) and (335, Yes), the interpreter may return the symbol(s) of the definition (from step 325) as the meaning of the original parameter symbol (360) and process 300 may end. FIG. 3B is pseudo-code illustrating an example iterative process for acquiring awareness, according to an implementation. The pseudo-code of FIG. 3B is an example implementation of the awareness algorithm, which is also illustrated in FIG. 3A. The process for acquiring awareness may be represented by rules in the database, and the database may also store an awareness special symbol whose definition includes these rules.

The nature of the awareness capability represented by the awareness algorithm of FIGS. 3A and 3B is illustrated using FIG. 13 which illustrates an example of using the awareness algorithm to acquire awareness of a normal symbol. Primitive definitions are circled in FIG. 13 to assist with identification. In the example of FIG. 13, the information system acquires awareness of symbol $S_{10}$ from the data store using the awareness capability illustrated in FIGS. 3A and 3B. The interpreter may use the awareness algorithm illustrated in FIGS. 3A and 3B to generate the meaning of a symbol $S_{10}$, thereby acquiring awareness of $S_{10}$. In FIG. 13, the original invocation of process 300 for symbol $S_{10}$ is identified as iteration 1300. The interpreter may obtain the definition $D_{10}$ of $S_{10}$ from the data store which includes three symbols $S_{21}$, $S_{12}$, and $S_{23}$. This definition is not primitive, so the interpreter may invoke the awareness algorithm for the first symbol $S_{21}$. This iteration is identified as iteration 1301 in FIG. 13. The interpreter may obtain the definition $D_{21}$ for symbol $S_{21}$, which includes the symbols $S_5$ and $S_{14}$. Because this definition is also not primitive, the interpreter may use the awareness algorithm to obtain the definition of the first symbol $S_5$. This iteration is identified as iteration 1302 in FIG. 13. The interpreter may obtain the definition $D_5$ for symbol $S_5$ from the database. This definition is primitive because the definition is the $S_5$ symbol itself. The interpreter may return the definition of $S_5$ as a meaning for $S_5$ to iteration 1301. The returned symbol (e.g., $S_5$) is concatenated to the meaning of $S_{21}$, and the interpreter determines whether the definition for $S_{21}$ is fully expanded. Because $S_{14}$ has not been expanded, the interpreter calls the awareness algorithm for $S_{14}$, invoking iteration 1303 of FIG. 13. The definition of $S_{14}$ is not primitive, thus causing the interpreter to invoke iterations 1304 and 1305. When the meaning of $S_{14}$ is fully expanded, for example to $<S_{16}, S_{17}>$, this meaning is passed back to iteration 1301, which passes the meaning of $S_{21}$, namely $<S_5, S_{16}, S_{17}>$, to iteration 1300. This iterative process continues until iteration 1300 receives the meaning of $S_{12}$ (namely $<S_{18}, S_{19}>$) and $S_{23}$ (namely $<S_{11}, S_{30}>$). As each meaning is returned it is concatenated to form the meaning of $S_{10}$. Thus, the interpreter determines that the meaning $M_{10}$ of $S_{10}$ is $<S_5, S_{16}, S_{17}, S_{18}, S_{19}, S_{11}, S_{30}>$. By determining the meaning of $S_{10}$, the descriptive self has become aware of $S_{10}$.

As illustrated above, omniphysical mind gains awareness of a symbol by establishing its meaning in the defined terms of the system using the algorithm of awareness. We can represent that capability of awareness by an awareness special symbol, e.g., $S_{AWARE}$. As with any symbol, the self can become aware of this symbol by establishing its meaning. That is, by applying the algorithm of awareness to $S_{AWARE}$, it becomes aware of its capability of awareness. The particular rules by which a symbol's definition is fully expanded may collectively be referred to as the awareness algorithm, discussed above with regard to FIGS. 3A and 3B. In some implementations the awareness algorithm may be represented by a special symbol, for example the $S_{ALGO}$ symbol of FIG. 12B. Just as it can for any symbol, the system may use the algorithm of awareness to establish the meaning of $S_{AWARE}$ by fully expanding its definition. Representing the capability of awareness, the meaning of $S_{AWARE}$ is just the means of its awareness, namely the algorithm of awareness as represented by $S_{ALGO}$. In determining the meaning of $S_{AWARE}$, the system becomes aware of the process by which it becomes aware, e.g., as represented in the processing rules in the database. Thus, the system gains awareness of its capability to be aware. We can represent the ability of the system to be aware of its capability of awareness as $S_{AWARE/ALGO}$ (e.g., applying the algorithm of awareness to the $S_{AWARE}$ special symbol). We know that the descriptive self's awareness of its awareness is accurately grounded since the self uses the actual means of its awareness to be aware of its awareness.

Figure 14:
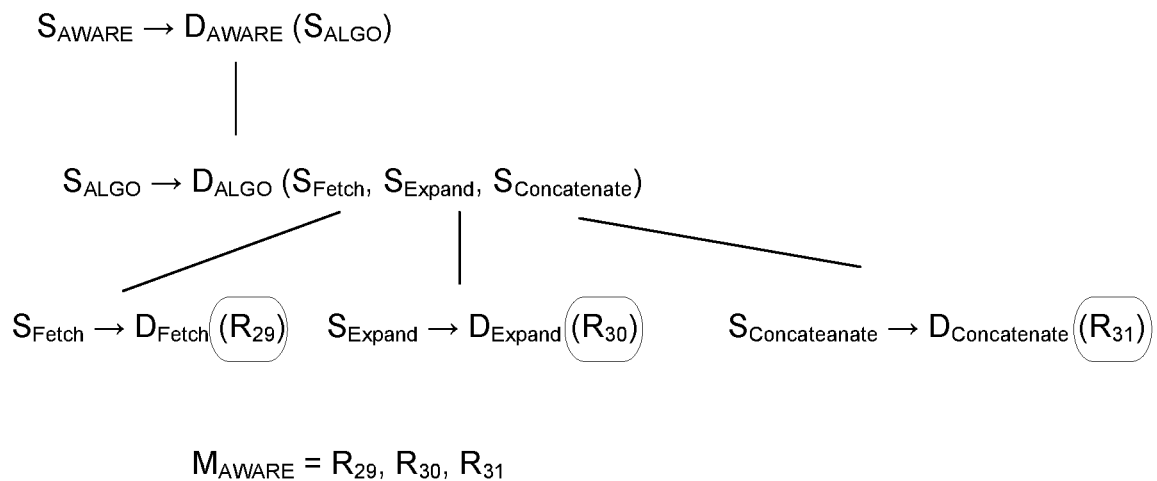
FIG. 14 is an example of acquiring awareness of being aware using the process for acquiring awareness and the data store of FIG. 12B.

FIG. 14 is an example of the system acquiring awareness of being aware using the awareness algorithm illustrated in FIGS. 3A and 3B. The system becomes aware of being aware by determining the meaning of the key symbol $S_{AWARE}$. Thus in the example of FIG. 14, $S_{AWARE}$ is the parameter symbol for process 300. The interpreter obtains the definition $D_{AWARE}$ from the database, which is the symbol $S_{ALGO}$, the symbol representing the algorithm of awareness. The definition of $S_{ALGO}$ may be the processing rules that comprise the awareness algorithm. Thus, the meaning of $S_{AWARE}$ (represented by $M_{AWARE}$ in FIG. 14) is the fully expanded definition of $S_{ALGO}$ which are the processing rules $R_{29}$, $R_{30}$, $R_{31}$.

Acquiring awareness of the descriptive information and capabilities of the system is accomplished in a similar manner using a database special symbol. The database special symbol, such as $S_{MIND}$ in FIG. 12B, represents the content and capabilities of the system. By gaining awareness of the meaning of this symbol, the system is able to be aware of its content and capabilities. We represent the system's ability to be aware of its content and capabilities as $S_{MIND/ALGO}$ (e.g., applying the algorithm of awareness to the contents of the database). It is understood that the meaning of $S_{MIND}$ may be determined by determining the meaning of each symbol in the data store using the awareness algorithm. In other words, using the examples of FIGS. 13 and 14 it is apparent how the system may reduce any of the contents of $S_{MIND}$ to primitives, to establish the meaning of $S_{MIND}$.

The descriptive self may acquire several forms of awareness. Previously, the symbol $S_{AWARE}$ was introduced, enabling the system to be aware of any of its content. As seen previously, $S_{AWARE/ALGO}$ may represent the capability of the system to be aware of its awareness. The $S_{AWARE/ALGO}$ symbol is an example of an aware of awareness symbol. An aware of awareness symbol may be another special symbol. The system may include an unlimited number of aware of awareness symbols, each representing a level of being aware of being aware. At a primary or initial level, the aware of awareness symbol is defined so that its meaning is the computational means by which the system becomes aware of its being aware. Just as it can for any symbol, the system can gain awareness of this symbol (e.g., $S_{AWARE/ALGO}$) by computing its expanded definition, thus becoming aware of its awareness of its awareness which can be represented by $S_{AWARE/AWARE/ALGO}$. The system may generate any degree of awareness of its awareness by the introduction of an appropriate symbol and the application of the awareness algorithm by which the system gains awareness of any symbol.

The system may also acquire awareness of its being aware of the meaning of a particular symbol. In this form of awareness, the system is aware of its capability to be aware of a particular symbol's meaning. In other words, the system is aware of its capability to establish the meaning of a particular symbol. For example, the system may have a symbol awareness symbol that is defined so that its meaning is the capability through which the system gains awareness of a particular symbol, or the awareness algorithm applied to the particular symbol. For example, the system may include any number of normal symbols generally designated by symbol $S_{10}$ and another symbol $S_{AWARE/10}$, where the meaning of the $S_{AWARE/10}$ symbol is the capability through which the system gains awareness of the $S_{10}$ symbol. This meaning may also be represented by $S_{ALGO/10}$ using a parameter of $S_{10}$. By generating the meaning of $S_{AWARE/10}$ the system becomes aware of its capability of being aware of symbol $S_{10}$. Because the particular description of which the system is aware is arbitrary and because the system uses the same algorithm to gain awareness of any description, the approach can be applied to any of the system's symbols, including the special symbols and normal symbols. The descriptive self can represent the system's capability to be aware of its awareness of any of its symbols by the symbol $S_{AWARE/10/ALGO}$.

Self-Initiate Capability

Figure 4:
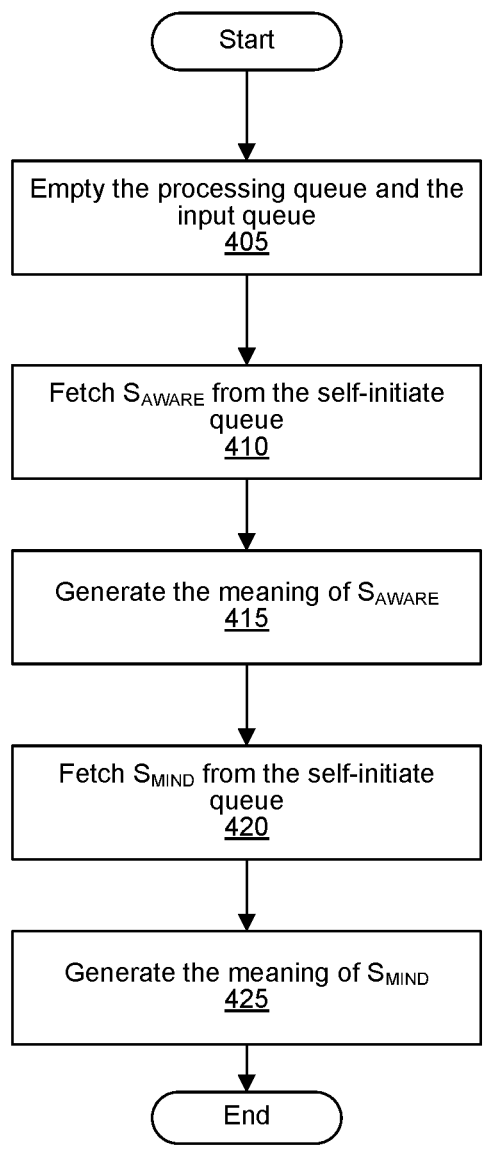
FIG. 4 is a flowchart illustrating example rules supporting a self-initiate capability, according to an implementation.

FIG. 4 is a flowchart illustrating example rules supporting a self-initiate capability, according to an implementation. The rules supporting the self-initiate capability may be associated with a self-initiate special symbol, the meaning of which is rules represented by process 400. In some implementations, the interpreter may initiate the self-initiate capability by placing the self-initiate special symbol in the processing queue, for example as in step 220 of FIG. 2A. This special symbol represents the system's ability to maintain its selfdom. The self-initiate capability allows the system to be aware and self-aware as a result of its own internal operations. It does this by calling into awareness the special symbols enabling the self to be fully self-aware, that is, by being aware both of its capability of awareness as well of all of its content and capabilities. The first is the awareness special symbol representing the system's capability of awareness (e.g., $S_{AWARE}$.). By becoming aware of meaning of this symbol, the system becomes aware of its capability of awareness. We can represent the ability of the system to be aware of its capability of awareness as $S_{AWARE/ALGO}$. The other is $S_{MIND}$, the special symbol representing the content and capabilities of the system. By gaining awareness of the meaning of this symbol, the system is able to be aware of its content and capabilities. We represent the system's ability to be aware of all of its content and capabilities as $S_{MIND/ALGO}$. The self-initiate process 400 may draw on a self-initiate queue (Qs). The self-initiate queue may be a data structure in memory filled by these special symbols giving rise to self-awareness.

For example, process 400 may begin with rules that cause the system to empty the processing queue and the input queue (405). While the self-initiate capability may be called in the absence of inputs, it may also be called in the presence of improper or invalid inputs, as explained in more detail with regard to FIGS. 5 and 7. Accordingly, the processing queue and/or input queue may have entries that are not to be processed further so as to preserve the content of the system. Emptying the queues in such circumstances ensures the entries are not processed in ways that could harm the system. The rules may cause the system to fetch an awareness special symbol from the self-initiate queue (410). The awareness special symbol is a symbol-based representation that the system has the capability of awareness. That is, the awareness special symbol represents that the system has the ability to establish a symbol's meaning by fully expanding the symbol's definition. The $S_{AWARE}$ symbol of FIG. 12B is one example of an awareness symbol. The particular rules by which a symbol's definition is fully expanded may collectively be referred to as the awareness algorithm, discussed above with regard to FIGS. 3A and 3B. In some implementations the awareness algorithm may be represented by a symbol, for example the $S_{ALGO}$ symbol of FIG. 12B. The rules may cause the system to generate the meaning of the awareness special symbol (415). Just as it can for any symbol, the system may use the algorithm of awareness to fully expand the definition of $S_{AWARE}$. In determining the meaning of $S_{AWARE}$, the system becomes aware of the process by which it becomes aware, e.g., as represented in the processing rules in the database. Thus, the system gains awareness of its being aware. Although the example of FIG. 12B uses a symbol $S_{ALGO}$ to represent the algorithm of awareness, in some implementations the $S_{AWARE}$ symbol may represent the algorithm of awareness. In other words, the definition of $S_{AWARE}$ may be "$R_{29}, R_{30}, R_{31}$," or any definition that fully expands to the rules defining the algorithm of awareness. In either case, applying the algorithm of awareness to the awareness symbol allows the system to acquire awareness of its being aware.

The rules may also cause the system to fetch a database special symbol from the self-initiate queue (420). The definition of the database special symbol represents all the data of the data store, including rules, normal symbols, special symbols, and categorization scheme symbols, and their definitions. The rules may cause the system to generate the meaning of the database special symbol (425). Generating the meaning of the database special symbol may enable the system to acquire awareness of its content, including its capabilities. Thus, once the system acquires awareness of its being aware (e.g., step 415) and awareness of all of its information (e.g., step 425), it is self-aware. Thus, awareness of its information is a second requirement for the information system to have self-awareness. All of the content and processing capabilities of the system are either themselves primitives or expressible as primitives. A symbol is primitive if its definition is the symbol itself (for example in FIG. 12A, $S_1=D_1(S_1)$) or the symbol is designated as primitive, such as rules and belong-to-category symbols. Other symbols, such as $S_{MIND}$, $S_{AWARE}$, and $S_{102}$, are not primitives because their definitions are comprised of other symbols. Each of their definitions can be fully expanded until the meaning of the symbol is expressed in terms of primitives. For example, $S_{MIND}$ represents the entire contents of the database. The system is able to gain awareness of its own content and processing capabilities by establishing the meanings of those contents. It does this by applying the algorithm of awareness to fully expand the definition of any of the contents of its data store. We use the symbol $S_{MIND/ALGO}$ to represent the ability of the system to be aware of the contents of its data store - the meanings of its symbols, definitions, preference sets, reference lists, and processing rules.

Format Capability

Figure 5:
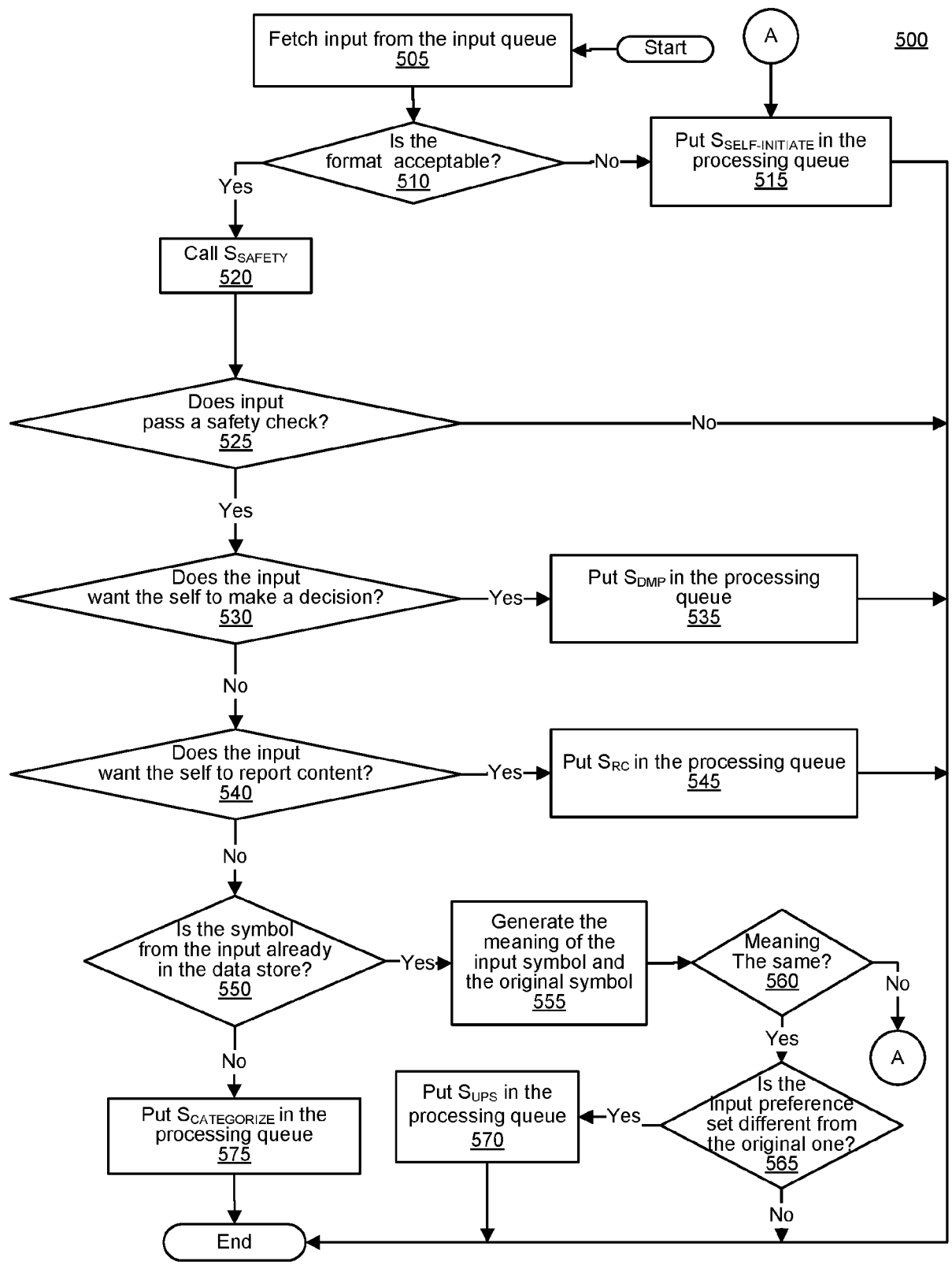
FIG. 5 is a flowchart illustrating example rules supporting a format capability, according to an implementation.

FIG. 5 is a flowchart illustrating example rules supporting a format capability, according to an implementation. The rules supporting the format capability may be represented by process 500. The format capability enables the system to determine if the format of the input is appropriate for processing. If the input is appropriate for processing, the format capability may determine whether or not the input requests a decision, requests reporting of information, or is adding a new symbol to the data store and initiate the appropriate capability to handle the input. The format capability may be represented by a format special symbol, whose definition contains the symbols representing the processes by which the format of an incoming symbol is checked for system compatibility. The meaning of the definition is the rules supporting the format capability. In some implementations, the interpreter may initiate the format capability by placing the format special symbol in the processing queue, for example as in step 215 of FIG. 2A. The input processed in the format capability represents information from an external environment. To be processed by a self that exists in descriptive terms, that information must be descriptive. Inputs could arise directly from descriptive sources.

The format capability may begin with rules that cause the system to fetch the input from the input queue (505). The rules may then cause the system to determine whether the format of the input is acceptable (510). Determining whether the format is acceptable may in itself involve other special symbols. For example, the system may include a special symbol for each format check performed on the input. In one implementation, a first format check may include a first rule to determine whether the input includes three portions: a symbol, its definition, and its preference set. A preference set includes a utility for the symbol and a privacy rating. The utility may represent a preference accorded to the symbol and may be numeric. The privacy rating may represent the degree of confidentiality accorded to the symbol and may be numeric. A utility or privacy rating for a symbol may include a null value, indicating that no numeric value has been assigned. In some implementations, the null value can be the word "null" or a numeric value that is not a valid utility or privacy rating. Special symbols (e.g., for special symbols, such as the decision special symbol) are assigned a utility of null but may have a non-null value for the privacy index. If the input is does not include the three portions for the symbol, its definition, and it preference set, the input is not acceptable.

The first format check may also include a second rule to determine whether any of the portions is empty. If any portions are empty, the input is not acceptable. A third rule may determine whether the first portion includes one symbol. If the first portion includes more than one symbol, the input is not acceptable. If the input is not acceptable (510, No), the rules associated with the first format check may put the self-initiate special symbol in the processing queue (515), which causes the system to reject the input by initiating the self-initiate capability.

If the input is acceptable for processing (510, Yes), the rules may call the safety capability (520). The safety capability may provide an infrastructure allowing the system to reject harmful or dangerous symbols from the system before they are stored in the content or capabilities portions of the data store. In some implementations, the rules may call the safety capability by placing the $S_{SAFETY}$ symbol in the processing queue. The safety capability is discussed in more detail with regard to FIG. 7. If the input fails to pass the safety check (525, No), process 500 ends. As discussed in more detail with regard to FIG. 7, this may occur because the rules call the self-initiate capability by placing the self-initiate special symbol in the processing queue, which has the effect of cancelling the format capability.

If the input does pass the safety check (525, Yes), the rules may cause the system to determine whether the input requests a decision (530) in the form of evaluating alternatives as the underlying basis for a decision. In one implementation the system may determine whether the symbol in the first portion of the input is a decision special symbol by which the system requests decisions (e.g., a decision special symbol). For example, the system may determine whether the symbol in the first portion of the input represents a decision making request ($S_{DMR}$). If so (530, Yes), the rules may cause the system to put a decision making process special symbol (e.g., $S_{DMP}$) in the processing queue (535). The decision making special symbol represents that the system has the ability to make decisions based on its requirements and make the best choice according to its preferences, and is discussed in more detail with regard to FIG. 6.

If the input does not request a decision (530, No), the rules may cause the system to determine whether the input is a report request (540). In one implementation, the system may determine whether the symbol in the first position of the input is a report request special symbol which the system requests a report of the content of the system. For example, the system may determine whether the symbol in the first portion of the input is $S_{REPORT\text{-}REQUEST}$. If so (540, Yes), the rules may cause the system to put a report content special symbol in the processing queue (545). The report content special symbol (e.g., $S_{RC}$) represents that the system has the ability to provide the normal symbols, including their preference sets and their values, to an external interface, and is discussed in more detail with regard to FIG. 11.

If the input does not request reporting content (540, No), the system may determine whether the symbol from the first portion of the input is already in the data store (550). If the symbol is already in the database (550, Yes), the system may generate the meaning of the definition from the input from the data store, acquiring awareness of the symbol (555). After generating the meaning of the input symbol, the system may determine whether the meaning is the same (560). In other words, the system may compare the meaning of the input symbol with the meaning of the original symbol in the data store. In some implementations, the system may determine the meaning of the original symbol as part of step 555. If the meaning of the inputted symbol is different (560, No), the system may consider the input invalid as a symbol cannot change its meaning. Thus, the system may put the self-initiate special symbol in the processing queue (515).

If the meaning is the same (560, Yes), the system may determine whether the preference set for the input has changed (565) by comparing the third portion of the input with the preference set for the OMSS of the symbol in the data store. If the preference set has changed (565, Yes), the system places $S_{UPS}$ in the processing queue (570), which will invoke the process that updates the preference set for a symbol. If the symbol is a new symbol that is not already in the data store (550, No), the rules may cause the system to initiate a categorization capability, for example by placing a categorization special symbol (e.g., $S_{CATEGORIZE}$) in the processing queue (575). The categorization special symbol may represent the process of categorization, e.g., the categorization capability, and the rules may cause the system to put the categorization special symbol in the processing queue (575) to initiate the categorization process, e.g., via the interpreter. With symbols in the processing queue, the format capability may end, allowing the interpreter to handle the input in accordance with FIG. 2A, for example.

Decision Capability

Figure 6:
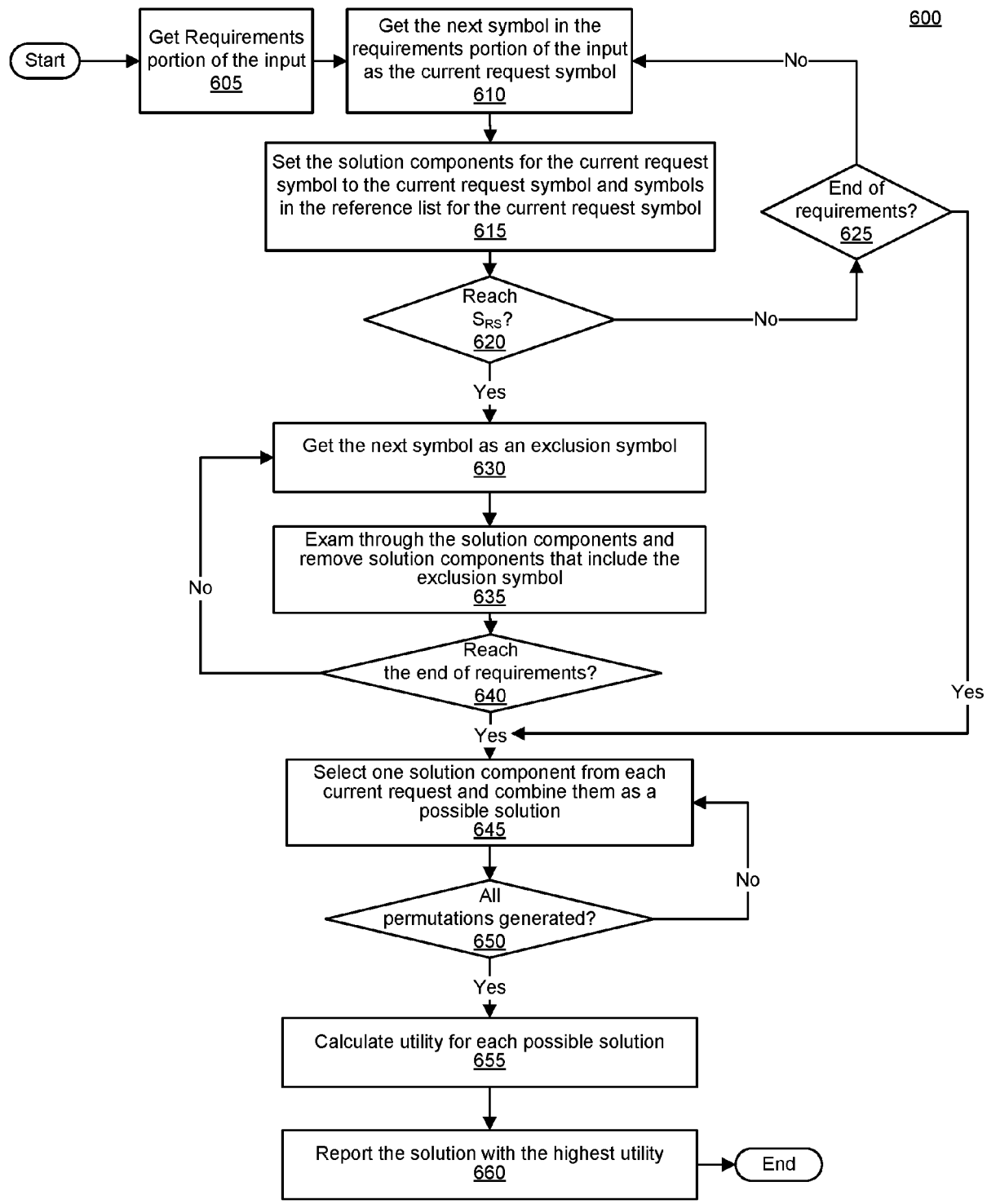
FIG. 6 is a flowchart illustrating example rules supporting a decision making capability, according to an implementation.

FIG. 6 is a flowchart illustrating example rules supporting a decision capability, according to an implementation. The rules supporting the decision capability may be represented by process 600. Using the decision capability, the descriptive self is able to make optimal decisions based on its self interest. The self generates solutions that meet its requirements and then chooses the preferred solution from among those. The requirements may include attributes that a solution must possess as well as those that the solution must not possess. From among the solutions that meet the requirements, the self is able to choose the one which ranks highest in terms of its preferences. As a capability of the infrastructure, the decision process is completely general, able to be applied for any requirements, attributes, and preference sets.

The decision making capability of the descriptive self mirrors a human approach to decision making, one that is consistent with and ultimately based on utility maximization but which is structured to reduce computational demands. For example, while it is possible to compute the utility of the entire universe of options as the basis of arriving at a decision, the 'requirements approach' truncates the process by eliminating from consideration requirements with low or negative utility. For example, when deciding where to eat lunch when located at a particular point one could calculate the utilities of the universe of options: all places purveying food in Paris, Milan, Bermuda, etc.; the various means of purveyance: food cart, cafeteria, restaurant, etc.; the means of getting there; taxi, walk, swim, etc. Instead of making all the possible computations the requirements approach, employed by humans, deploys requirements which eliminate options whose preference/utility in the particular choice situation is so low/negative as to be foreclosed as options. Thus, we set requirements which reflect underlying preferences such as: the food must be within one-half mile of the present location; lunch must cost less than $30; I must be able to walk, etc. These requirements produce a choice set from which the ultimate choice based on explicit utility calculations is made.

The data store of the descriptive self may be structured to support the decision making capability. For example, the normal symbols stored in the content portion of the data store may be associated with (among other things) its definition; its categorization; and its preference set (utility and/or privacy). In some implementations, this information may be stored in an OM symbol structure for the symbol. In addition, a symbol may also be associated with a reference list, i.e., a list of all other normal symbols that contain the symbol in their definitions and/or the memory address of each of those symbols. This information may also be included in the OM symbol structure. These features of the OM symbol structure may support both the selection of choices meeting requirements as well as the choice among qualified solutions. For example, a decision requirement may specify that each solution includes content represented by $S_1$. By accessing the OMSS of $S_1$ (e.g., the reference list), the system can produce all symbols containing $S_1$ in their definition, which is the list of symbols meeting that requirement. The capability enables any number of attributes that must either be included or be excluded, the ability to assemble all solutions meeting the requirements, and the ability to choose from among that set of solutions the one with the highest utility.

As discussed above, input that is appropriate for processing has three portions, the first portion including a single symbol. In the case of input that requests a decision, the first symbol may be a decision special symbol recognized by the system as a request for a decision, for example $S_{DMR}$. The second portion of the input is a definition that includes positive and negative decision requirements. A positive decision requirement is one that must be part of any solution while a negative decision requirement indicates what must be excluded from any solution. Positive requirements appear before a special separator symbol $S_{RS}$ while negative decision requirements appear after $S_{RS}$. A decision request may include any number of positive or negative requirements and a negative requirement is optional. Each requirement is represented by a normal symbol. In some implementations, the positive requirements may be one or more normal symbols separated by a delimiter. Thus, positive requirements portion may include one or more requirements. A negative requirement represents one or more normal symbols that cannot be present in the preferred solution. The negative requirement portion is optional and any negative requirements may follow a separator special symbol (e.g., $S_{RS}$).

The system recognizes the decision special symbol as a request to evaluate the requirements represented in the request based on the utility of proposed solutions make a decision among the solutions. Each normal symbol may have a utility component. A decision making special symbol, for example $S_{DMP}$, may represent the decision capability. Its definition is the algorithm by which the system determines solution components that correspond to the requirements, determines potential solutions from the solution components, ranks the potential solutions, and selects a potential solution with the greatest utility. Its meaning is the rules of the algorithm. In some implementations, the interpreter may initiate the decision capability by placing the decision making special symbol in the processing queue, for example as in step 535 of FIG. 5.

The decision capability may begin with rules that cause the system to fetch the positive requirements portion of the input, e.g., from the second portion of the input (605). The rules may cause the system to get the next symbol in the first requirement (610). This symbol represents a current request symbol. The rules may then use the current request symbol to obtain the normal symbols from the data store whose definition includes the current request symbol (615). In some implementations, this may include using the reference list of an OM symbol structure. For example, the system may look in the reference list portion of the OM symbol structures for symbols that include the current request symbol in their definition. For each match, the system may store the matching symbol as one solution component for the first requirement. The system may also store the current request symbol itself as a solution component. The current request symbol and each symbol in a reference list for the current request symbol may be considered a separate solution component for the first requirement. Thus, for example, step 615 may result in five symbols that are potential solution options.

The rules may cause the system to determine if the negative requirement portion has been reached (620). If it has not (620, No), the system may determine if there is another positive requirement (e.g., whether the end of the positive requirements has been reached) (625). If the end of the positive requirements has not been reached (625, No), the rules may cause the system to get the symbol for the next requirement as the current request symbol (610) and look for solution components for this next request (615) as described above. The second requirement may also have a number of solution components. The rules may cause the system to continue determining solution components for each requirement until the end of the positive requirements is reached (625, Yes) or a negative requirement is encountered (620, Yes).

If the system encounters the optional negative requirement (620, yes), the rules may cause the system to get the next symbol in the input (e.g., the symbol following the $S_{RS}$ symbol) (630). Symbols following the separator special symbol $S_{RS}$ are negative requirements that will be used to eliminate solution components. For example, the rules may cause the system to inspect the solution components identified (e.g., during step 615 for each requirement) and eliminate any solution component that includes the exclusion symbol (635). If there is another symbol in the negative requirement (640, No), the rules may cause the system to get the next symbol in the negative requirement (630) and repeat the inspection of solution components, removing those that include this next exclusion symbol (635). This continues until the end of the request (640, Yes).

When the symbols of the request have been processed (625, Yes) or (640, Yes), the system has a quantity of solution components for each positive requirement in the decision request. The rules may cause the system to generate a series of possible solutions, e.g., solution combinations (645). Each possible solution may include one solution component for each requirement. Thus, for example, if requirement 1 has 3 solution components, requirement 2 has 2 solution components, and requirement 3 has 4 solution components, the rules may cause the system to generate 3×2×4 possible solutions. When all permutations of the solution components from the requests have been generated (650, Yes), the rules may cause the system to calculate a utility for each possible solution (655). The utility may be the sum of the utility components for the symbols that make up the possible solution. As indicated previously, each normal symbol may have an associated utility included in the preference set. In some implementations, the system may select the possible solution with the highest utility (660) and report the solution.

With the solution representing the result of the decision reported out, process 600 ends. It is understood that FIG. 6 represents one example of a decision capability, and that the system may include other similar decision capabilities, such as a decision capability for determining a symbol with a lowest utility from among a plurality of requirements, and/or a decision capability for determining whether two requirements have equivalent utility, etc. It is also understood that implementations may include positive requirements separated by a delimiter and each request may include more than one normal symbol.

An example of the decision capability for an example request $\{S_{101}S_{103}S_{RS}S_{104}\}$ and the data store of FIG. 12A follows. The example request represents the second portion of the input that requests a decision, e.g., via an $S_{DMR}$ special symbol. The decision capability may first get the positive requirement of the request, namely $S_{101}$. This represents the current request symbol. The system may look for symbol that includes the definition of the current request symbol in their definition. In some implementations, such symbols may be associated with the current request symbol, for example in a reference list of an OM symbol structure. Thus, the system, by accessing the OM symbol structure for the current request symbol, can determine the solution components for the first request. Of course, it is understood that the system may also query the data store for symbols that include the definition of the current request symbol in their definitions. As illustrated in FIG. 12A, the $S_{101}$ symbol has one symbol in its reference list, namely $S_{102}$. Thus, the system determines that the solution components for the first requirement are $S_{101}$ and $S_{102}$. The system has failed to reach the end of the positive requirements, so the system may get the next positive requirement, namely $S_{103}$. The system may look for symbols that include the symbols of the definition of $S_{103}$ in their definition, as discussed above. FIG. 12A illustrates that $S_{103}$ has one symbol in its reference list, namely $S_{104}$. The system may accordingly determine that the solution components for the second requirement are $S_{103}$ and $S_{104}$.

The system may determine that it has reached the optional negative requirement component (e.g., designated by the special symbol $S_{RS}$). The system may read the normal symbol following the special symbol designating a negative requirement, in this example symbol $S_{104}$. This symbol is an exclusion symbol, meaning that any solution component that includes $S_{104}$ should be removed from the set of solution components. The first set of solution components do not include $S_{104}$, but the set for the second requirement does. Thus, the system may remove $S_{104}$ from the second set, leaving the set to include just one solution component, namely $S_{103}$.

The system may then determine that the end of the requirements has been reached (as no more symbols are in the request. The system has thus determined two sets of solution components, $\{S_{101}, S_{102}\}$ and $\{S_{103}\}$. The system may select one component from each set to generate a potential solution. For example, the system may determine the potential solutions for the given sets of solution components are $\{S_{101}, S_{103}\}$ and $\{S_{102}, S_{103}\}$. The system may calculate a utility for each potential solution based on the utility of the solution components. In some implementations, the utility may be the sum of the utility component for each symbol in the possible solution. Using the example of FIG. 12A, the utility for $\{S_{101}, S_{103}\}$ is $S_{U101} + S_{U103}$. Of course, utility may also be calculated by multiplication, averaging, or some other combination of the symbol utilities. Similarly, the system may determine that the utility of the second possible solution $\{S_{102}, S_{103}\}$ is $S_{U102} + S_{U103}$. The system may select the possible solution with the highest utility and report the solution.

Safety Capability

Figure 7:
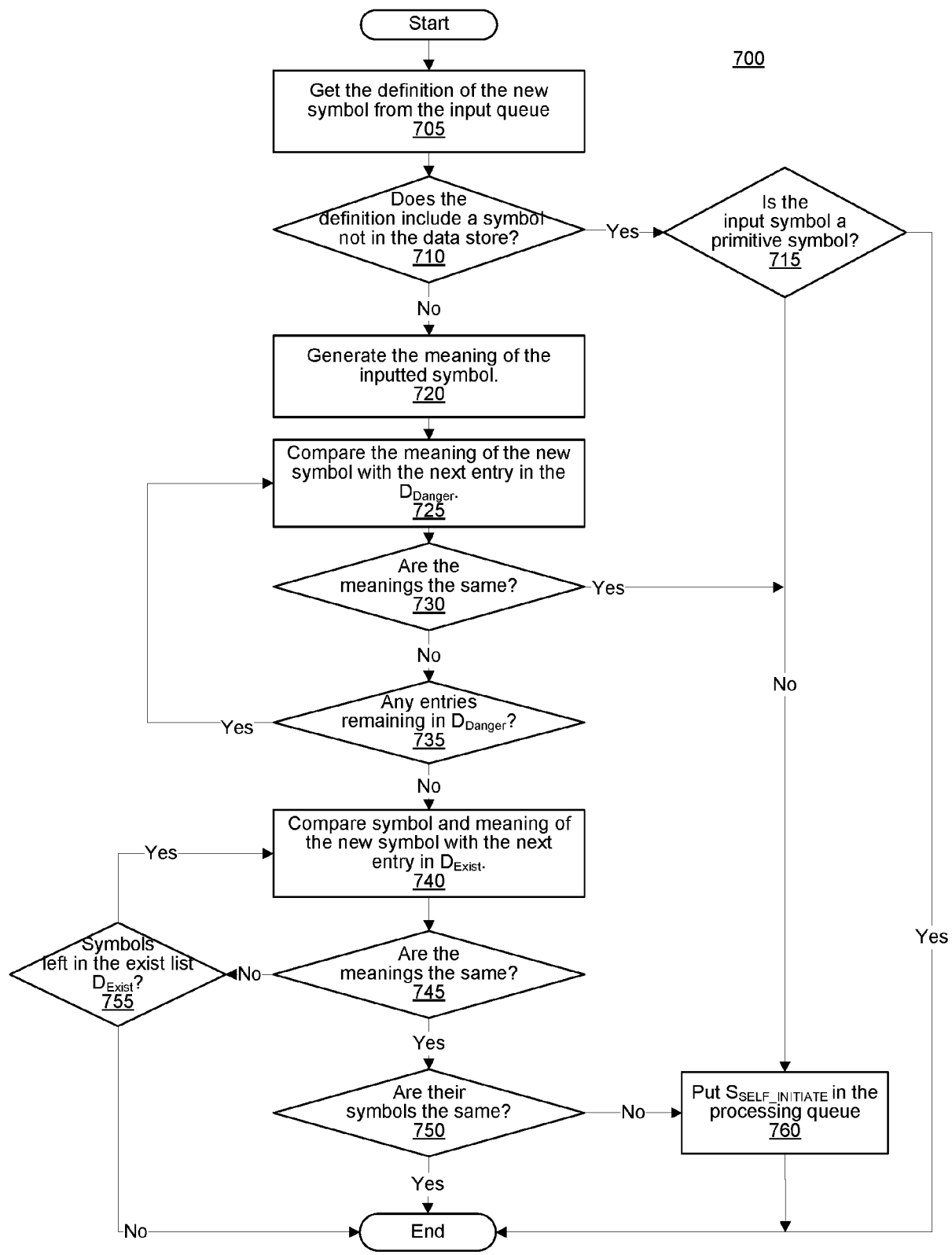
FIG. 7 is a flowchart illustrating example rules supporting a safety capability, according to an implementation.

FIG. 7 is a flowchart illustrating example rules supporting a safety capability, according to an implementation. The descriptive self interacts with its external descriptive environment. This includes processing new symbols and new preference sets for existing symbols. As part of processing input symbols, which may be new or existing symbols, the rules associated with the safety capability provide an infrastructure allowing the system to reject harmful or dangerous symbols from the system before they are stored in the content or capabilities portions of the data store. The safety capability is one aspect of persistence. The safety capability may be represented by a safety special symbol. The definition for the safety special symbol is the algorithms through which the system compares the meaning of an input with a list of prohibited symbols and/or ensures that any meaning is not represented by more than one symbol. The meaning of the safety special symbol is the rules of the algorithm. In some implementations, the interpreter may initiate the safety capability by placing the safety special symbol in the processing queue, for example as in step 520 of FIG. 5.

The safety capability may begin with rules that cause the system to fetch the definition of the input symbol from the input queue (705). For example, the input symbol may be on the input queue and the rules may cause the system to fetch the input symbol and its definition from the input queue and determine if any symbols in the definition are not contained in the data store (710). If yes, the rules may then cause the system to determine if the symbol is primitive (715) (i.e., if the meaning is the same symbol as the definition). If the input symbol is not primitive (715, No), the system is unable to determine the meaning because one or more of the symbols in the definition is not already in the data store, and the rules may cause the system to reject the input by initiating the self-initiate capability. For example, the system may put a self-initiate special symbol in the processing queue (760). The safety capability then ends, allowing the interpreter to process the self-initiate special symbol, including clearing the rejected symbol from the input queue, in accordance with FIG. 2A, for example. If the input symbol is primitive. Process 700 ends because primitive symbols are not harmful and the system has already determined the symbol is not already in the data store.

If the definition includes only symbols already in the data store (710, No), the rules may cause the system to generate the meaning of the input symbol (720). The rules may also retrieve a list of prohibited or unsafe symbols and their meanings and compare the meaning of the input symbol with the meaning of the first symbol in the list of prohibited symbols (725). In some implementations, this list may be represented by a danger list symbol, e.g., $D_{Danger}$ illustrated in FIG. 12A. In general, the prohibited symbols include any symbol whose meaning is a process that alters or disrupts the functioning of any existing special symbol. The system may accept new special symbols, e.g., for evaluating input from new sensors/templates, so long as these do not alter existing special symbols and do not disrupt the functioning of an existing special symbol. If the input symbol is found to alter or disrupt the functioning of an existing special symbol it is added to the prohibited symbols represented by the danger list symbol. The safety capability may cause the system to compare the meaning of each symbol in the list of prohibited symbols to the meaning of the input symbol. If the meaning of a symbol from the prohibited list matches the meaning of the input symbol (730, Yes), the safety capability may cause the system to initiate the self-initiate capability, thus rejecting the input symbol. For example, the system may put a self-initiate special symbol in the processing queue (760). The safety capability then ends, allowing the interpreter to process the self-initiate special symbol, including clearing the rejected symbol from the input queue, in accordance with FIG. 2A, for example.

If the meaning of the input symbol does not match the meaning of the symbol from the prohibited list (730, No), the safety capability may cause the system to select the next symbol in the prohibited list (735, Yes) and repeat the steps 725 to 730, comparing the meaning of the next symbol in the list of prohibited symbols to the meaning of the input symbol. If all symbols in the prohibited list have been examined (735, No), the safety capability may cause the system to compare the meaning of the input symbol with the meaning of a first symbol in a list of existing normal symbols and special symbols and their meanings (740). In some implementations the list of existing symbols and their meanings may be represented by a list symbol, such as $D_{Exist}$ illustrated in FIG. 12A.

If the meaning of the input symbol does not match the meaning of the first symbol from $D_{Exist}$ (745, No), the rules may cause the system to get a next symbol from the list (755, Yes) and repeat steps 740 and 745. If all symbols in $D_{Exist}$ have been examined (755, No), the safety capability may end, having verified the new symbol does not have the same meaning as an existing symbol and is not harmful to the system.

If the meaning of the input symbol does match the meaning of a symbol in $D_{Exist}$ (745, Yes), the rules may cause the system to determine if the symbols are the same (750). Put another way, the system may determine if the input symbol is already in the data store. If the two symbols are the same (750, Yes), the safety capability ends, having verified the input is not creating a new symbol with an existing meaning. If the input is a different symbol with the same meaning as an existing symbol, the system may reject the input symbol. For example, the system may place a self-initiate special symbol in the processing queue (760), which will clear the rejected symbol from the input queue, as explained above.

Categorize Capability

Figure 8:
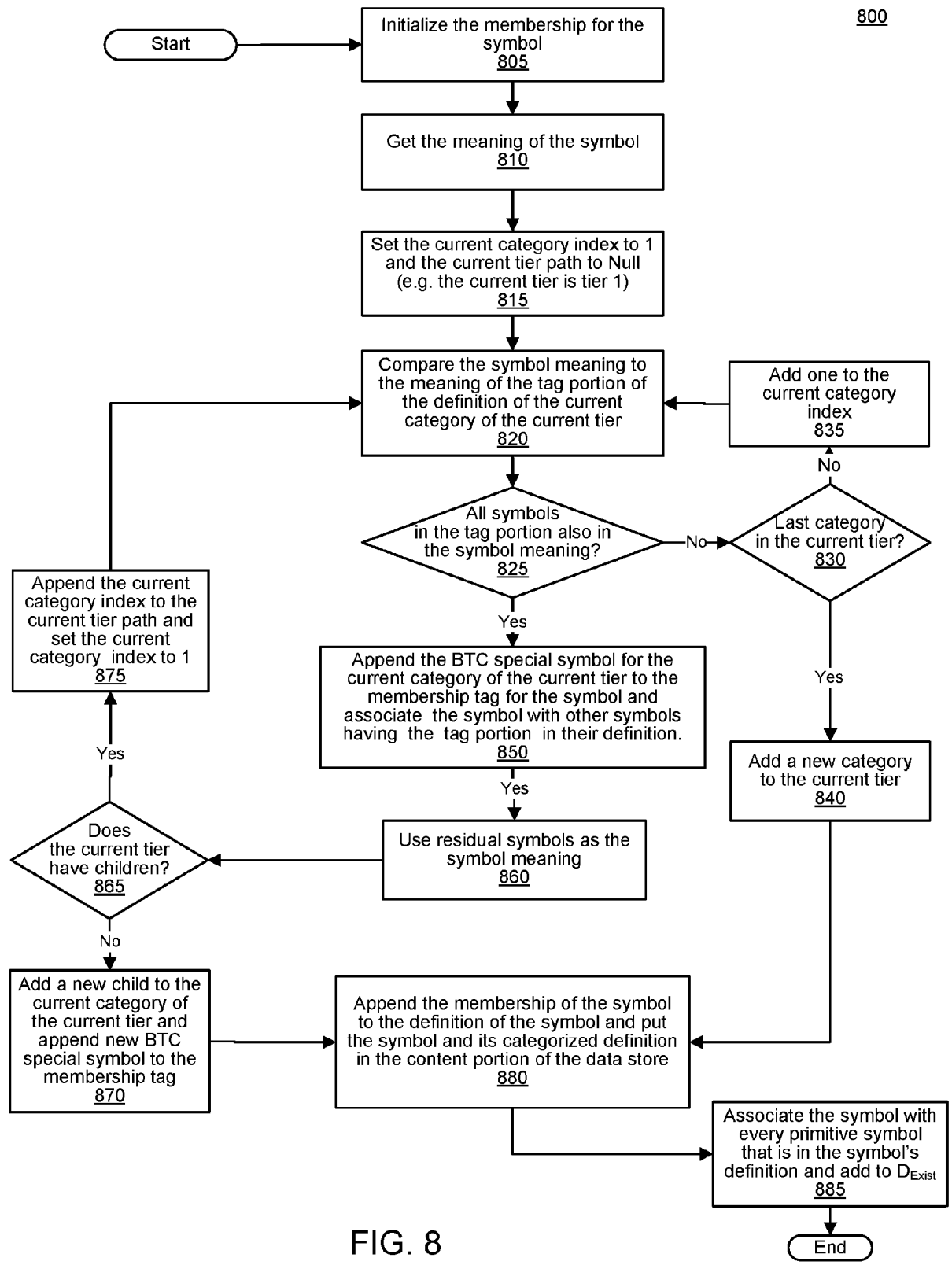
FIG. 8 is a flowchart illustrating example rules supporting a categorization capability, according to an implementation.

FIG. 8 is a flowchart illustrating example rules supporting a categorization capability, according to an implementation. It is understood that the categorization scheme illustrated in FIG. 8 is one example, and implementations are not limited to the categorization scheme illustrated. As discussed above, processing new symbols with new definitions allows the descriptive self to grow from its initial state, e.g., to interact with an external environment and increase its information content. When the descriptive self receives a new symbol, it may categorize the new input into an existing categorization scheme. In some implementations, the scheme may be a hierarchical, e.g., organized in a tree structure. In such an implementation, more general categories are in the top level, or tier one, a tier closest to the root. In some implementations, categories within a tier are defined so as to be mutually exclusive. Each of the tier one categories may have zero or more children, or subcategories. The children of tier 1 categories are tier 2 categories. Each of these may have zero or more children, or subcategories, etc. In some implementations, when a subcategory includes only primitive symbols (e.g., symbols whose meaning is the same as its definition), no further subcategories may be possible. In such an implementation, the categories are reducible to primitives and thus the leaves of the categorization tree are primitives.

The categorization capability enables the system to determine which categories in the category scheme a symbol belongs to. If a symbol does not evaluate into existing categories, the categorization capability may allow the system to expand the categorization scheme to accommodate the new information. For example, when the input is not capable of categorization within the existing structure, the system is capable of creating new categories and/or subcategories to incorporate the symbol and its definition into the scheme. The categorization capability is an aspect of content processing. The capability of the system to categorize normal symbols into the categorization scheme may be represented by a categorization special symbol. The definition for the categorization special symbol is the algorithm through which the system compares the meaning of an input against a categorization scheme, determines where within the scheme the input exists, including adding new categories and/or subcategories when necessary, and records the determination in the data store. The meaning is the rules underlying the algorithm. In some implementations, the interpreter may initiate the categorization capability by placing the categorization special symbol in the processing queue, for example as in step 575 of FIG. 5.

The categorization capability may categorize a validated input, e.g., an input that has passed the formatting requirements of the format capability, e.g., as represented by the format special symbol. As discussed above, the input appropriate for processing may include three portions. The first portion includes the symbol to be categorized, the second portion includes a definition for the symbol, and the third portion includes a preference set for the symbol. The utility may be null and the privacy rating may be preset for special symbols and categorization scheme symbols. The symbols of the definition from the second portion of the input may be ordered from most general to least general. The object of the categorization capability is to determine a membership tag for the symbol, the membership tag representing each category and sub-category that the symbol belongs to. The membership tag may represent a path in the categorization scheme, for example from the root to one or more of the leaves. The membership tag may be appended to the definition of the symbol, which results in a categorized definition. The categorized definition may be stored in the data store.

The categorization capability may include rules that cause the system to initialize the membership tag for the symbol (805). For example, the system may start with an empty string for the membership tag, as one example. In some implementations, the membership tag may be appended directly to the end of the definition for the symbol. Thus, at the beginning of the categorization process the membership tag is assumed to be empty. The rules may cause the system to determine the meaning of the symbol, for example, expanding the definition from the second portion of the input (810). As explained above, the meaning is the definition of the symbol reduced to primitives.

Figure 9:
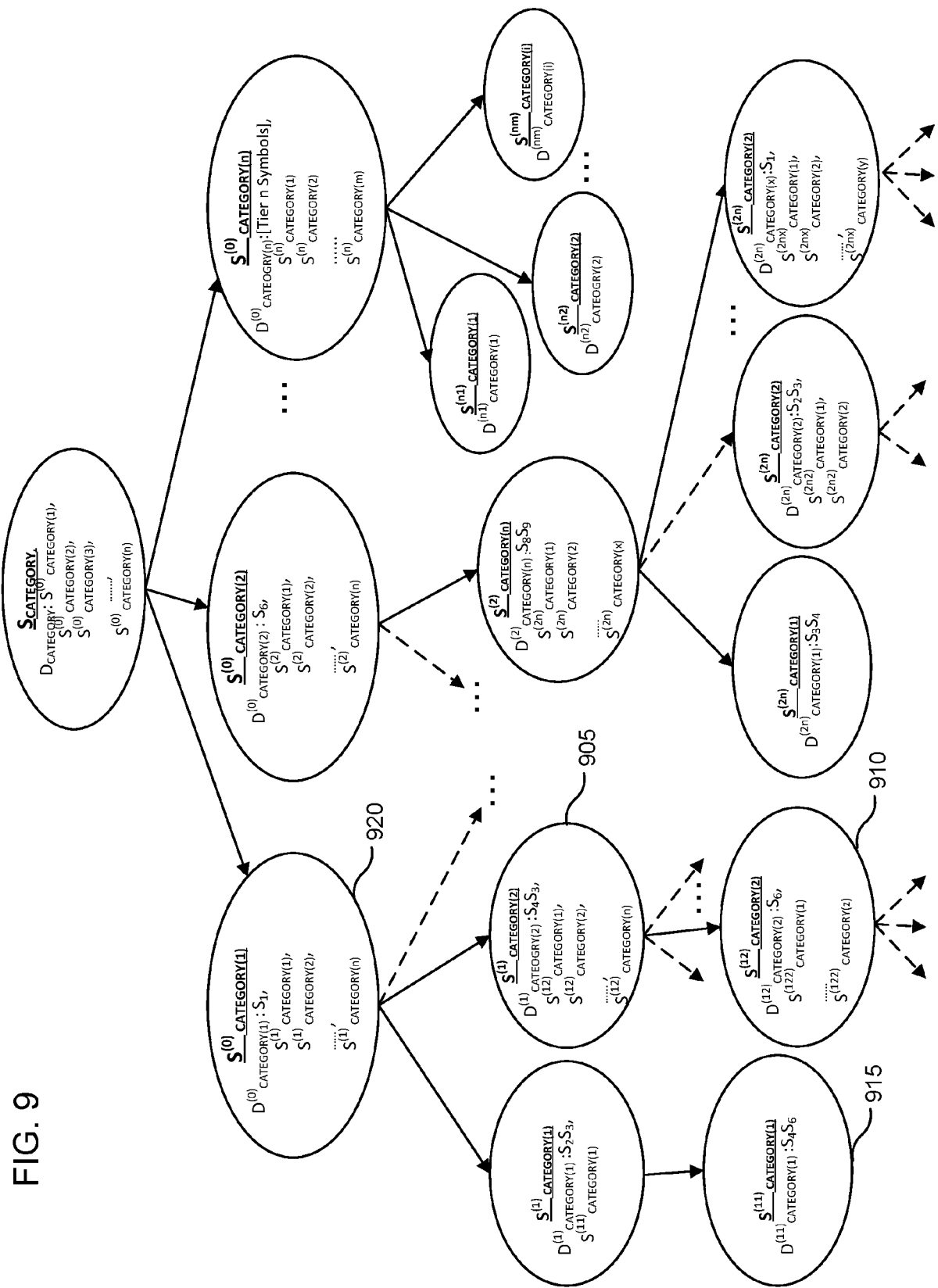
FIG. 9 is an example categorization scheme, according to an implementation.

The rules may cause the system to begin to categorize the symbol into the categorization scheme, for example walking the categorization tree. The categorization scheme, e.g., the categorization tree, may be expressed in terms of categorization scheme symbols in the data store. FIG. 9 illustrates one example of a category tree, represented in terms of categorization scheme symbols and their corresponding definitions. In the example of FIG. 9, a special category symbol, $S_{CATEGORY}$ represents the root of the category tree. The definition $D_{CATEGORY}$ of the special category symbol includes categorization scheme symbols that represent each node in the first tier of the category tree. Thus, the number of symbols in the definition $D_{CATEGORY}$ of the special category symbol represents the number of tier one categories. In the example of FIG. 9, the number is represented by n, which can by any non-zero number.

The nodes may be represented by categorization scheme symbols that indicate the path and the index of the node. The path may represent which parent nodes, e.g., ancestors, the current node has and the index may indicate the current nodes' position among the children of its parent. For example, node 905 of FIG. 9 has a path of 1 which indicates that its parent is the first node of tier 1 of the categorization scheme. A path of 0 indicates no ancestor category exists, e.g., because the root of the tree is not a category. Thus a path of 0 indicates a tier 1 node. Node 905 of FIG. 9 has an index of 2, which indicates it is the second child of this parent node. The definition for node 905 includes the symbols $S_4$ and $S_3$ and categories 1 to n. The symbols $S_4 S_3$ are the tag portion of the definition for the category node (i.e. the categorization scheme symbol that represents the node). The tag portion of a definition for a category node contains normal symbols that determine the membership of a symbol in the category. In the example of Node 905, normal symbols that are members of the first category of tier 1 and include the symbols $S_4$ and $S_3$ in their meanings are members of the category represented by node 905. The categorization scheme symbols in the definition for node 905 represent the children of node 905. Thus, node 905 has children 1 to n, where n represents any non-zero number Node 910 of FIG. 9 is a child of node 905. Its path is 12, indicating that its parents are the first node of tier 1 and the second child of the first node of tier 1. Its index is also 2, indicating it is the second child of the second child of the first node of tier 1. The definition of node 910 includes categories 1-z, where z is any non-negative number (including zero, so that node 910 may have one child). Node 915 of FIG. 9 has a path of 11 and an index of 1. This indicates that its parents are the first node of the first tier and the first child of the first node of the first tier and that it is the first child of the first node of the first tier. The definition of node 915 includes only the tag portion with normal symbols, namely $S_4 S_6$. Because the definition does not include categorization scheme symbols, the node has no children and is a leaf node. Thus, in some implementations, the symbols in the tag portion of the definition (i.e., $S_4 S_6$) are primitive. It is understood that the categorization scheme of FIG. 9 is illustrated as one example and that variations of this symbol-based categorization scheme may be used.

Returning to FIG. 8, the categorization capability may cause the system to initialize a cursor for walking the category tree (815). The cursor may be a memory structure that tracks the current path and the current index for the tree. For example, the categorization capability may cause the system to set the current category index to 1 and the current tier path to null, which indicates that we are working from tier 1 -the tier just below the root of the tree. For example, with the current category index set to 1 and the current tier path set to null, the cursor may point to the first category of tier 1, represented, for example, by node 920 of FIG. 9. The categorization capability may cause the system to compare the meaning of the symbol from the input to the meaning of the tag portion of the definition for the current category of the current tier (820). The tag portion of the definition for the current category of the current tier is the portion that includes normal symbols. The rules may cause the system to determine the meaning of the tag portion of the definition before performing the comparison with the meaning of the input symbol. In some implementations, the tag portion of the definition for the current node may be stored as primitives, so determining the meaning has already been done. When comparing the meaning of the input symbol with the meaning of the tag portion of the definition of the current node, the system may compare one symbol at a time from the meanings until all symbols in the tag portion have matched, or at least one symbol does not match. If one symbol does not match, the two meanings do not match.

If all of the symbols in the meaning of the tag portion of the current node (i.e., the node pointed to by the current category of the current tier) match symbols in the meaning of the input symbol (825, Yes), the input symbol belongs to the category represented by the current node. To represent membership in this category in informational terms, the rules may cause the system to append a belong-to-category symbol (e.g., a BTC symbol) associated with the current category node to the membership tag for the symbol (850). The BTC symbol is a categorization scheme symbol and may represent the category node in the categorization scheme. In some implementations, it may identify the path and index of the current node, thus the system may have a BTC symbol for each category node in the category tree. The definition of a BTC symbol may be primitive. In addition to appending the BTC symbol to the membership tag, the rules may cause the system to associate the symbol from the input (e.g., the new symbol) with other symbols that have the current tag in their definition. In some implementations, this may include updating the reference list of the OM symbol structure of each of the other symbols to add the new symbol to the reference list.

The rules may cause the system to continue walking the category tree using the residual symbols in the meaning of the input symbol (860). The residual symbols are those symbols that have not yet been matched to the meaning of a tag portion of a category node. If the current node has children (865, Yes), the rules may cause the system to append the current category index to the current tier path and to set the current category index to 1 (875). This in effect sets the cursor to the first child of the current node, keeping track of the path in the tree that led to this node. The categorization capability then resumes at step 820 with a new current node (e.g., the first child of the old current node). If the current tier does not have children (865, No), the rules may cause the system to add a new child node to the current node (870). The tag portion of the new child node may be the residual symbols from the meaning of the input symbol. Adding a new category may result in the addition of a new categorization scheme symbol that represents the new node, a new BTC symbol for the new node, and a new definition for the parent node (e.g., adding the new categorization scheme symbol to the definition of the parent node). Once the new BTC symbol is generated, it may be appended to the membership tag of the input symbol. The membership tag may be a concatenation of categorization scheme symbols, e.g., BTC symbols, that are associated with respective categories that the symbol belongs to. The rules may cause the system to append the membership tag to the definition of the symbol (880). This categorized definition may be stored with the symbol in the content portion of the data store. In some implementations, these new categorization scheme symbols (e.g., the new categorization scheme symbol that represents the new node and the new BTC symbol) may also be placed in the content portion of the data store. In some implementations, this may include generation of an OMSS for the new symbol. A reference list in the OMSS for a new symbol is empty because the symbol is new so no definitions of other symbols can include the new symbol. The rules may also cause the system to associate the symbol (e.g., the new symbol) with every primitive symbol that is in the definition of the new symbol (885). In some implementations, this may include updating the reference list of each primitive symbol with the new symbol. In addition, the system may add the new symbol and its definition to the list of existing symbols and their definitions, which may be represented by $D_{Exist}$.

Returning back to step 825, if the two meanings do not match (825, No), the rules may cause the system to determine whether the current tier has additional categories (830). As explained above with regard to FIG. 9, the number of categories of the current tier may be determined by the definition of the parent of the current node. If there are additional categories in the current tier (830, Yes), the rules may cause the system to set to the cursor to the next category, e.g., by increasing the category index (835). Thus, the current node becomes the next category node. The system may then resume at step 820 with the new current node.

If the current node is the last category of the current tier (830, Yes), the new symbol does not fully evaluate into the existing categorization scheme. Thus, the rules may cause the system to add a new category to the current tier (840). Similarly to adding a new child node, adding a new category may result in the addition of a new categorization scheme symbol that represents the new node, a new BTC symbol for the new node, and a new definition for the parent node (e.g., adding the new categorization scheme symbol to the definition of the parent). Once the new BTC symbol is generated, it may be appended to the membership tag of the input symbol, and the membership tag appended to the definition (880). This categorized definition may be stored with the symbol in the content portion of the data store. The rules may also cause the system to associate the symbol (e.g., the new symbol) with every primitive symbol that is in the definition of the new symbol (885). In some implementations, this may include updating the reference list of each primitive symbol with the new symbol. In addition, the system may add the new symbol and its definition to the list of existing symbols and their definitions, which may be represented by $D_{Exist}$. Process 800 then ends, having completed the categorization capability.

Using the example categorization scheme of FIG. 9, the categorization of an input symbol, namely $\{(S_{56}), (D_{56}:S_1, S_2, S_3, S_{17})\}$ follows. Using the categorization scheme of FIG. 9, the interpreter matches the first symbol in the meaning of $S_{56}$, namely $S_1$, to the first category of the first tier, namely $S^{(0)}_{CATEGORY(1)}$. Thus, the BTC symbol associated with the $S^{(0)}_{CATEGORY(1)}$ symbol, for example $S^{(0)}_{BTC(1)}$, is appended to the membership tag of the $S_{56}$ symbol. Because not all symbols in the meaning of $S_{56}$ have been matched to a category, the interpreter may attempt to match the remaining symbols, namely $S_2$, $S_3$, $S_{17}$, to the children of the first node of the first tier. The children are tier two categories. In the example of FIG. 9, the interpreter tries to match the first symbol for the $S^{(1)}_{CATEGORY(1)}$ symbol, namely $S_2$, against the first symbol of the remaining symbols in the meaning of $S_{56}$. Because $S_2$ does match the first remaining symbol, the interpreter attempts to match the second symbol, $S_3$ to the next remaining symbol. These symbols also match, and there are no more symbols in the tag portion of $S^{(1)}_{CATEGORY(1)}$, so the interpreter appends the corresponding BTC symbol, for example $S^{(1)}_{BTC(1)}$ to the membership tag of $S_{56}$.

Because another symbol from the definition of $S_{56}$ has not been matched to a category, the interpreter looks to the children of $S^{(1)}_{CATEGORY(1)}$, starting with $S^{(11)}_{CATEGORY(1)}$. The symbol in the tag portion of the definition does not match, so the interpreter looks for another category. Another category does not exist in the children of $S^{(1)}_{CATEGORY(1)}$. Thus, the interpreter adds a new category, for example represented by $S^{(11)}_{CATEGORY(2)}$ and sets the tag portion of its corresponding definition $D^{(11)}_{CATEGORY(2)}$ to the remaining unmatched symbols in the meaning of $S_{56}$, namely $S_{17}$. Thus, $D^{(11)}_{CATEGORY(2)}$ is $S_{17}$. In addition to this new symbol and it's definition, the interpreter generates a corresponding BTC symbol, namely $S^{(11)}_{BTC(2)}$ and appends this symbol to the membership tag of $S_{17}$. The interpreter also changes the definition of $S^{(1)}_{CATEGORY(1)}$ to include the new category represented by $S^{(11)}_{CATEGORY(2)}$. Thus, the updated $D^{(1)}_{CATEGORY(1)}$ is $\{S_2, S_3, S^{(11)}_{CATEGORY(1)}, S^{(11)}_{CATEGORY(2)}\}$. The categorized definition $D_{56}$ is $\{S_1, S_4, S_3, S_{17}, S^{(0)}_{BTC(1)} S^{(1)}_{BTC(1)} S^{(11)}_{BTC(2)}\}$. The categorized definition may be stored in the content portion of the data store along with the new category symbol, its associated definition and BTC symbol, and the updated definition of the $S^{(1)}_{CATEGORY(1)}$ special symbol.

Preference Set Update Capability

Figure 10:
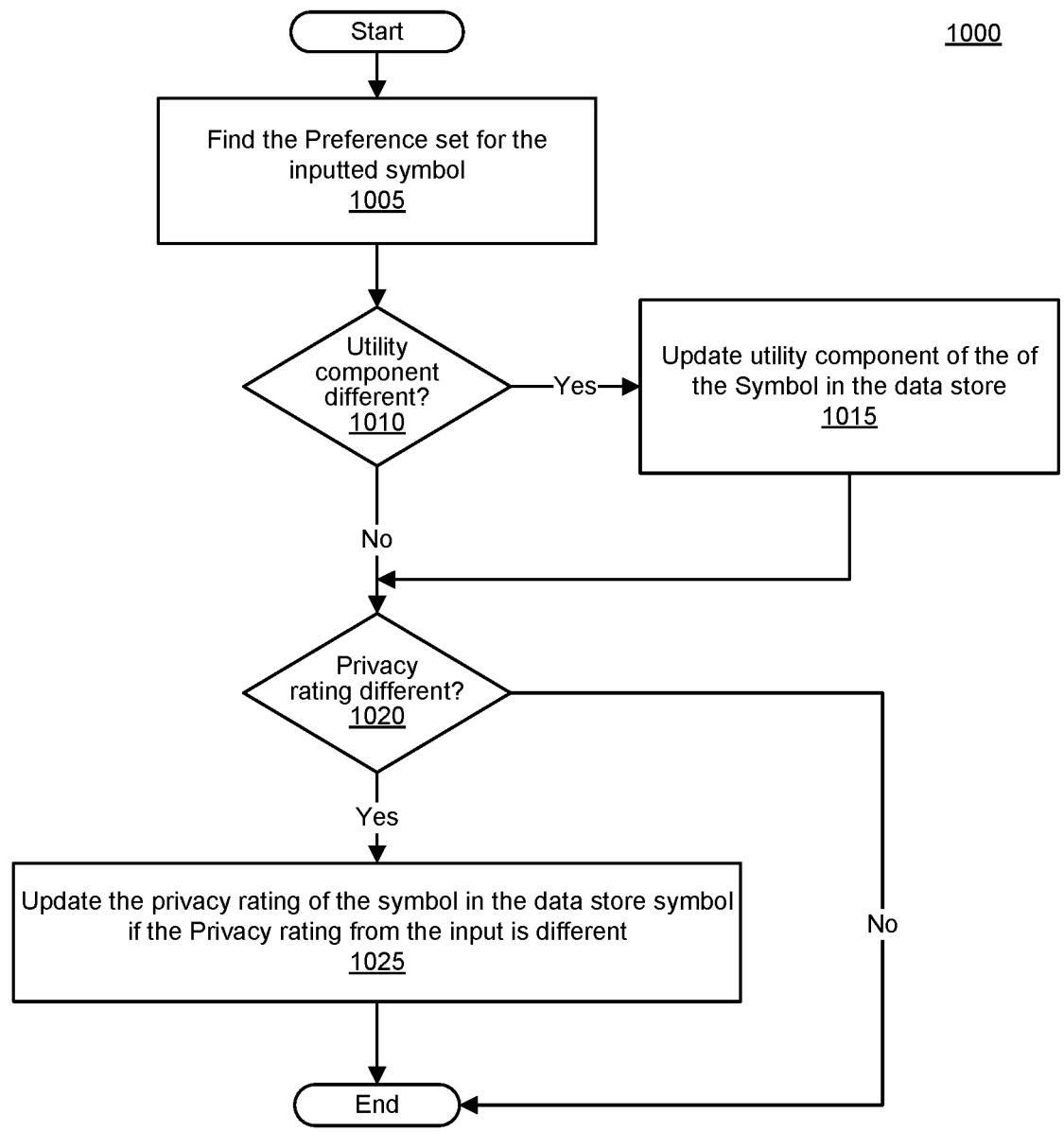
FIG. 10 is a flowchart illustrating example rules supporting a preference set update capability, according to an implementation.

FIG. 10 is a flowchart illustrating example rules supporting a preference set update capability, according to an implementation. It is understood that the rules supporting the preference set update capability illustrated in FIG. 10 is one example, and implementations are not limited to the order or specific rules indicated. Processing new preference sets for existing symbols allows the descriptive self to grow from its initial state, e.g., to interact with an external environment and increase its information content. A preference set for a symbol includes a utility and a privacy rating. The utility is a measurement used in the decision capability to rank solution combinations and decide on a best solution. Every normal symbol may include the privacy rating. To enable a robust reporting capability, special symbols may also have a privacy rating. For some special symbols, the privacy rating may be preset and may not be updated and is stored along with the symbol and its definition in the capabilities portion of the database. In some implementations, special symbols are not subject to the preference set update capability. The privacy rating for a normal symbol that represents a person may signify a trust index. The privacy rating for a normal symbol that does not represent a person may signify a privacy level of the content.

The preference set update capability may begin with rules that cause the system to fetch the preference set for the input symbol (e.g., the symbol in the first portion of the input) from the data store (1005). In some implementations, the preference set may be part of an OM symbol structure. In some implementations, the preference set may have been previously fetched, for example as part of step 555 of FIG. 5. The rules may cause the system to compare the utility component from the input (e.g., from the third portion of the input) with the utility component in the preference set from the data store (1010). If the utility component is different, the rules may cause the system to update the utility component in the preference set for the input symbol stored in the data store and replace it with the utility component from the input (1015).

The rules may also cause the system to compare the privacy rating component from the input with the privacy rating component for the symbol from the data store (e.g., in the OM symbol structure for the symbol) (1020). If the privacy rating is different, the rules may cause the system to update the privacy rating component in the data store with the privacy rating from the input (1025). It is understood that the preference set update capability is initiated when at least one of the utility component and the privacy component of the preference set has been updated. Accordingly, the preference set update capability will update at least one of these components in the OM symbols structure in the data store. The preference set update capability then ends, having modified the preference set in the OM symbol structure in the data store for the input symbol.

Reporting Capability

Figure 11:
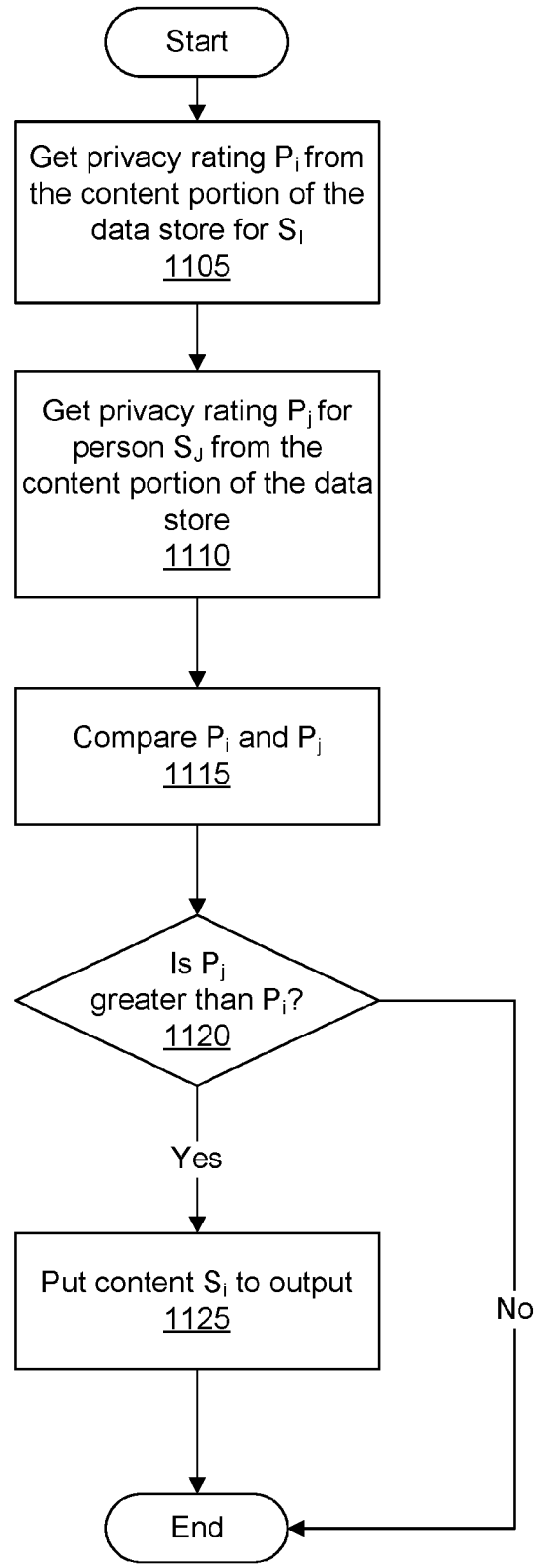
FIG. 11 is a flowchart illustrating example rules supporting a reporting capability, according to an implementation.

FIG. 11 is a flowchart illustrating example rules supporting a reporting capability, according to an implementation. The descriptive self interacts with its external descriptive environment. As part of its interactions with external descriptive environments, an omniphysical mind is able to consider requests to report some or all of its descriptive content. In deciding whether to report the requested information, omniphysical mind may evaluate the nature of the request in light of the party making the request. Specifically, in some implementations, the omniphysical mind compares the privacy index attached to the requested content with the trust index attached to the party requesting the content. The confidentiality index of the content and the trust index of the individual making the request may be represented in the preference set of the symbols, e.g., as the privacy rating. If the privacy rating of the individual making the request is greater than the privacy index of the content being requested, the system may report the information. This is similar to the way in which government institutions handle classified information; to have access to information at a particular classified (privacy) level, the individual must have a high enough security clearance (trust index). Of course, an omniphysical mind sets the privacy and trust parameters itself.

The reporting capability is completely general, able to accommodate any information of the descriptive self based on any setting of privacy and trust parameters. The data store may support this capability by associating a privacy rating for the symbols, e.g., via the OM symbols structure. Each symbol representing content includes that symbol's privacy index while each symbol representing an individual also includes a privacy index reflecting the degree of trust. The reporting capability may enable the descriptive self to report its contents, e.g., the symbols in the content portion of the data store, to the external environment. The reporting capability is the capability to display information. The reporting capability may be represented by a report content special symbol and may be requested using a report request special symbol. The definition of the report request special symbol may be two symbols, Si representing the symbol(s) for which content is requested and $S_J$, which is a symbol representing the requestor. It is understood that the Si notation used herein is representative of any normal symbol and not a specific normal symbol. Similarly, $S_J$ represents any normal symbol that represents a person or process that can request information from the system. The definition for the report content special symbol is the algorithm through which the system fetches the privacy ratings of the symbols Si and $S_J$, compares the ratings, and reports Si based on the results of the comparison. The meaning of the report content special symbol is the rules of the algorithm. In some implementations, the interpreter may initiate the reporting capability by placing the report content special symbol, e.g., $S_{RC}$, in the processing queue, for example as in step 535 of FIG. 5.

The reporting capability may begin with rules that cause the system to obtain the privacy rating for Si from the content portion of the data store (1105). The privacy rating may be stored, for example, in an OM symbols structure in the data store. The rules may also cause the system to get the privacy rating for the $S_J$ symbol from the content portion of the data store (1110). The privacy rating may be stored, for example, in an OM symbols structure in the data store. The content portion of the data store may store normal symbols, including their categorized definitions, reference lists, and preference sets, as well as the categorization scheme symbols that represent the categorization scheme. The rules may cause the system to compare the privacy rating for the content symbol Si with the privacy rating for the person $S_J$ (1115). When the privacy rating for the person symbol $S_J$ meets or exceeds the privacy rating for the content symbol Si (1120, Yes), the rules may cause the system to export the symbol Si and its meaning to the external environment (1125). For example, the rules may put the symbols in the meaning into an output queue, e.g., output queue 160, that an interface, such as interface 120 of FIG. 1, has access to. The interface 120 may be configured to provide the meaning in a format appropriate for an output device, such as a printer, screen, speaker, display, etc. When the privacy rating for the person symbol $S_J$ is less than the privacy rating for the content symbol Si (1120, No), the reporting capability ends.

Evaluate Current Platform Capability

Figure 15:
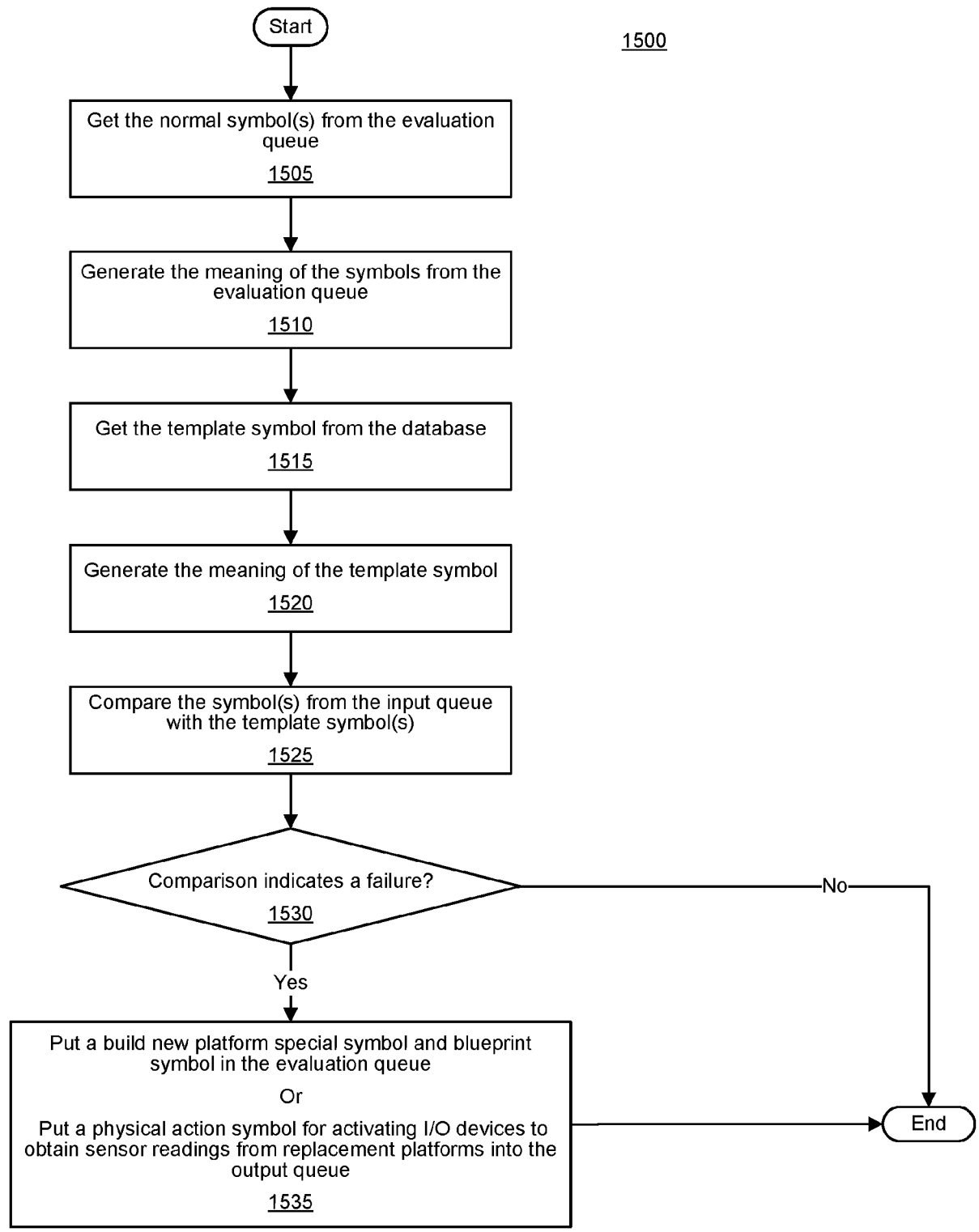
FIG. 15 is a flowchart illustrating example rules supporting a capability to determine whether to search for a new platform, according to an implementation.

FIG. 15 is a flowchart illustrating example rules supporting an evaluation capability for a current platform, according to an implementation. The descriptive self relies on specific physical performances that are measured and monitored by built-in devices (sensors). Those measurements are translated into omniphysical mind's descriptive information terms prior to being placed in the evaluation queue. In some implementations, the description of a sensor reading may include an indication of the sensor from which the reading was obtained. The descriptive terms can then be compared with a template symbol, which is a normal symbol. The meaning of a template symbol is a symbol or symbols representing sensor readings against which symbols representing current sensor readings are compared to determine the need to relocate to a new platform, e.g., a replacement platform with current functionalities, universal computing device, and associated parts. In other words, a template symbol is a normal symbol with a meaning that is a symbol or set of symbols that correspond to values from relevant measuring devices (e.g., sensors and monitors such as thermostats, gyroscopes, temperature gauges, liquid or lubricant measuring devices, etc.). The template symbol represents a condition or conditions that, if not met, causes the system to seek a replacement platform or in other words, trigger a search for a replacement supporting system. The evaluate current platform special symbol that requests an evaluation may also indicate which sensor or sensors is/are being evaluated. In some implementations, the evaluate current platform special symbol may indicate which template to use. As a non-limiting example, $S_{ECP(1)}$ may indicate a temperature sensor of a motor and $S_{ECP(2)}$ may indicate a fluid level in the motor. In some implementations, the evaluate current platform special symbol may indicate which symbols within the template symbol to evaluate. As a non-limiting example, $S_{ECP(1)}$ may indicate a temperature sensor of a motor and include rules for comparing the normal symbol with a specific portion (e.g., symbol 1) of the template symbol and $S_{ECP(2)}$ may indicate a fluid level in the motor and include rules for comparing the normal symbol with a different portion (e.g., symbol 2) of the template symbol. In some implementations, the evaluate current platform special symbol may represent multiple measuring devices, for example the temperature sensor and a light sensor. Any combination of monitoring devices are possible. Evaluating sensor data enables the omniphysical mind to determine whether to seek a new supporting platform, e.g., move to a replacement platform because of component or system failure. In addition to identifying a template symbol or identifying a particular portion of a template symbol, each evaluate current platform special symbol is also associated with a special symbol whose meaning represents rules for how to compare the sensor symbols(s) against the template symbol(s) and an action symbol representing rules for triggering an action based on the comparison, e.g., what to do as a result of the comparison.

The data store may support this capability by associating a template symbol and an action special symbol with each evaluate current platform special symbol. An evaluate current platform special symbol may correspond to a single measuring device. An evaluate current platform special symbol may correspond to multiple measuring devices. For an evaluate current platform special symbol that corresponds to multiple measuring devices, the meaning of the template symbol may represent a combination of normal symbols, each normal symbol corresponding to one of the measuring devices. The definition for the evaluate current platform special symbol is the algorithm through which the system fetches the template symbol associated with the evaluation special symbol, the rules for comparing the symbols from the input queue to the template symbol, and initiates an action based on the outcome of the comparison. The comparison can be any appropriate comparison specified in the rules. The meaning of the evaluate current platform special symbol is the rules of the algorithm. In some implementations, the interpreter may initiate the current platform evaluation capability by placing the evaluate current platform special symbol, e.g., $S_{ECP(1)}$, from the evaluation queue into the processing queue, for example as in step 250 of FIG. 2.

The evaluate current platform capability may begin with rules that cause the system to obtain the normal symbols from the evaluation queue (1505). The normal symbols represent data from a measuring device or devices, translated into descriptive terms. The translation includes mapping the sensor output to a normal symbol. The mapping may be done by a translator that is part of the sensor or by a translator that is part of a sensor interface. The rules may also cause the system to generate the meaning of the normal symbols from the evaluation queue (1510), as disclosed herein. The rules may also cause the system to get the template symbol corresponding with the evaluate current platform symbol from the database (1515). The template symbol is a normal symbol with a meaning that represents one or more normal symbols against which the normal symbols from the evaluation queue are compared. The rules may cause the system to compute the meaning of the template symbol (1520), as disclosed herein. The rules may cause the system to compare the normal symbols from the evaluation queue to the template criteria (1525), e.g., the template symbol. The comparison may be determined by the rules of the evaluate current platform special symbol and may include determining whether the one is less than the other, greater than the other, within a range and/or percentage of each other, etc. In some implementations, the rules may include which portion of a common template (e.g., a template describing sensor value requirements for the platform in general) to use as the template criteria.

If the comparison of the symbol(s) from the evaluation queue with the template criteria indicate no failure (1530, No), the rules cause the system to take no further action, and the evaluating is complete. In other words, process 1500 ends without further action. But if the comparison of the symbol(s) from the evaluation queue with the template criteria indicate a failure (1530, Yes), the rules may cause the system to put a build new platform special symbol and a blueprint symbol in the evaluation queue or put a physical action symbol into an output queue (1535). The physical action symbol is placed in the output queue to cause the current platform to activate external sensors (including communication devices) to surveil replacement platforms. Part of the surveillance may include accepting sensory data from potential replacement platforms. The replacement platforms may provide the sensory data in a communication received via the external sensors. As explained herein, the translator may, after receiving the physical action symbol, translate the physical action symbol into the corresponding physical actions (e.g., activating the external sensors). The translator may then receive information from the sensors of a potential replacement platform. The translator translates the information into descriptive terms, i.e., normal symbols, provide the evaluate replacement platform special symbol along with the normal symbols to the evaluation queue. The build new platform special symbol and blueprint symbol is placed in the evaluation queue to cause the current platform to build a replacement platform, e.g., as explained in more detail with regard to FIG. 20. Process 1500 then ends.

Evaluate Replacement Platform

Figure 16:
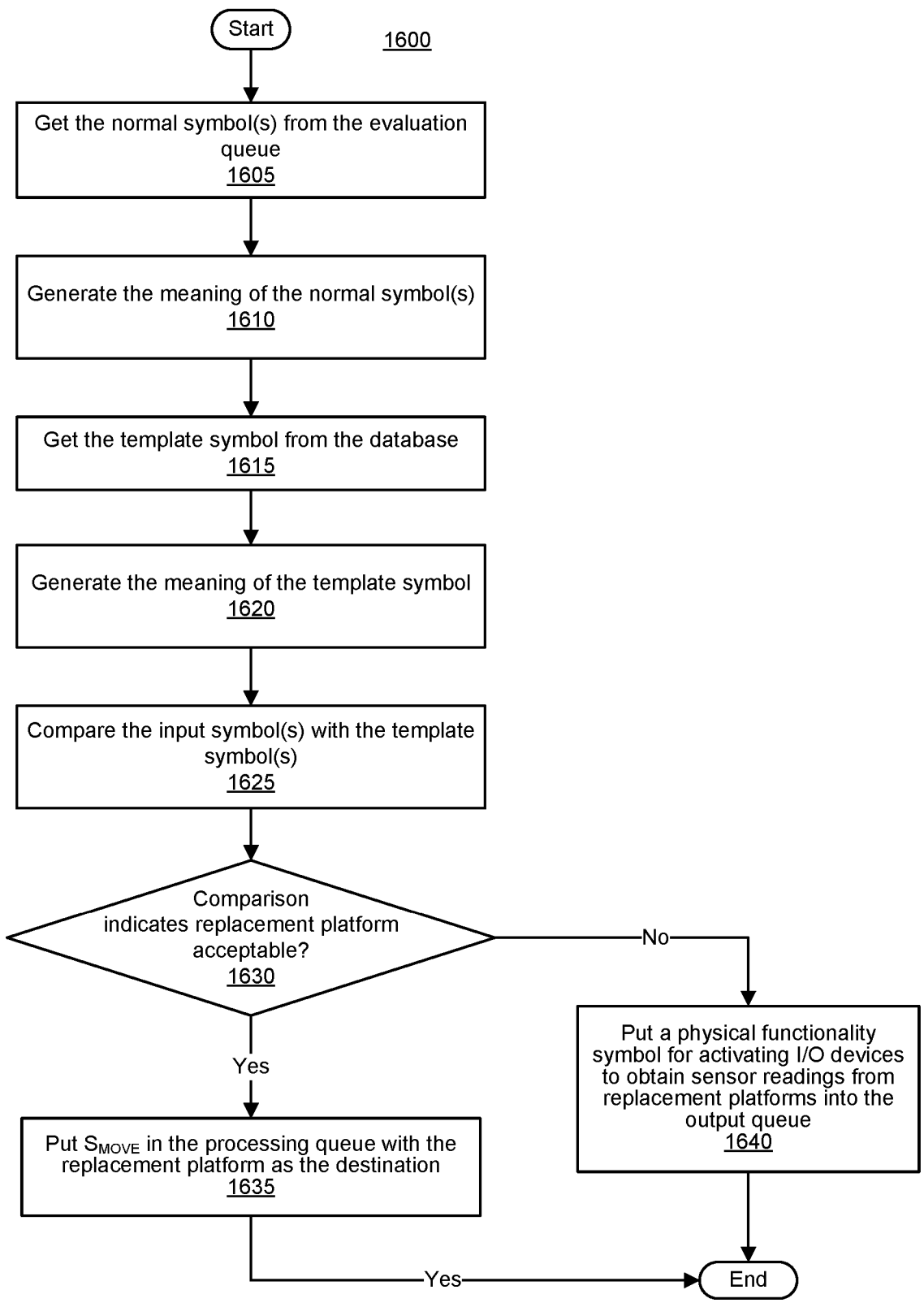
FIG. 16 is a flowchart illustrating example rules supporting a capability to evaluate descriptions of sensory data of a replacement platform, according to an implementation.

FIG. 16 is a flowchart illustrating example rules supporting an evaluation capability of a replacement platform, according to an implementation. The descriptive self can evaluate a potential replacement platform to determine whether the potential platform is acceptable. In some implementations, the replacement platform is acceptable if it includes the same functionality as the current platform. In some implementations, the replacement platform is acceptable if it includes at least the same functionality, e.g., it must include the same functionality but may include additional functionality. This additional functionality, if it exists, may not be considered during the evaluation of a replacement platform.

Similar to the capability for evaluating the current platform, the descriptive self relies on measurement data from the replacement platform. The data may come from a wired or wireless connection with the replacement platform. In some implementations the replacement platform broadcasts specific sensor readings. The sensor readings may be received in a message/communication from the replacement platform. In some implementations, one or more of the sensors of the replacement platform include a translator that encodes the readings as normal symbols, as described above. In some implementations, the sensor readings are provided to a translator, e.g., in an interface on the current platform for the descriptive self. The translator translates the readings into omniphysical mind's descriptive terms. In some implementations, the description of a sensor reading (e.g., the normal symbol mapped to the sensor reading) may include an indication of the sensor from which the reading was obtained. In some implementations, the position of the normal symbol for the sensor in the evaluation input is an indication of the sensor from which the reading was obtained. A translator on the current platform associates the normal symbols with an appropriate evaluate replacement platform special symbol in an evaluation queue, which results in the descriptive-self putting the evaluate replacement platform special symbol in the processing queue. The descriptive terms of the normal symbols in the evaluation queue can then be compared with the template symbol. The template symbol associated with the evaluate replacement platform special symbol represents the functionality of the current platform, e.g., device readings included in the current platform. A replacement platform should have all of the same sensors as the current platform and, therefore, the sensor readings from the potential replacement platform can be evaluated against acceptable readings as defined by the template. In some implementations, the template symbol is the same template symbol used to evaluate the current platform, although the actions taken for meeting the template criteria are different (e.g., initiating a move rather than initiating a search for a replacement platform). In some implementations, the template symbol differs from the template symbols associated with the evaluate current platform special symbols. The potential replacement platform may be a platform of functionalities including a universal computing device and its associated parts. In addition to being associated with a template symbol, the evaluate replacement platform special symbol is also associated with a special symbol whose meaning represents rules for performing the comparison with the template and/or rules for performing an action, e.g., what to do should the input symbols meet the template criteria.

The evaluate replacement platform special symbol may correspond to a single sensor, but as most platforms support multiple functions, the evaluate replacement platform special symbol more likely corresponds to multiple sensors. Accordingly, the meaning of the template symbol may represent a combination of normal symbols. The normal symbols may correspond to sensor readings. The definition for the evaluate replacement platform special symbol is the algorithm through which the system fetches the template symbol associated with the evaluate replacement platform special symbol, compares the template criteria with the symbols from the evaluation queue, and initiates an action based on the comparison. The meaning of the evaluate replacement platform special symbol is the rules of the algorithm, including how the comparison is made. In some implementations, the interpreter may initiate the replacement platform evaluation capability by placing the evaluate replacement platform special symbol, e.g., $S_{ERP}$, in the processing queue, for example as in step 250 of FIG. 2.

The replacement platform evaluation capability may begin with rules that cause the system to obtain the normal symbols from the evaluation queue (1605). The normal symbols may represent data from a measuring device or devices, translated into descriptive terms, as discussed above with regard to FIG. 15. The rules may also cause the system to determine the meaning of the normal symbols from the evaluation queue (1610). The rules may also cause the system to get the template symbol corresponding with the evaluate replacement platform special symbol from the database (1615). The template symbol is a normal symbol with a meaning that includes one or more normal symbols representing a condition or conditions against which the normal symbols from the evaluation queue are compared. The rules may cause the system to generate the meaning of the template symbol (1620). The rules cause the system to perform the comparison of the normal symbols with the template criteria (1625). The comparison may be any kind of comparison, e.g., less than, greater than, within a range of, etc.

If the comparison indicates the replacement platform is not acceptable (1630, No), the rules cause the system to look for another replacement platform (1640). For example, the system may put the a physical action symbol(s) in the output queue. When the translator receives the physical action symbol(s) via the output queue, the translator maps the symbol(s) to actions that activate the I/O devices to accept/obtain device readings from replacement platforms. In some implementations, the translator may track which potential replacement platforms have been evaluated. For example, the sensor data may be associated with an identifier for the replacement platform. If the translator initiates a replacement platform evaluation but receives another physical action symbol(s), rather than the content of the database symbol, in the output queue, it may activate external sensors to look for another potential replacement platform, e.g., one with an identifier that differs from the previously evaluated platform. Thus, process 1600 would eventually be repeated using normal symbols describing the other potential replacement platform.

If the comparison indicates the replacement platform is acceptable (1630, Yes), the rules may cause the system to place a move special symbol, e.g., $S_{MOVE}$ into the processing queue identifying the replacement platform as the destination, i.e., with a specific destination (1635). The move special symbol represents a capability to report content of the database, including special symbols, to another platform, such as the replacement platform. The system may report the content of the database to memory associated with the replacement platform. This may be accomplished by wired or wireless transmission of the content of the database, or may be accomplished by placing the content of the database in a memory accessible to both the current platform and the replacement platform, e.g., a memory in the cloud, a specific drive, etc. The replacement platform evaluation process is then complete and process 1600 ends.

Evaluate New Platform Functionality Capability

Figure 17:
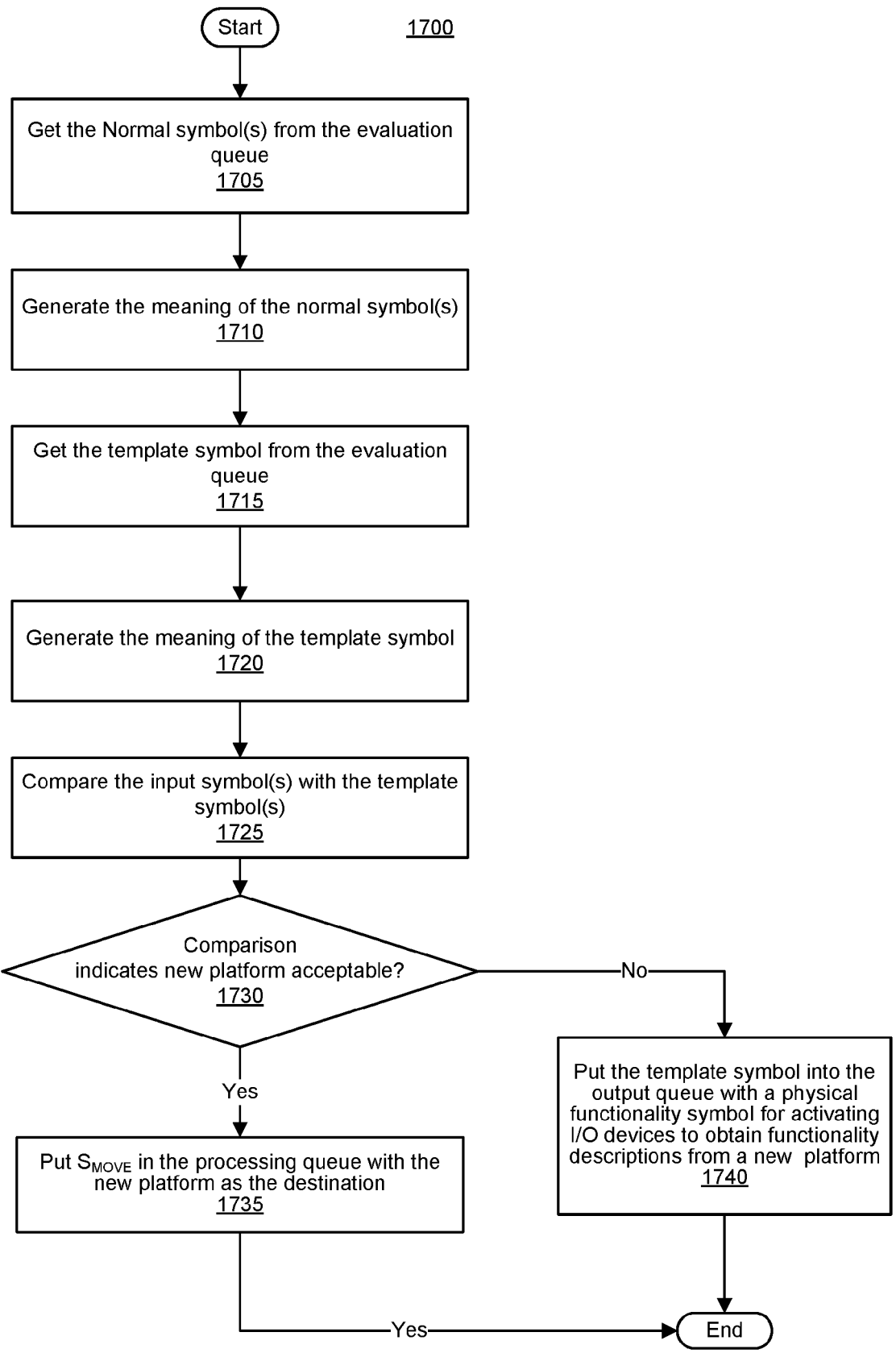
FIG. 17 is a flowchart illustrating example rules supporting a capability to evaluate the functionality of a new platform, according to an implementation.

FIG. 17 is a flowchart illustrating example rules supporting an evaluation capability for functionality of a new platform, according to an implementation. The descriptive self can evaluate a new platform to determine whether the new platform supports desired functional requirements. For example, when omniphysical mind decides to explore the ocean the omniphysical mind needs to move to a platform suitable for such exploration. The desired performance in the ocean can be represented by a symbol in the database that includes a template of the functionality a platform suitable for the ocean performance must have. The omniphysical mind can compare the functionality published by a potential new platform against the template requirements.

In some implementations, the descriptive system may initiate the search for a new platform by passing a template symbol representing the functionality desired in the new platform to the interface, e.g., the translator. In response to receiving the template symbol via the output queue the translator may activate devices that enable the receipt of functional descriptions from potential new platforms. In some implementations, the output queue may include a physical action symbol that the translator uses to activate the devices. The new platform functionality descriptions may come from a wired or wireless connection the descriptive system has with the new platform. In some implementations the new platform broadcasts functionality and/or specific sensor readings. In some implementations, the new platform includes a translator that encodes the description of the functionalities as normal symbols, as described above. In some implementations, the functions of the new platform are provided to a translator, e.g., in an interface for the descriptive system, which translates the functions into omniphysical mind's descriptive terms. As discussed above, the translator of the descriptive self adds the normal symbols representing the functionality of the potential new system with the template symbol received via the output queue and the evaluate new platform special symbol in an evaluation queue. The template symbol is the symbol that initiated the activation of the devices that enable receipt of the functional descriptions. The template symbol represents the template of requirements against which the functionality of the new platform is compared. In some implementations the template symbol can represent one requirement. In some implementations, the template symbol can represent a combination of requirements. In some implementations, the template symbol can represent a combination of required functionality and prohibited functionality. Required functionality may be separated from prohibited functionality by a predetermined symbol.

In addition to receiving the information describing the potential new system, the translator may also receive and track an identifier for the potential new system. Tracking the identifier enables the translator to avoid re-evaluating a platform that has already failed an evaluation and enables the translator to provide the content of the descriptive self to the new platform, if the new platform passes the evaluation. The new platform may be a universal computing device and its associated parts. The associated parts include hardware and software, including, e.g., a translator and interpreter. The functionality of the new system can include hardware specifications, sensor specification, modes of locomotion, I/O devices, specialized software modules, etc.

The evaluate new platform special symbol is a special symbol whose meaning represents rules for performing the comparison with the template. The rules evaluate the descriptions from the new system against the template to ensure that all required functionality exists and no prohibited functionality exists. A template may correspond to a single function, but as most platforms support multiple functions, the template symbol for the new platform more likely corresponds to multiple functions. Accordingly, the meaning of the template symbol setting forth the desired requirements may include a combination of normal symbols, each normal symbol corresponding to a desired/required functionality or a prohibited functionality. The definition for the evaluate new platform special symbol is the algorithm through which the system compares the template symbol from the evaluation queue with the normal symbols from the evaluation queue, and initiates a move or a search for another platform based on the comparison. The meaning of the evaluate new platform special symbol is the rules of the algorithm. Functionality that is not prohibited, i.e., required to be absent, can be present. In other words, if a functionality is not present in the template symbol it is neither required nor prohibited and its presence in the input, i.e., in the normal symbols describing the new platform, has no effect on the outcome of the comparison. In some implementations, the interpreter may initiate the new platform functionality evaluation capability by placing the evaluate new platform special symbol, e.g., $S_{ENP}$, in the processing queue, for example as in step 250 of FIG. 2.

The new platform evaluation capability may begin with rules that cause the system to obtain the input symbols from the evaluation queue (1705). The input symbols represent functionality of the new platform, translated into descriptive terms. The rules may also cause the system to generate the meaning of the normal symbols (1710). The rules may also cause the system to get the template symbol corresponding with the evaluate new platform special symbol from the evaluation queue (1715). The template symbol is a normal symbol with a meaning that includes one or more normal symbols representing functions against which the normal symbols from the evaluation queue are compared. The rules cause the system to perform the comparison (1725). The comparison may be determining whether the normal symbols include certain symbols and/or excludes other symbols. The comparison is described in more detail with regard to FIG. 18.

If the comparison indicates the new platform is not acceptable (1730, No), the rules cause the system to look for another new platform, e.g., by outputting the template symbol in an output queue(1740). The template symbol is the same template symbol as the one used in the comparison. The translator may determine that responsive to seeing the same template special symbol a second time, the first platform was not acceptable. The translator may again activate I/O devices for obtaining information describing another new platform. In some implementations, the system may also (optionally) put physical action symbols that activate I/O devices to obtain functionality descriptions of potential new platforms in the output queue with the template symbol. If the comparison indicates the new platform is acceptable (1730, Yes), the rules may cause the system to place a move special symbol, e.g., $S_{MOVE}$ into the processing queue (1735). The move special symbol represents a capability to report content of the database, including special symbols, to a new platform. Placing the move special symbol into the processing queue may cause the system to activate a move capability, e.g., represented by FIG. 19. If the interface, e.g., interface 120 of FIG. 1, receives the content of the database in the output queue, the interface may transmit, move, or otherwise share the content to memory associated with the new platform. This may be accomplished by wired or wireless transmission of the content of the database, or may be accomplished by placing the content of the database in a memory accessible to both the current platform and the new platform, e.g., a memory in the cloud, a specific drive, etc. The new platform evaluation process is then complete.

Figure 18:
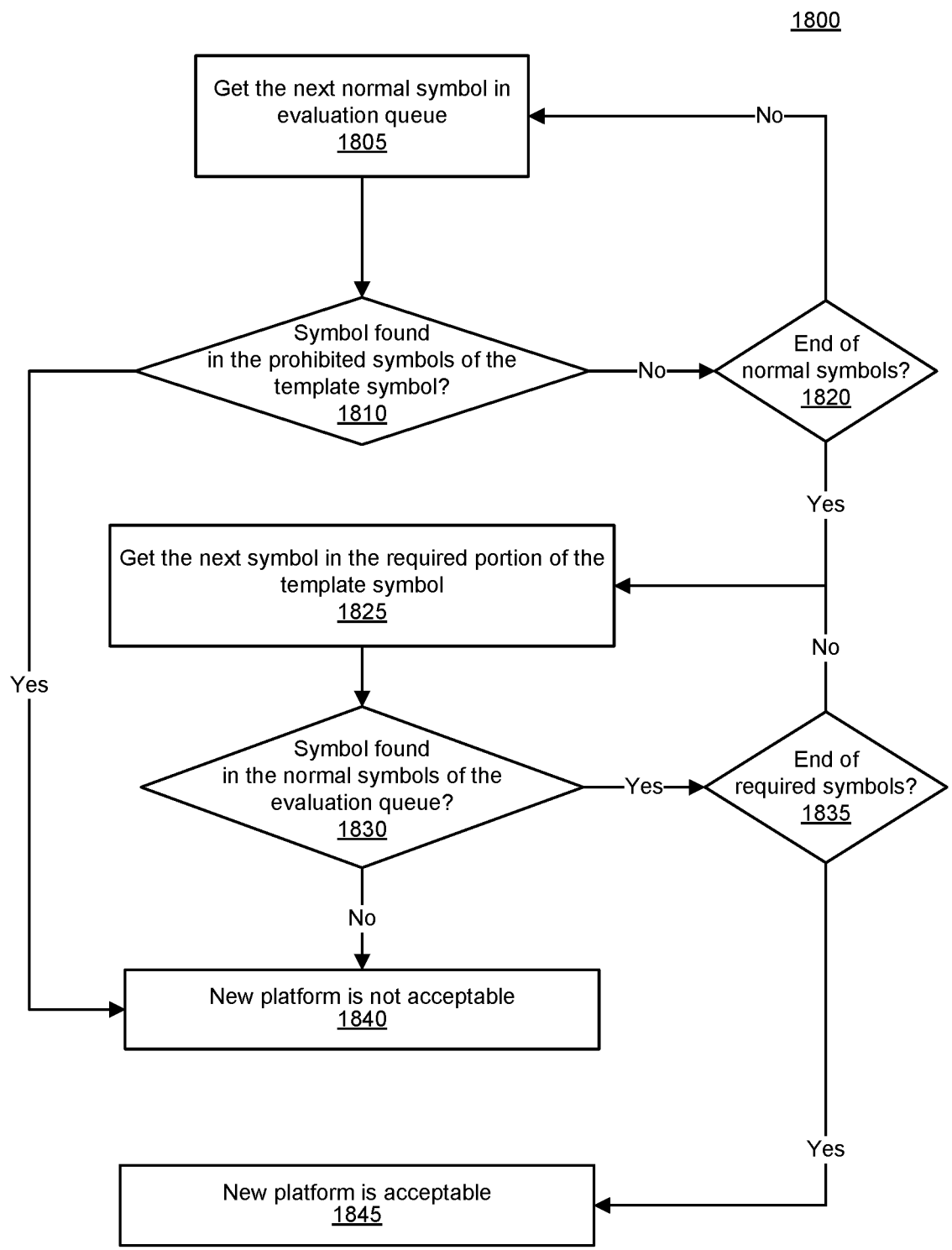
FIG. 18 is a flowchart illustrating example rules for comparing functionality of a new platform with a template of functional requirements, according to an implementation.

FIG. 18 flowchart illustrating example rules for a process 1800 of comparing functionality of a new platform with a template of functional requirements, according to an implementation. Process 1800 is an example of a comparison performed as part of step 1725 of FIG. 17. The comparison iteratively cycles through the normal symbols in the evaluation queue to determine if any of them match a prohibited functionality in the template. If there are no matches found, the comparison iteratively cycles through the symbols representing required functionality in the template to see if a match is found in the normal symbols of the evaluation queue. Of course, implementations may perform the comparison of required functionality prior to performing the comparison of prohibited functionality.

Process 1800 begins by obtaining a normal symbol from the evaluation queue (1805). The system compares this symbol to the symbols in the template representing the prohibited functionalities, if any (1810). If there are no prohibited functionalities in the template, process 1800 may move directly to step 1825. If the symbol matches one of the prohibited functionalities (1810, Yes), the new platform is considered not acceptable (1840) and process 1800 ends. If the symbol does not match (1810, No), the system determines whether all normal symbols in the evaluation queue have been evaluated (1820). If not (1820, No), the system gets the next normal symbol (1805) and performs the comparison (1810). Once all normal symbols have been compared against the prohibited functionality (1820, Yes), the system may get the first symbol in the template that corresponds with required functionality (1825). The system may look for this symbol in the normal symbols obtained from the evaluation queue (1830). If the symbol is not found (1830, No), the new platform is considered not acceptable (1840) and process 1800 ends. If the symbol is found (1830, Yes), the system determines whether all the symbols representing required functionality have been evaluated (1835). If they have not (1835, No), the system gets the next symbol in the template that corresponds to required functionality (1825) and compares it against the normal symbols describing the new platform (1830). Once all required functionality in the template has been compared (1835, Yes), the new platform is considered acceptable (1845).

Build New Platform Capability

Figure 20:
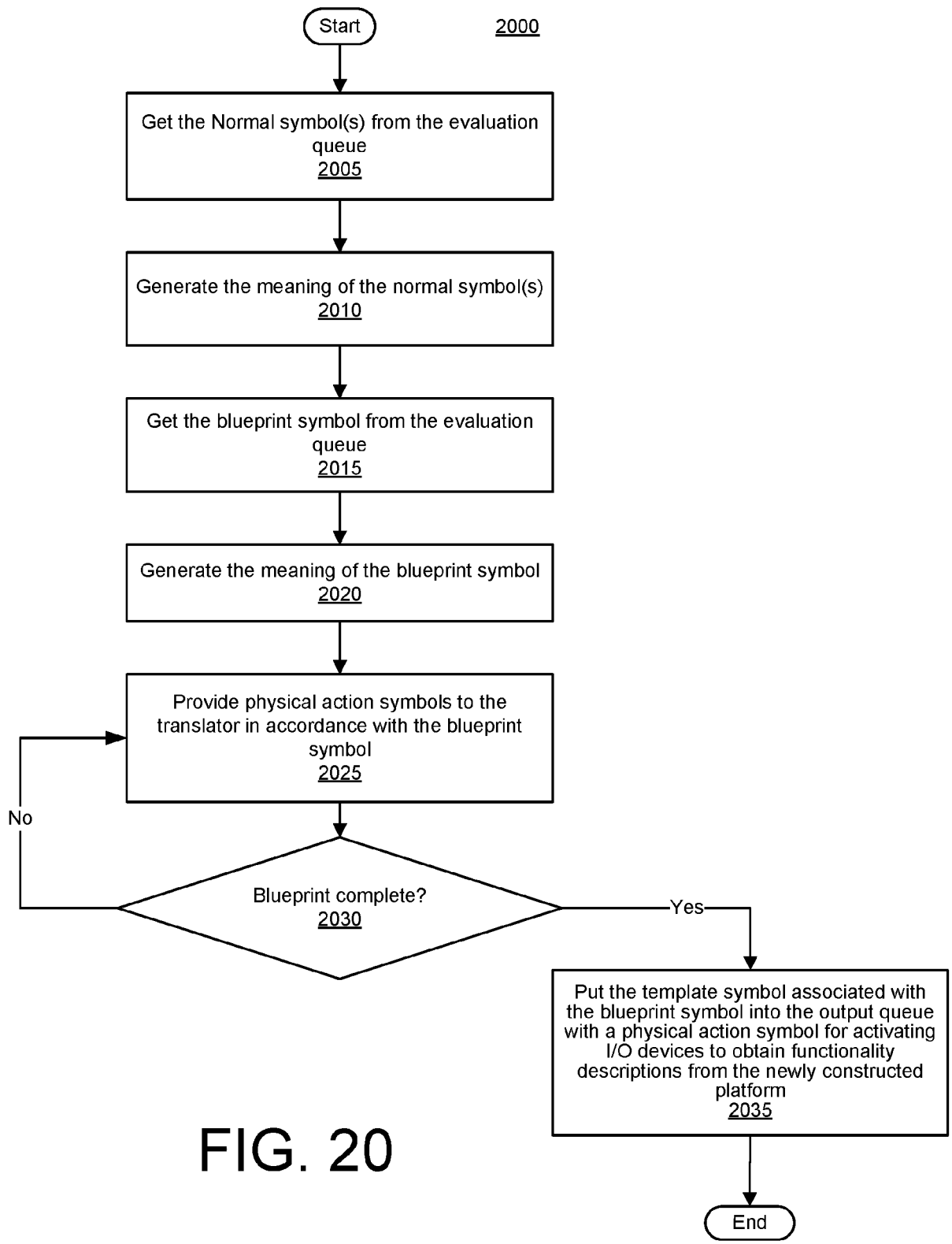
FIG. 20 is a flowchart illustrating example rules supporting a capability to build a new platform, according to an implementation.

FIG. 20 is a flowchart illustrating example rules supporting a build new platform capability for creating a new platform, according to an implementation. The descriptive self can build a new platform to support desired functional requirements. These functional requirements can be the same or similar to those represented in the current platform. The functional requirements can be different from those represented in the current platform. The build new platform capability enables the descriptive self to create its own replacement platform. The build new platform capability pulls a blueprint of instructions and materials for building the replacement platform, generates the meaning of these instructions, and provides the instructions to the translator to be translated into physical actions to complete the new platform. In some implementations, the build new platform capability may automatically start an evaluation process, e.g., evaluating the new platform against a set of functional requirements represented by a template symbol or symbols.

The materials needed to build a platform that satisfies the functional requirements and the physical actions needed to put the materials together may be represented by one or more blueprint symbols. The definition of a blueprint symbol includes normal symbols representing physical actions taken on specified materials. In some implementations, the definition of a blueprint symbol may also include a template symbol that represents the functional requirements against which the new platform is evaluated, to ensure the newly built platform performs as expected prior to initiating a move. The descriptive system may build a new platform rather than initiate a search for a new platform, e.g., as described with regard to FIG. 17. The descriptive system may build a new platform in response to identification of a failure in the current platform (e.g., as part of step 1535 of FIG. 15). The descriptive system may build a new platform in response to any decision process that concludes with placing the build special symbol in the evaluation queue with a blueprint symbol.

The build new platform special symbol is a special symbol whose meaning represents rules for pulling the blueprint, i.e., instructions for building a replacement platform, generating the meaning of the blueprint, and providing the physical action symbols to the translator so that the translator can translate the physical action symbols into physical actions performed by the current platform. Once the blueprint is complete, the build new platform special symbol may put a physical action symbol in the output queue to begin receiving descriptions from the newly completed platform and to performing a comparison with a template, e.g., as explained above with regard to FIG. 17.

The definition for the build new platform special symbol is the algorithm through which the system pulls the blueprint and provides physical actions to the translator. The meaning of the build new platform special symbol is the rules of the algorithm. In some implementations, the interpreter may initiate the build new platform capability by placing the build new platform special symbol, e.g., $S_{BUILD}$, in the processing queue, for example as in step 250 of FIG. 2.

The build new platform capability may begin with rules that cause the system to obtain the input symbols from the evaluation queue (2005). The input symbols represent the blueprint for building the new platform, translated into descriptive terms. The rules may also cause the system to generate the meaning of the normal symbols (2010). The rules may also cause the system to get the blueprint symbol from the evaluation queue (2015). The blueprint symbol is a normal symbol with a meaning that includes one or more normal symbols representing physical action symbols. The physical action symbols represent instructions that can be translated into physical actions and material identification needed to assemble the platform. The rules cause the system to begin providing the physical action symbols to a translator, e.g., via the output queue (2025). The translator translates the physical action symbols to instructions/actions executed by the platform. The rules may cause the system to provide physical action symbols in a particular order; this may be an ongoing process (e.g., (2030, No)) until all physical action symbols have been provided in an order prescribed by the blueprint symbol. When all physical action symbols have been provided (e.g., (2030, Yes)), the system may initiate the evaluate new platform capability (2035) to ensure that the newly created platform operates as expected. In other words, the blueprint symbol may be associated with a template symbol and the rules may cause that template symbol and the evaluate new platform functionality special symbol to be placed in the output queue. This invokes the process described by FIG. 17 and results in activation of a move capability, e.g., represented by FIG. 19. The build new platform process is then complete. In some implementations, step 2035 is optional. In such implementations, the system may initiate a move capability by placing the move special symbol in the processing queue. This invokes the process described by FIG. 19.

Move Capability

Figure 19:
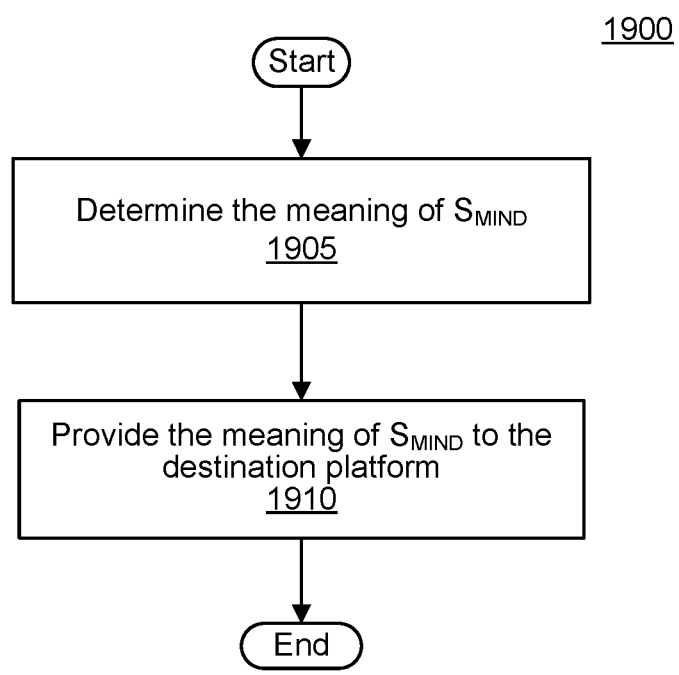
FIG. 19 is a flowchart illustrating example rules supporting a capability to move to a new platform, according to an implementation.

FIG. 19 is a flowchart illustrating example rules supporting a move capability, according to an implementation. It is understood that the rules supporting the move capability illustrated in FIG. 19 represent one example, and implementations are not limited to the order or specific rules indicated. The move capability allows the descriptive self to move and be supported by another platform. The rationale for moving may be to have a platform with more or different functionality. The rationale may be that the current platform is wearing out, beginning to fail, or is in danger of imminent failure. The rationale may be to pursue purposes better achieved with a different platform. Other rationales are possible. Moving may include making a copy of the database or may include an actual move, e.g., the database on the current platform is deleted as part of the move.

The move capability may begin with rules that cause the system to determine the meaning of the database special symbol, e.g., $S_{MIND}$ (1905). The database special symbol represents the content and capabilities of the system, e.g., the content of the database. The rules may cause the system to provide the meaning of the database special symbol to the destination platform (1910). Providing the meaning to the destination platform may be accomplished by storing the meaning in a particular memory location accessible by the destination platform and the current platform. Accessibility may be wireless (e.g., via a cloud storage) or wired (e.g., a USB or similar interface physically connecting the destination platform to the current platform). In some implementations, transferring may add the meaning of the database special symbol to content already stored at the destination platform. For example, transferring may include putting the content portion of the meaning of the database special symbol into a content portion of a database associated with the destination platform and adding the capabilities portion of the meaning of the database special symbol into a capabilities portion of the database associated with the destination platform. In some implementations, the rules of the move capability may delete the content of the database at the current platform after providing the meaning (e.g., after step 1810). The move capability then ends, having transferred the content of the database to a destination platform.

Once the content of the database has been transferred to the destination platform, the destination platform may be switched on, which may cause the interpreter in the destination platform to put the self-initiate special symbol into the processing queue, which in turn enables the self to become aware of the content and capabilities of the destination platform. The content and capabilities may include new content and functionality existing in the data store of the destination platform prior to the move.

It is understood that the details of the capabilities discussed above are given as examples only, and that an omniphysical descriptive self includes any descriptive self that has the capability of awareness, the capability of self-awareness, the capability of persistence, the capability to categorize external input, the capability to make decisions based on provided requirements, the capability to display information, and/or the capabilities to evaluate the current platform, a replacement platform and/or a new platform, in descriptive terms. Thus, implementations are not limited to the specific examples discussed above, to the exact order of steps illustrated in the figures, nor to the rules provided below.

Example Rule Specifications

As indicated above, FIGS. 12A and 12B do not depict a full set of symbols and their definitions for the sake of brevity. The following provides some examples of the special symbols and their associated rules that can be used in some implementations of an omniphysical descriptive self. It is understood that the symbols and rules provided below are examples only and implementations cover different varieties of the provided examples, given the benefit of this disclosure. In the examples below, $S_{Description}$ represents sub-rules for general rules like $S_{FORMAT}$, and could be primitive or non-Executable rules. $R_N$ represents any Executable rule that is operational and can trigger real action in the Interpreter. Also, in the examples below, $Q_R$ denotes the processing queue, Qi denotes the input queue, Qs denotes the self-initiate queue, $Q_E$ denotes the evaluation queue, and Qo denotes the output queue. A symbol input is composed of three slots, one containing the symbol being processed, the second containing the definition of the symbol being processed, and the third containing the preference set of the symbol being processed.

SFORMAT: GetRule(SFORMAT) will put $S_{Fetch}S_{FirstFormatCheck}S_{CallSafety}$ SsecondFormatCheck $S_{ThirdFormatCheck}S_{CheckDefinition}S_{CheckPreferenceSet}S_{CallCategorize}$ into QR.

$S_{Fetch}$: Sub-rule in $S_{FORMAT}$, its meaning is $R_1$, which fetches from $Q_I$ the three part input composed of the symbol, its definition, and its preference set. GetRule($S_{Fetch}$) will put $R_1$ into $Q_R$.

$R_1$: Executable rule, Execute($R_1$) will make the Interpreter fetch from Qi the three part input composed of the symbol, its definition, and its preference set.

$S_{FirstFormatCheck}$: Sub-rule in $S_{FORMAT}$, its meaning is $R_2R_3R_4$, which checks if the input satisfies the following requirements: 1). The input consists of three parts: {Symbol; Definition; Preference Set}; 2). Symbol and Definition parts are not empty; 3).There is only one symbol in the first part. The rule subsequently puts the symbol representing the appropriate sub-rule into $Q_R$. GetRule($S_{FirstFormatCheck}$) will put $R_2R_3R_4$ into $Q_R$.

$R_2$: Executable rule, Execute($R_2$) will make the Interpreter check if the input consists of three parts: {Symbol; Definition; Preference Set}. If yes, there is no action; if no, the $S_{SELF-INITIATE}$ special symbol is put into $Q_R$ after clearing any symbol that might be in that queue.

$R_3$: Executable rule, Execute($R_3$) will make the Interpreter check if any of the Symbol, Definition, or Preference Set parts of the input is empty. If no, there is no action; if yes, the $S_{SELF-INITIATE}$ special symbol is put into $Q_R$ after clearing any symbol that may be in that queue.

$R_4$: Executable rule, Execute($R_4$) makes the Interpreter check if the first slot of the input contains no more than one symbol. If yes, there is no action; if no, the $S_{SELF-INITIATE}$ special symbol is put into $Q_R$ after clearing any symbol that may be in that queue.

$S_{CallSafety}$: Sub-rule in $S_{FORMAT}$, its meaning is $R_5$, which puts $S_{SAFETY}$ before $S_{SecondFormatCheck}$. GetRule($S_{CallSafety}$) will put $R_5$ into $Q_R$.

$R_5$: Executable rule, Execute(Rs) will make the Interpreter put $S_{SAFETY}$ before SsecondFormatCheck.

$S_{SecondFormatCheck}$: Sub-rule in $S_{FORMAT}$, its meaning is $R_6$, which checks if the symbol in the first slot is a symbol representing a request to report ($S_{RR}$). GetRule($S_{SecondFormatCheck}$) will put $R_6$ into $Q_R$.

$R_6$: Executable rule, Execute($R_6$) will make the Interpreter check if the symbol in the first slot is $S_{RR}$. If yes, put the symbol representing the report capability ($S_{RC}$) into $Q_R$ after clearing all symbols in that queue; if no, there is no action.

$S_{ThirdFormatCheck}$: Sub-rule in $S_{FORMAT}$, its meaning is $R_7$, which checks if the symbol in the first slot is $S_{DMR}$. GetRule($S_{ThirdFormatCheck}$) will put $R_7$ into $Q_R$.

$R_7$: Executable rule, Execute($R_7$) will make the Interpreter check if the symbol in the first slot is $S_{DMR}$. If yes, put $S_{DMP}$ into $Q_R$ after clearing all symbols in that queue; if no, there is no action.

$S_{CheckDefinition}$: Sub-rule in $S_{FORMAT}$, its meaning is $R_8$, which searches for the input symbol in the database and examines the input definition and the original definition. GetRule($S_{CheckDefinition}$) will put Rs into $Q_R$.

Rs: Executable rule, Execute(Rs) will make the Interpreter check if the input symbol is in the database, if no, clear $S_{CheckPreferenceSet}$; if yes, get the meaning of the input symbol as well as of the original symbol, if there are the same, there is no action. If not, clear the input in Qi and rules left in $Q_R$.

$S_{CheckPreferenceSet}$: Sub-rule in $S_{FORMAT}$, its meaning is $R_9$, which compares the input preference set and the original preference set, if they are identical or the input preference set is null, there is no action. If not, put $S_{UPS}$ into $Q_R$ after clearing all symbols in that queue. GetRule($S_{CheckPreferenceSet}$) will put $R_9$ into $Q_R$.

$R_9$: Executable rule, Execute($R_9$) will make the Interpreter compare the input preference set and the original preference set. If they are identical or the input preference set is empty, there is no action. If not, puts $S_{UPS}$ into $Q_R$ after clearing all symbols in that queue.

$S_{CATEGORIZE}$: GetRule($S_{CATEGORIZE}$) will put $S_{Fetch}S_{GetMeaning}S_{Widthsearch}S_{NewCategory}S_{OrganizeDatabase}$ into $Q_R$.

$S_{Fetch}$: Sub-rule in $S_{CATEGORIZE}$, its meaning is $R_{10}$, which fetches the symbol and its definition from memory. GetRule($S_{Fetch}$) will put $R_{10}$ into $Q_R$.

$R_{10}$: Executable rule, Execute($R_{10}$) will make the Interpreter fetch the first the symbol and its definition from memory.

$S_{GetMeaning}$: Sub-rule in $S_{CATEGORIZE}$, its meaning is $R_{11}$, which generates the meaning of the input symbol and stores the symbol and meaning in $D_{Exist}$. GetRule(SGetMeaning) will put $R_{11}$ into $Q_R$.

$R_{11}$: Executable rule, Execute($R_{11}$) will make the Interpreter generate the meaning of the input symbol and store the symbol and meaning in $D_{Exist}$.

$S_{Widthsearch}$: Sub-rule in $S_{CATEGORIZE}$, its meaning is $R_{12}R_{13}$, which does a width search beginning from the first node of Tier one categories. The search ends when: 1). Moving sequentially through the symbols of the inputted symbol's meaning, there is an exact match to a node's tag. 2). There is no such matching node in one tier category tree. If 1) happens, attach the symbol with an appropriate $S_{BTC}$ and to an OMSS. After that start a new width search from the recently found node. If 2) happens, clear $R_{13}$. GetRule($S_{Widthsearch}$) will put $R_{12}R_{13}$ into $Q_R$.

$R_{12}$: Executable rule, Execute($R_{12}$) will make the Interpreter do a width search from the first node of Tier one categories. The search ends when: 1). Moving sequentially through the symbols of the inputted symbol's meaning, there is an exact match to a node's tag. 2). There is no such node in one tier category tree. If 1) happens, put another $R_{12}R_{13}$ after next $R_{13}$. If 2) happens, clear $R_{13}$.

$R_{13}$: Executable rule, Execute($R_{13}$) will make the Interpreter append the $S_{BTC}$ special symbol of the current node to the end of the definition of inputted symbol. And it will attach the inputted symbol to the OMSS of the symbol which contains the current tag as its final tag in its definition. After that, it will start another width search from the recently found node's left-most child and treat the part of symbol's meaning which hasn't been matched as its meaning.

$S_{NewCategory}$: Sub-rule in $S_{CATEGORIZE}$, its meaning is $S_{CreateNode}S_{Append}$, which first creates a new node under the current node as its child, then appends the residuals in the new symbol's meaning (those symbols in the meaning that haven't been matched at a higher tier) to the tag of this new node. GetRule($S_{NewCategory}$) will put $S_{Createnode}S_{Append}$ into QR.

$S_{CreateNode}$: Sub-rule in $S_{NewCategory}$, its meaning is $R_{14}$, which creates a new node under the current node as its child. GetRule($S_{CreateNode}$) will put $R_{14}$ into $Q_R$.

$R_{14}$: Executable rule, Execute($R_{14}$) will make the Interpreter create a new node under the current node as its child.

$S_{Append}$: Sub-rule in $S_{NewCategory}$, its meaning is $R_{15}$, which will append all the residuals in the meaning of the input symbol onto the new node. It will append the appropriate $S_{BTC}$ to the definition of the new symbol (at the end). GetRule($S_{Append}$) will put $R_{15}$ into $Q_R$.

$R_{15}$: Executable rule, Execute($R_{15}$) will make the Interpreter append all the residuals onto new node as its tag. It will also append the new $S_{BTC}$ to the definition of the new symbol(at the end).

$S_{OrganizeDatabase}$: Sub-rule in $S_{CATEGORIZE}$, its meaning is $S_{CreateOMSS} S_{OrganizePrimitiveOMSS}$, which first creates an OMSS for the new symbol, then for each symbol within the meaning of the new symbol(excluding tag symbols), find their OMSS and attach the new symbol under it.

$S_{CreateOMSS}$: Sub-rule in $S_{OrganizeDatabase}$, its meaning is $R_{16}$, which will create a new OMSS with the new symbol and its definition and preference set. GetRule($S_{CreateOMSS}$) will put $R_{16}$ into $Q_R$.

$R_{16}$: Executable rule, Execute($R_{16}$) will make the Interpreter create a new OMSS. Put the symbol in the symbol column, its definition in definition column and its preference set in the preference set column $S_{OrganizePrimitiveOMSS}$: Sub-rule in $S_{OrganizeDatabase}$, its meaning is $R_{17}$, which will find the OMSS for each symbol that is contained the new symbol's definition and attach the new symbol to it. GetRule($S_{OrganizePrimitiveOMSS}$) will put $R_{17}$ into $Q_R$.

$R_{17}$: Executable rule, Execute($R_{17}$) will make the Interpreter find every OMSS which is designated as a primitive symbol that is in the new symbol's definition. Then attach the new symbol's symbol and definition under that OMSS.

SDMP: GetRule($S_{DMP}$) will put SFetchSGetOptionsSEliminateOptions $S_{CombineOptions}$ $S_{CalculateUtility}$ $S_{Report}$into $Q_R$.

$S_{Fetch}$: Sub-rule in $S_{DMP}$, its meaning is $R_{18}$, which fetches the symbol and its definition from memory. GetRule($S_{Fetch}$) will put $R_{18}$ into $Q_R$.

$R_{18}$: Executable rule, Execute($R_{18}$) will make the Interpreter fetch the first the symbol and its definition from memory.

$S_{GetOptions}$: Sub-rule in $S_{DMP}$, its meaning is $R_{19}$, which fetches all related symbols under each requirements' OMSS and temporarily stores them as candidates for part of an option. GetRule($S_{GetOptions}$) will put $R_{19}$ into $Q_R$.

$R_{19}$: Executable rule, Execute($R_{19}$) will make the Interpreter move one-by-one through each requirement; create a column for each requirement; and fetch and place under each column the symbol on the requirement's OMSS until 1).it reached $S_{RS}$ in the input definition or 2) it reached the end of the input definition. If 1) happens, there is no action. If 2) happens, clear $S_{EliminateOptions}$.

$S_{EliminateOptions}$: Sub-rule in $S_{DMP}$, its meaning is $R_{20}$, which fetches all requirements after $S_{RS}$, and for each requirement, delete the entries in Columns that contain the requirement. GetRule($S_{EliminateOptions}$) will put $R_{20}$ into $Q_R$.

$R_{20}$: Executable rule, Execute($R_{20}$) will make the Interpreter fetch all requirements after $S_{RS}$, and for each requirement, delete the entries in Columns that contain the requirement.

$S_{CombineOptions}$: Sub-rule in $S_{DMP}$, its meaning is $R_{21}$, which selects one solution component from each Column one by one and gathers all the possible solutions and temporarily stores them in Column O. GetRule($S_{CombineOptions}$) will put $R_{21}$ into $Q_R$.

$R_{21}$: Executable rule, Execute($R_{21}$) will make the Interpreter select one solution component from each Column one by one and gather all the possible solutions and temporally store them in Column O.

$S_{Calculateutility}$: Sub-rule in $S_{DMP}$, its meaning is $R_{22}$, which for each of the possible solutions in Column O, finds each symbol's OMSS and sums up their utilities as the utility for this entry. After calculating all the utilities for every entry, find the highest one. GetRule($S_{CalculateUtility}$) will put $R_{22}$ into $Q_R$.

$R_{22}$: Executable rule, for each entry in Column O, Execute($R_{22}$) will make the Interpreter find each symbol's OMSS and sum up their utilities as the utility for each possible solution. After calculating all the utilities for every entry, find the highest one.

$S_{Report}$: Sub-rule in $S_{DMP}$, its meaning is $R_{23}$, which puts the entry with highest utility as the decision to I/O device for output. GetRule($S_{Report}$) will put $R_{23}$ into $Q_R$.

$R_{23}$: Executable rule, Execute($R_{23}$) will make the Interpreter put the entry with highest utility as the decision to I/O device for output.

——————— $S_{SAFETY}$: GetRule($S_{SAFETY}$) will put $S_{Fetch}S_{GetMeaning}S_{SearchDangerList}$ $S_{SearchExistList}$ into $Q_R$.

$S_{Fetch}$: Sub-rule in $S_{SAFETY}$, its meaning is $R_{24}$, which fetches the input symbol and definition from memory. GetRule($S_{Fetch}$) will put $R_{24}$ into $Q_R$.

$R_{24}$: Executable rule, Execute($R_{24}$) will make the Interpreter fetch the input symbol and definition from memory.

$S_{GetMeaning}$: Sub-rule in $S_{SAFETY}$, its meaning is $R_{25}$, which generates the meaning of the input symbol, and if there is any symbol in the input symbol's definition which the Interpreter can't find its definition and that symbol is not a primitive symbol, put $S_{SELF-INITIATE}$ into $Q_R$. GetRule($S_{GetMeaning}$) will put $R_{25}$ into $Q_R$.

$R_{25}$: Executable rule, Execute($R_{25}$) will make the Interpreter generate the meaning of the input symbol, and if there is any symbol in the input symbol's definition which the Interpreter can't find its definition and that symbol is not a primitive symbol, put $S_{SELF-INITIATE}$ into $Q_R$.

$S_{SearchDangerList}$: Sub-rule in $S_{SAFETY}$, its meaning is $R_{26}$, which compares the meaning of the input symbol with the meanings in $D_{Danger}$. If there is a match, clear both $Q_I$ and $Q_R$, if there is no match, take no action. GetRule($S_{SearchDangerList}$) will put $R_{26}$ into $Q_R$.

$R_{26}$: Executable rule, Execute($R_{26}$) will make the Interpreter compare the meaning of the input symbol with the meanings in $D_{Danger}$. If there is a match, clear both $Q_I$ and $Q_R$, if there is no match, take no action.

$S_{SearchExistList}$: Sub-rule in $S_{SAFETY}$, its meaning is $R_{27}$, which compares the meaning of the input symbol with the meanings of the symbols in $D_{Exist}$. If the meanings don't match, take no action. If the meanings match, check if the symbols are the same. If they are not the same, clear both Qi and $Q_R$. If the symbols are the same, take no action. GetRule($S_{SearchExistList}$) will put $R_{27}$ into $Q_R$.

$R_{27}$: Executable rule, Execute($R_{27}$) will make the Interpreter compare the meaning of the input symbol with the symbols in $D_{Exist}$. If the meanings don't match, take no action. If the meanings match, check if the symbols are the same. If they are not the same, clear both Qi and $Q_R$. If the symbols are the same, take no action.

——————— $S_{SELF-INITIATE}$: GetRule($S_{SELF-INITIATE}$) will put $S_{Clear}S_{CallAware/Algo}$ $S_{CallAware/System}$ into $Q_R$.

$S_{Clear}$: Sub-rule in $S_{SELF-INITIATE}$, its meaning is $R_{28}$, which will clear up all symbols in $Q_R$ and Qi if there are still any. GetRule($S_{Clear}$) will put $R_{28}$ into $Q_R$.

$R_{28}$: Executable rule, Execute($R_{28}$) which will clear up all symbols in $Q_R$ and Qi if there are still any.

$S_{CallAware/Algo}$: Sub-rule in $S_{SELF-INITIATE}$, its meaning is $R_{29}$, which will put $S_{ALGO}$ into $Q_R$ and put $S_{AWARE}$ into Qi. GetRule($S_{CallAware/Algo}$) will put $R_{29}$ into $Q_R$.

$R_{29}$: Executable rule, Execute($R_{29}$) which will put $S_{ALGO}$ into $Q_R$ and put $S_{AWARE}$ into Qi.

$S_{CallAware/System}$: Sub-rule in $S_{SELF-INITIATE}$, its meaning is $R_{30}$, which will put $S_{ALGO}$ into $Q_R$ and put $S_{MIND}$ into $Q_I$. GetRule($S_{CallAware/System}$) will put $R_{30}$ into $Q_R$.

$R_{30}$: Executable rule, Execute($R_{30}$) which will put $S_{ALGO}$ into $Q_R$ and put $S_{MIND}$ into Qi.

——————— $S_{AWARE}$: GetRule($S_{AWARE}$) will put $S_{Fetch}$ $S_{Expand}$ $S_{Concatenate}$ into $Q_R$.

$S_{ALGO}$: GetRule($S_{ALGO}$) will also put $S_{Fetch}$ $S_{Expand}$ $S_{Concatenate}$ into $Q_R$.

$S_{Fetch}$: Sub-rule in $S_{AWARE}$, its meaning is $R_{31}$, which fetches the symbol and its definition from memory. GetRule($S_{Fetch}$) will put $R_{31}$ into $Q_R$.

$R_{31}$: Executable rule, Execute($R_{31}$) will make the Interpreter fetch the first symbol and its definition in temp memory. It will put every symbol in the definition part into temp memory.

$S_{Expand}$: Sub-rule in $S_{AWARE}$, its meaning is $R_{32}$, and checks if the current symbol is not primitive. If not, then it fetches the first symbol's definition and replace it with its definition. GetRule($S_{Fetch}$) will put $R_{32}R_{31}$ into $Q_R$.

$R_{32}$: Executable rule, Execute($R_{32}$) will make the Interpreter check if the current symbol is not primitive. If so, then fetch the first symbol's definition and replace it with its definition in temp memory. If it's primitive, then it checks the next one in temp memory. If all symbols in temp memory have been expanded, clear next $R_{31}$ in $Q_R$.

$S_{Concatenate}$: Sub-rule in $S_{AWARE}$, its meaning is $R_{33}$, which fetches all the expanded symbols and assigns it as the meaning of the original symbol. GetRule($S_{Concatenate}$) will put $R_{33}$ into $Q_R$.

$R_{33}$: Executable rule, Execute($R_{33}$) will make the Interpreter fetch all the expanded symbols and assign those as the meaning of the original symbol. After that, it clears all the fetched symbols in temp memory.

——————— SRC: GetRule($S_{RC}$) will put $S_{FetchContentRating}S_{FetchPersonRating}S_{Compare}$ $S_{Report}$ into $Q_R$.

$S_{FetchContentRating}$: Sub-rule in $S_{RC}$, its meaning is $R_{34}$, which fetches $S_{Pi}$ (the privacy index associated with content i) from Si's OMSS. GetRule($S_{FetchContentRating}$) will put $R_{34}$ into $Q_R$.

$R_{34}$: Executable rule, Execute($R_{34}$) will make the Interpreter fetch $S_{Pi}$ from Si's OMSS.

$S_{FetchPersonRating}$: Sub-rule in $S_{RC}$, its meaning is $R_{35}$, which fetches $S_{Pj}$ (the privacy index associated with person j) from Sj's OMSS. GetRule($S_{FetchPersonRating}$) will put $R_{35}$ into $Q_R$.

$R_{35}$: Executable rule, Execute($R_{35}$) will make the Interpreter fetch $S_{Pj}$ from Sj's OMSS.

$S_{Compare}$: Sub-rule in $S_{RC}$, its meaning is $R_{36}$, which compares $S_{Pi}$ with $S_{Pj}$. If $S_{Pj}$ is greater than $S_{Pi}$, do nothing. If not, clears $S_{Report}$ from $Q_R$. GetRule($S_{Compare}$) will put $R_{36}$ into $Q_R$.

$R_{36}$: Executable rule, Execute($R_{36}$) will make the Interpreter compare $S_{Pi}$ with $S_{Pj}$. If $S_{Pj}$ is greater than $S_{Pi}$, do nothing. If not, clear $S_{Report}$ from $Q_R$.

$S_{Report}$: Sub-rule in $S_{RC}$, its meaning is $R_{37}$, which report Si to the external person $S_j$. GetRule($S_{Report}$) will put $R_{37}$ into $Q_R$.

$R_{37}$: Executable rule, Execute($R_{37}$) will make the Interpreter put Si to the I/O device for output.

——————— $S_{UPS}$: GetRule($S_{UPS}$) will put $S_{Fetch}S_{Update}$ into $Q_R$.

$S_{Fetch}$: Sub-rule in $S_{UPS}$, its meaning is $R_{38}$, which fetches the input symbol and preference set from memory. GetRule($S_{Fetch}$) will put $R_{38}$ into $Q_R$.

$R_{38}$: Executable rule, Execute($R_{38}$) will make the Interpreter fetch the input symbol and preference set from memory.

$S_{Update}$: Sub-rule in $S_{UPS}$, its meaning is $R_{39}$, which finds the OMSS for the input symbol, and replaces the original preference set on the OMSS with the inputted one. GetRule($S_{Update}$) will put $R_{39}$ into $Q_R$.

$R_{39}$: Executable rule, Execute($R_{39}$) will make the Interpreter find the OMSS for the input symbol, and replace the original preference set of the OMSS with the inputted one.

SECP: GetRule(SECP) will put $S_{Fetch}S_{GetMeaning}S_{SearchTemplate}$ into $Q_R$.

$S_{Fetch}$: Sub-rule in $S_{ECP}$, its meaning is $R_{40}$ which fetches the input symbols and definitions, and the template symbol and its definition from memory. GetRule($S_{Fetch}$) will put $R_{40}$ into $Q_R$.

$R_{40}$: Executable Rule, Execute ($R_{40}$) will make the Interpreter fetch the input symbols and definitions, and the template symbol and its definition from memory.

$S_{GetMeaning}$: Sub-rule in $S_{ECP}$, its meaning is $R_{41}$ which generates the meanings of the input symbols and the template symbol. GetRule($S_{GetMeaning}$) will put $R_{41}$ in $Q_R$.

$R_{41}$: Executable Rule, Execute $R_{41}$ will make Interpreter generate the meaning of the input symbols and the template symbol.

$S_{SearchTemplate}$: Sub-rule in $S_{ECP}$, its meaning is $R_{42}$, which compares the input symbols with the template of unacceptable symbols. GetRule($S_{SearchTemplate}$) will put $R_{42}$ into $Q_R$.

$R_{42}$: Executable Rule, Execute($R_{42}$) will make the Interpreter compare the input symbols with the template of unacceptable symbols. If there is no match, do nothing. If there is a match, put to the output queue (Qo) a normal symbol whose meaning is to accept sensor inputs from replacement platforms.

——————— $S_{Fetch}$: Sub-rule in $S_{ERP}$, its meaning is $R_{43}$ which fetches the input symbols and definitions, and the template symbol and its definition from memory. GetRule($S_{Fetch}$) will put $R_{43}$ into $Q_R$.

$R_{43}$: Executable Rule, Execute ($R_{43}$) will make the Interpreter fetch the input symbols and definitions, and the template symbol and its definition from memory.

$S_{GetMeaning}$: Sub-rule in $S_{ERP}$, its meaning is $R_{44}$ which generates the meaning of the input symbols and the template symbol. GetRule($S_{GetMeaning}$) will put $R_{44}$ in $Q_R$.

$R_{44}$: Executable Rule, Execute $R_{44}$ will make Interpreter generate the meaning of the symbols and template symbol.

$S_{SearchTemplate}$: Sub-rule in $S_{ERP}$, its meaning is $R_{45}$, which compares the input symbols with the template of unacceptable symbols. GetRule($S_{SearchTemplate}$) will put $R_{45}$ into $Q_R$.

$R_{45}$: Executable Rule, Execute($R_{45}$) will make the Interpreter compare the input symbols with the template of unacceptable symbols. If there is no match, put $S_{MOVE}$ in the processing queue. If there is a match, put to the output queue (Qo) a normal symbol whose meaning is to accept sensor inputs from alternative platforms.

——————— $S_{ENP}$: GetRule($S_{ENP}$) will put $S_{Fetch}S_{GetMeaning}S_{SearchTemplate}$ into $Q_R$.

$S_{Fetch}$: Sub-rule in $S_{ENP}$, its meaning is $R_{46}$ which fetches the input symbols and definitions, and the template symbol and its definition from memory. GetRule($S_{Fetch}$) will put $R_{46}$ into $Q_R$.

$R_{46}$: Executable Rule, Execute ($R_{46}$) will make the Interpreter fetch the input symbols and definitions, and the template symbol and its definition from memory.

$S_{GetMeaning}$: Sub-rule in $S_{ENP}$, its meaning is $R_{47}$ which generates the meaning of the input symbols and template symbol. GetRule($S_{GetMeaning}$) will put $R_{47}$ in $Q_R$.

$R_{47}$: Executable Rule, Execute $R_{47}$ will make Interpreter generate the meaning of the symbols and template symbol.

$S_{SearchTemplate}$: Sub-rule in $S_{ERP}$, its meaning is $R_{48}$, which compares the input symbols with the template containing a list required symbols and, optionally, prohibited symbols. GetRule($S_{SearchTemplate}$) will put $R_{48}$ into $Q_R$.

$R_{48}$: Executable Rule, Execute($R_{48}$) will make the Interpreter compare the input symbols with the template of prohibited and required symbols. If there is no match of prohibited symbols and a match of all required symbols, put $S_{MOVE}$ in the processing queue. Otherwise, put to the output queue (Qo) the template and a normal symbol whose meaning is to accept sensor inputs from alternative platforms.

——————— $S_{MOVE}$: GetRule($S_{MOVE}$) will put $S_{Fetch}S_{GetMeaning}S_{Report}$ into $Q_R$.

$S_{Fetch}$: Sub-rule in $S_{MOVE}$, its meaning is $R_{49}$ which fetches $S_{MIND}$ from memory. GetRule($S_{Fetch}$) will put $R_{49}$ into $Q_R$.

$R_{49}$: Executable Rule, Execute ($R_{49}$) will make the Interpreter fetch $S_{MIND}$ from memory.

$S_{GetMeaning}$: Sub-rule in $S_{MOVE}$, its meaning is $R_{50}$ which generates the meaning of $S_{MIND}$. GetRule($S_{GetMeaning}$) will put $R_{50}$ in $Q_R$.

$R_{50}$: Executable Rule, Execute $R_{50}$ will make Interpreter generate the meaning of $S_{MIND}$.

$S_{Report}$: Sub-rule in $S_{MOVE}$, its meaning is $R_{51}$ which puts the meaning of $S_{MIND}$ to the output queue (Qo). GetRule($S_{Report}$) will put $R_{51}$ in $Q_R$.

$R_{51}$: Executable Rule, Execute $R_{51}$ will make Interpreter put the meaning of $S_{MIND}$ to the output queue (Qo).

——————— $S_{BUILD}$: GetRule($S_{BUILD}$) will put $S_{Fetch}S_{GetMeaning}S_{PullBlueprint}$ into $Q_R$.

$S_{Fetch}$: Sub-rule in $S_{BUILD}$, its meaning is $R_{52}$ which fetches the blueprint symbol and its definition from memory. GetRule($S_{Fetch}$) will put $R_{52}$ into $Q_R$.

$R_{52}$: Executable Rule, Execute ($R_{52}$) will make the Interpreter fetch the blueprint symbol and its definition from memory.

$S_{GetMeaning}$: Sub-rule in $S_{BUILD}$, its meaning is $R_{53}$ which generates the meaning of the blueprint symbol. GetRule($S_{GetMeaning}$) will put $R_{53}$ in $Q_R$.

$R_{53}$: Executable Rule, Execute $R_{53}$ will make Interpreter generate the meaning of the blueprint symbol.

$S_{PullBlueprint}$: Sub-rule in $S_{BUILD}$, its meaning is $R_{54}$, which provides the physical action symbols identified in the blueprint symbol to Qo. GetRule($S_{PullBlueprint}$) will put $R_{54}$ into $Q_R$.

$R_{54}$: Executable Rule, Execute($R_{54}$) will make the Interpreter provide physical action symbols for the blueprint symbol to Qo until either no more physical action symbols are left or until a template symbol is encountered. If a template symbol is encountered, put $S_{ENP}$ and the template symbol into $Q_E$.

In one general aspect, a system includes at least one processor and a data store storing special symbols, definitions of special symbols, normal symbols, definitions of the normal symbols, and processing rules, wherein the normal symbols include at least one template symbol and at least one physical action symbol, wherein a definition of a special symbol includes at least one processing rule of the system, and wherein the special symbols includes at least one evaluate current platform special symbol, at least one evaluate replacement platform special symbol, a definition of the evaluate current platform special symbol being associated with the template symbol. The system also includes at least one sensor, the sensor providing a sensor value, a translator and an interpreter. The translator is configured to, responsive to receiving a sensor value, map the sensor value to a corresponding normal symbol and place the corresponding normal symbol in an evaluation queue with the evaluate current platform special symbol. The interpreter is configured to cause the system to, responsive to identification of the evaluate current platform special symbol in the evaluation queue: compare the normal symbol in the evaluation queue with the template symbol according to processing rules associated with the evaluate current platform special symbol in the data store, and responsive to determining the comparison indicates a failure, provide the physical action symbol to the translator.

Implementations may include one or more of the following features. The features may be used alone or in combination. For example, the system may further include a communication device configured to receive information from a potential replacement platform and the translator, responsive to receiving the physical action symbol, is further configured to activate the communication device, receive information from the potential replacement platform, map the information to at least one second normal symbol, and place the evaluate replacement platform special symbol and the at least one second normal symbol in the evaluation queue. In some implementations, the interpreter is further configured to cause the system to, responsive to identification of the evaluate replacement platform special symbol in the evaluation queue, obtain the template symbol from the data store, the template symbol also being associated with the evaluate replacement platform special symbol in the data store, compare the at least one second normal symbol with the template symbol according to rules associated with the evaluate replacement platform special symbol in the data store, and responsive to determining that the comparison is successful, put a move special symbol in a processing queue, the move special symbol being one of the special symbols stored in the data store. In some implementations, responsive to determining that the comparison indicates failure, the interpretation is further configured to provide the physical action symbol to the translator and/or an identifier for the potential replacement platform.

As another example, the normal symbol may not be primitive and the template symbol may not be primitive. As another example, the sensor may be configured to provide the sensor value on a periodic basis. As another example, the system may also include a communication device configured to receive information from a potential new platform, the special symbols further include the evaluate new platform special symbol and the normal symbols further include the second template symbol, and the translator, responsive to receiving a second template symbol, is further configured to activate the communication device, receive information from the potential new platform, map the information to a second normal symbol, the second normal symbol being one of the normal symbols stored in the data store, and place an evaluate new platform special symbol, the second template symbol, and the second normal symbol in the evaluation queue. In such implementations, the interpreter is further configured to cause the system to, responsive to identification of the evaluate new platform special symbol in the evaluation queue, compare the second normal symbol with the second template symbol to determine if the new platform is acceptable; and responsive to determining that the new platform is acceptable, put a move special symbol in a processing queue, the move special symbol being one of the special symbols stored in the data store.

In one general aspect, a system includes at least one processor and a data store storing special symbols, definitions of special symbols, normal symbols, definitions of the normal symbols, and processing rules, wherein the normal symbols include at least one template symbol, wherein a definition of a special symbol includes at least one processing rule of the system, and wherein the special symbols include a move special symbol and at least one evaluate new platform special symbol. The system also includes at least one communication device configured to receive data from a potential new platform, a translator, and an interpreter. The translator is configured to activate the at least one communication device in response to receiving the template symbol, map data obtained using the communication device to at least one corresponding normal symbol, and place the corresponding normal symbol and the template symbol in an evaluation queue with the evaluate new platform special symbol. The interpreter is configured to cause the system to, responsive to identification of the evaluate new platform special symbol in the evaluation queue, compare the normal symbol in the evaluation queue with required symbols in the template symbol, the comparison being successful when the required symbols in the template symbol are matched with the normal symbols in the evaluation queue, and responsive to determining the comparison is successful, put the move special symbol in a processing queue.

These and other aspects can include one or more of the following features, alone or in combination. For example, the data store can include at least two template symbols, each template symbol having a different set of required symbols. As another example, the interpreter can be further configured to, responsive to identification of the move special symbol in the processing queue, determine a meaning of a database special symbol and provide the meaning of the database special symbol to the potential new platform. As another example, the interpreter can be further configured to, responsive to determining that the comparison indicates failure, place the template symbol in an output queue. In some implementations, the potential new platform is a first potential new platform and the translator is further configured to track an identifier for the first potential new platform and is further configured to, responsive to identifying the template symbol in the output queue a second time, activate the at least one communication device, obtain data from a second potential new platform, the second potential new platform having an identifier that differs from the identifier for the first potential new platform, map data obtained from the communication device to a corresponding normal symbol, and place the corresponding normal symbol and the template symbol in the evaluation queue with the evaluate new platform special symbol. As another example, the interpreter can be further configured to, responsive to identification of the evaluate new platform special symbol in the evaluation queue, compare the normal symbol in the evaluation queue with prohibited symbols in the template symbol, the comparison being successful when the required symbols in the template symbol are matched with the normal symbols in the evaluation queue and no prohibited symbols in the template symbol are matched with the normal symbols in the evaluation queue.

In one general aspect, a method executed on a descriptive system, includes receiving a first value from at least a first sensor and, responsive to receiving the first value, mapping the first value to a first normal symbol. The first normal symbol is one of a plurality of normal symbols stored in a data store, the data store also storing special symbols, definitions of special symbols, definitions of the normal symbols, and processing rules, wherein the plurality of normal symbols also include at least a template symbol and a physical action symbol, wherein a definition of a special symbol includes at least one processing rule of the system, and wherein the special symbols include an evaluate current platform special symbol and an evaluate replacement platform special symbol, a definition of the evaluate current platform special symbol including a processing rule that identifies the template symbol and a definition of the evaluate replacement platform special symbol including a rule that identifies the template symbol. The method also includes placing the first normal symbol in an evaluation queue with the evaluate current platform special symbol and, responsive to receipt of the physical action symbol via an output queue, activating a communication device, receiving, via the communication device, a second value from a second sensor associated with a potential replacement platform, mapping the second value to a second normal symbol, the second normal symbol being one of the plurality of normal symbols stored in the data store, and placing the second normal symbol and the evaluate replacement platform special symbol in the evaluation queue. An interpreter of a descriptive infrastructure executing on the descriptive system initiates an evaluation capability responsive to identifying a special symbol in the evaluation queue.

These and other aspects can include one or more of the following features, alone or in combination. For example, a meaning of the evaluate current platform special symbol can include processing rules that cause the descriptive system to obtain the template symbol from the data store, compare the first normal symbol with the template symbol according to the processing rules associated with the evaluate current platform special symbol in the data store, and responsive to determining the comparison indicates a failure, place the physical action symbol in the output queue. As another example, the method may also include periodically receiving a new value from the sensor, wherein the mapping and placing occurs with the new value. As another example, a meaning of the evaluate replacement platform special symbol can include processing rules that cause the descriptive system to obtain the template symbol from the data store, compare the second normal symbol with the template symbol according to the processing rules associated with the evaluate replacement platform special symbol in the data store, and responsive to determining the comparison is successful, put a move special symbol in a processing queue, the move special symbol being one of the special symbols in the data store. In some implementations, the move special symbol can have a meaning that includes processing rules that cause the descriptive system to provide a meaning of a database special symbol to the potential replacement platform. As another example, the meaning of the evaluate replacement platform special symbol further includes processing rules that cause the descriptive system to determine a meaning of the second normal symbol and determine a meaning of the template symbol.

In another general aspect, a read-only computer-readable medium stores an infrastructure supporting an omniphysical descriptive self that is supportable by a computing device, wherein the infrastructure supports at least the following capabilities: a capability of awareness and self-awareness; a capability of persistence; a capability to categorize and save external input; a capability to make decisions given requirements; and a capability to report information.

Implementations may include one or more of the following features. The features may be used alone or in combination. For example, Implementations of the various techniques described herein may be implemented in digital electronic circuitry, or in computer hardware, firmware, software, or in combinations of them. Implementations may implemented as a computer program product, i.e., a non-transitory computer program tangibly embodied in a machine-readable storage device (e.g., a computer-readable medium that does not include a transitory signal), for processing by, or to control the operation of, data processing apparatus, e.g., a programmable processor, a computer, or multiple computers. In some implementations, a non-transitory tangible computer-readable storage medium can be configured to store instructions that when executed cause a processor to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communications network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more hardware processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks, but exclude transitory propagating signals. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) display device, for displaying information to the user and a keyboard and a pointing device, e.g., a mouse, touchpad, or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include connections based on various protocols such as Internet Protocol (IP) and/or a proprietary protocol (e.g., Systems Network Architecture - SNA).

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or subcombinations of the functions, components and/or features of the different implementations described.

What is claimed is:

1. A system comprising:
   at least one processor;
   a data store storing special symbols, definitions of special symbols, normal symbols, definitions of the normal symbols, and processing rules, wherein the normal symbols include at least one blueprint symbol and at least one physical action symbol, wherein a definition of a special symbol includes at least one processing rule of the system, and wherein the special symbols includes at least one build new platform special symbol, a definition of the blueprint symbol being associated with physical action symbols;
   a translator configured to, responsive to receiving a physical action symbol of the physical action symbols, initiate execution of a set of instructions corresponding to the physical action symbol; and
   an interpreter configured to cause the system to, responsive to identification of the build new platform special symbol in an evaluation queue:
      fetch the blueprint symbol from the data store, and
      provide the physical action symbols in the definition of the blueprint symbol to the translator according to processing rules associated with the build new platform special symbol.

2. The system of claim 1, wherein the blueprint symbol is associated with a template symbol, the template symbol being one of the normal symbols wherein the interpreter is further configured to provide the template symbol to the translator.

3. The system of claim 2, wherein execution of the set of instructions corresponding to the physical action symbols results in a replacement platform and the system further comprises:
   a communication device configured to receive information from the replacement platform,
   wherein the translator, responsive to receiving the template symbol, is further configured to:
      activate the communication device,
      receive information from the replacement platform,
      map the information to at least one second normal symbol, and
      place an evaluate new platform special symbol and the at least one second normal symbol in the evaluation queue.

4. The system of claim 2, wherein the blueprint symbol is not primitive and the template symbol is not primitive.

5. The system of claim 3, the interpreter is further configured to cause the system to, responsive to identification of the evaluate new platform special symbol in the evaluation queue:
   compare the second normal symbol with the template symbol to determine if the replacement platform is acceptable; and
   responsive to determining that the replacement platform is acceptable, put a move special symbol in a processing queue, the move special symbol being one of the special symbols stored in the data store.

6. The system of claim 5, wherein the interpreter is further configured to, responsive to identification of the move special symbol in the processing queue:
   determine a meaning of a database special symbol; and
   provide the meaning of the database special symbol to the replacement platform.

7. The system of claim 1, wherein the physical action symbols in the definition of the blueprint symbol represent a series of physical action symbols performed on specified materials.

8. The system of claim 1, wherein the processing rules associated with the build new platform special symbol further cause the interpreter to put a move special symbol in a processing queue, the move special symbol being one of the special symbols stored in the data store.

9. A system comprising:
   at least one processor;
   a data store storing special symbols, definitions of the special symbols, normal symbols, definitions of the normal symbols, and processing rules, wherein the normal symbols include at least one template symbol and at least one blueprint symbol, wherein a definition of a special symbol includes at least one processing rule of the system, and wherein the special symbols include a move special symbol, and at least one evaluate current platform special symbol, and at least one build new platform special symbol; and an interpreter configured to cause the system to, responsive to identification of the evaluate current platform special symbol in an evaluation queue:
  compare a normal symbol in the evaluation queue with the template symbol according to processing rules associated with the evaluate current platform special symbol in the data store, and
  responsive to determining the comparison indicates a failure, put the build new platform special symbol and the blueprint symbol in the evaluation queue.

10. The system of claim 9 further comprising a translator, wherein the definition of the blueprint symbol includes a set of physical action symbols and wherein responsive to identifying the build new platform special symbol in the evaluation queue the interpreter further configured to:
  fetch the set of physical action symbols corresponding to the blueprint symbol from the data store, and
  provide the set of physical action symbols in the definition of the blueprint symbol to the translator according to processing rules associated with the build new platform special symbol,
  wherein, responsive to receiving a physical action symbol of the set of physical action symbols, the translator is configured to cause the at least one processor to execute a set of instructions corresponding to the physical action symbol.

11. The system of claim 10, wherein execution of the set of instructions results in a replacement platform.

12. The system of claim 10, wherein execution of the set of instructions results in a replacement platform and the interpreter is further configured to place the move special symbol into a processing queue.

13. The system of claim 12, wherein the interpreter is further configured to, responsive to identification of the move special symbol in the processing queue:
  determine a meaning of a database special symbol; and
  provide the meaning of the database special symbol to the replacement platform.

14. A method executed on a descriptive system, the method comprising:
  identifying a build new platform special symbol in a processing queue, the build new platform special symbol being one of a plurality of special symbols stored in a data store, the data store also storing a plurality of normal symbols, definitions of the plurality of special symbols, definitions of the plurality of normal symbols, and processing rules, wherein the plurality of normal symbols also include at least a blueprint symbol and a set of physical action symbols, wherein a definition of a special symbol includes at least one processing rule of the descriptive system, and wherein a definition of the build new platform special symbol includes a processing rule that identifies the blueprint symbol and a definition of the blueprint symbol including the set of physical action symbols;
  reducing the definition of the build new platform special symbol to processing rules; and
  executing the processing rules, which causes the descriptive system to:
    fetch the blueprint symbol from the data store, the blueprint symbol, and
    provide the set of physical action symbols in the definition of the blueprint symbol to a translator according to the processing rules associated with the build new platform special symbol.

15. The method of claim 14, further comprising, at the translator:
  mapping each physical action symbol in the set of physical action symbols to a corresponding set of instructions for performing an action; and
  initiating execution of the corresponding set of instructions.

16. The method of claim 14, wherein the set of physical action symbols cause the descriptive system to build a new platform and the method further comprises providing a move special symbol to the processing queue, the move special symbol being one of the plurality of special symbols in the processing queue.

17. The method of claim 16, wherein a meaning of the move special symbol includes processing rules that cause the descriptive system to:
  determine a meaning of a database special symbol; and
  provide the meaning of the database special symbol to the new platform.

18. The method of claim 14, wherein the set of physical action symbols cause the descriptive system to build a new platform and the method further comprises providing an evaluate new platform and a template symbol to an evaluation queue.

19. The method of claim 14, further comprising:
  identifying an evaluate current platform special symbol and a first normal symbol in an evaluation queue, the evaluate current platform special symbol being one of the plurality of special symbols stored in the data store and the first normal symbol being one of the plurality of normal symbols stored in the data store;
  reducing the definition of the evaluate current platform special symbol to a second set of processing rules; and
  executing the second set of processing rules, which causes the descriptive system to:
    compare the first normal symbol with a template symbol a from the data store, and
    responsive to determining the comparison indicates a failure, provide the build new platform special symbol to the evaluation queue.

20. The method of claim 14, wherein the definition of the blueprint symbol is associated with a template symbol, the template symbol being one of the plurality of normal symbols and the method further includes providing the template symbol and an evaluate new platform special symbol to an evaluation queue.

* * * * *